US011425469B2

(12) United States Patent
Trollope et al.

(10) Patent No.: US 11,425,469 B2
(45) Date of Patent: Aug. 23, 2022

(54) METHODS AND DEVICES FOR CLARIFYING AUDIBLE VIDEO CONTENT

(71) Applicant: Google LLC, Mountain View, CA (US)

(72) Inventors: Ingrid McAulay Trollope, Richmond (GB); Ant Oztaskent, Sutton (GB); Yaroslav Volovich, Cambridge (GB)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/372,909

(22) Filed: Jul. 12, 2021

(65) Prior Publication Data
US 2021/0345012 A1 Nov. 4, 2021

Related U.S. Application Data

(63) Continuation of application No. 16/847,224, filed on Apr. 13, 2020, now Pat. No. 11,064,266, which is a
(Continued)

(51) Int. Cl.
G06F 3/048 (2013.01)
H04N 21/81 (2011.01)
(Continued)

(52) U.S. Cl.
CPC ..... H04N 21/8133 (2013.01); G06F 16/7844 (2019.01); G06F 17/40 (2013.01);
(Continued)

(58) Field of Classification Search
CPC ............ H04N 21/8133; H04N 21/233; H04N 21/235; H04N 21/2393; G06F 16/7844;
(Continued)

(56) References Cited

U.S. PATENT DOCUMENTS 6,317,882 B1  11/2001 Robbins
6,934,963 B1   8/2005 Reynolds et al.
(Continued)

FOREIGN PATENT DOCUMENTS

CN    1972395      5/2007
CN  101329867    12/2008
(Continued)

OTHER PUBLICATIONS

Examination Report dated Jul. 16, 2018 in EP Patent Application No. 15733981.3.
(Continued)

Primary Examiner — David Phantana-angkool
(74) Attorney, Agent, or Firm — Byrne Poh LLP

(57) ABSTRACT

The various implementations described herein include methods, devices, and systems for clarifying media content. In one aspect, a method is performed at a client device that includes a microphone, memory, and one or more processors. The method includes: (1) receiving, via the microphone, audio content of a media content item playing on a second client device in proximity to the client device; (2) receiving, via the microphone, a verbal query from a user of the client device to clarify a portion of the media content item; (3) sending a request to a remote server system; (4) receiving from the remote server system information responsive to the verbal user query for the portion of the media content item; and (5) presenting the information to the user.

21 Claims, 33 Drawing Sheets

Related U.S. Application Data continuation of application No. 16/240,608, filed on Jan. 4, 2019, now Pat. No. 10,638,203, which is a continuation of application No. 14/488,213, filed on Sep. 16, 2014, now Pat. No. 10,206,014, which is a continuation-in-part of application No. 14/311,204, filed on Jun. 20, 2014, now Pat. No. 9,946,769, and a continuation-in-part of application No. 14/311,218, filed on Jun. 20, 2014, now Pat. No. 9,838,759, and a continuation-in-part of application No. 14/311,211, filed on Jun. 20, 2014, now Pat. No. 9,805,125.

(51) Int. Cl.
| | |
|---|---|
| *H04N 21/233* | (2011.01) |
| *H04N 21/235* | (2011.01) |
| *H04N 21/239* | (2011.01) |
| *G06F 16/783* | (2019.01) |
| *G06F 17/40* | (2006.01) |
| *G06Q 10/06* | (2012.01) |
| *G06F 40/00* | (2020.01) |
| *G10L 15/26* | (2006.01) |

(52) U.S. Cl.
CPC .............. *G06F 40/00* (2020.01); *G06Q 10/06* (2013.01); *G10L 15/26* (2013.01); *H04N 21/233* (2013.01); *H04N 21/235* (2013.01); *H04N 21/2393* (2013.01)

(58) Field of Classification Search
CPC ......... G06F 40/00; G06F 17/40; G06Q 10/06; G10L 15/26
See application file for complete search history.

(56) References Cited

U.S. PATENT DOCUMENTS

| | | | |
|---|---|---|---|
| 7,209,942 B1 | 4/2007 | Hori et al. | |
| 7,281,220 B1 | 10/2007 | Rashkovskiy | |
| 7,367,043 B2 | 4/2008 | Dudkiewicz et al. | |
| 7,487,096 B1 | 2/2009 | Cox et al. | |
| 7,788,080 B2 | 8/2010 | Graham et al. | |
| 7,983,915 B2 | 7/2011 | Knight et al. | |
| 8,010,988 B2 | 8/2011 | Cox | |
| 8,108,535 B1 | 1/2012 | Roberts et al. | |
| 8,122,094 B1 | 2/2012 | Kotab | |
| 8,132,103 B1 * | 3/2012 | Chowdhury ........ | G06F 16/7834 715/725 |
| 8,180,307 B2 | 5/2012 | Delker et al. | |
| 8,370,380 B2 | 2/2013 | Kuraoka et al. | |
| 8,433,431 B1 | 4/2013 | Master et al. | |
| 8,433,577 B2 | 4/2013 | Sharifi et al. | |
| 8,447,604 B1 | 5/2013 | Chang | |
| 8,478,750 B2 | 7/2013 | Rao et al. | |
| 8,484,203 B1 | 7/2013 | Clancy et al. | |
| 8,516,533 B2 | 8/2013 | Davis et al. | |
| 8,572,488 B2 | 10/2013 | Phillips et al. | |
| 8,607,276 B2 | 12/2013 | Chang et al. | |
| 8,645,125 B2 | 2/2014 | Liang et al. | |
| 8,707,381 B2 | 4/2014 | Polumbus et al. | |
| 8,751,502 B2 | 6/2014 | Agrawal | |
| 8,868,558 B2 | 10/2014 | Blanco et al. | |
| 8,989,521 B1 | 3/2015 | Ho et al. | |
| 8,994,311 B1 | 3/2015 | Lynch et al. | |
| 9,009,025 B1 | 4/2015 | Porter | |
| 9,135,291 B2 | 9/2015 | Assam | |
| 9,173,001 B1 | 10/2015 | Roberts et al. | |
| 9,282,075 B2 | 3/2016 | Smalley et al. | |
| 9,317,500 B2 | 4/2016 | Hwang | |
| 9,462,230 B1 | 10/2016 | Agrawal et al. | |
| 9,609,397 B1 | 3/2017 | Avegliano et al. | |
| 9,727,644 B1 | 8/2017 | Teng et al. | |
| 9,838,759 B2 | 12/2017 | Kirmse et al. | |
| 9,854,324 B1 | 12/2017 | Panchaksharaiah et al. | |
| 9,946,769 B2 | 4/2018 | Oztaskent et al. | |
| 9,990,176 B1 | 6/2018 | Gray | |
| 9,998,795 B2 | 6/2018 | Oztaskent et al. | |
| 10,057,651 B1 | 8/2018 | Singh et al. | |
| 10,121,165 B1 | 11/2018 | Mohajer et al. | |
| 10,194,189 B1 | 1/2019 | Goetz et al. | |
| 10,206,014 B2 | 2/2019 | Trollope et al. | |
| 10,349,141 B2 | 7/2019 | Trollope et al. | |
| 10,373,611 B2 | 8/2019 | Jeyachandran et al. | |
| 10,417,344 B2 | 9/2019 | Futrell et al. | |
| 10,417,405 B2 | 9/2019 | Cheyer | |
| 10,445,429 B2 * | 10/2019 | Seyed Ibrahim ..... | G06F 40/205 |
| 10,453,443 B2 * | 10/2019 | Kim ........................ | G10L 15/22 |
| 10,474,753 B2 * | 11/2019 | Bellegarda ............. | G06F 40/263 |
| 10,659,850 B2 | 5/2020 | Kirmse et al. | |
| 10,762,152 B2 | 9/2020 | Oztaskent et al. | |
| 10,841,657 B2 | 11/2020 | Trollope et al. | |
| 11,290,773 B1 * | 3/2022 | Robert Jose ........ | G06F 16/7834 |
| 2002/0092021 A1 | 7/2002 | Yap et al. | |
| 2002/0120925 A1 | 8/2002 | Logan | |
| 2003/0093790 A1 | 5/2003 | Logan et al. | |
| 2003/0135490 A1 | 7/2003 | Barrett et al. | |
| 2004/0004599 A1 | 1/2004 | Shepard et al. | |
| 2005/0015491 A1 | 1/2005 | Koeppel | |
| 2005/0059432 A1 | 3/2005 | Choi | |
| 2006/0004871 A1 | 1/2006 | Hayama et al. | |
| 2006/0036462 A1 | 2/2006 | King et al. | |
| 2006/0100987 A1 | 5/2006 | Leurs | |
| 2007/0130580 A1 | 6/2007 | Covell et al. | |
| 2007/0244902 A1 | 10/2007 | Seide et al. | |
| 2008/0016046 A1 | 1/2008 | Guha | |
| 2008/0086742 A1 | 4/2008 | Aldrey et al. | |
| 2008/0148320 A1 | 6/2008 | Howcroft | |
| 2008/0154870 A1 | 6/2008 | Evermann et al. | |
| 2008/0270449 A1 | 10/2008 | Gossweiler et al. | |
| 2008/0275764 A1 | 11/2008 | Wilson et al. | |
| 2008/0306807 A1 | 12/2008 | Amento et al. | |
| 2009/0055385 A1 | 2/2009 | Jeon et al. | |
| 2009/0083281 A1 | 3/2009 | Sarig et al. | |
| 2009/0254823 A1 | 10/2009 | Barrett | |
| 2011/0063503 A1 | 3/2011 | Brand et al. | |
| 2011/0066961 A1 | 3/2011 | Wang et al. | |
| 2011/0078020 A1 | 3/2011 | LaJoie et al. | |
| 2011/0078729 A1 | 3/2011 | LaJoie et al. | |
| 2011/0137920 A1 | 6/2011 | Cohen et al. | |
| 2011/0173194 A1 | 7/2011 | Sloo et al. | |
| 2011/0218946 A1 | 9/2011 | Stern et al. | |
| 2011/0238754 A1 | 9/2011 | Dasilva et al. | |
| 2011/0246383 A1 | 10/2011 | Gibson et al. | |
| 2011/0246495 A1 | 10/2011 | Mallinson | |
| 2011/0247042 A1 | 10/2011 | Mallinson | |
| 2011/0273455 A1 | 11/2011 | Powar et al. | |
| 2011/0289532 A1 | 11/2011 | Yu et al. | |
| 2012/0117057 A1 | 5/2012 | Adimatyam et al. | |
| 2012/0131060 A1 | 5/2012 | Heidasch | |
| 2012/0150907 A1 | 6/2012 | Chowdhury et al. | |
| 2012/0189273 A1 | 7/2012 | Folgner et al. | |
| 2012/0191231 A1 | 7/2012 | Wang | |
| 2012/0278331 A1 | 11/2012 | Campbell et al. | |
| 2012/0311074 A1 | 12/2012 | Arini et al. | |
| 2012/0311624 A1 | 12/2012 | Oskolkov et al. | |
| 2013/0006627 A1 | 1/2013 | Guthery et al. | |
| 2013/0031162 A1 | 1/2013 | Willis et al. | |
| 2013/0104172 A1 | 4/2013 | Lee et al. | |
| 2013/0111514 A1 | 5/2013 | Slavin et al. | |
| 2013/0144603 A1 | 6/2013 | Lord et al. | |
| 2013/0149689 A1 | 6/2013 | DeGross | |
| 2013/0160038 A1 | 6/2013 | Slaney et al. | |
| 2013/0170813 A1 | 7/2013 | Woods et al. | |
| 2013/0173796 A1 | 7/2013 | Grab et al. | |
| 2013/0185711 A1 | 7/2013 | Morales | |
| 2013/0198642 A1 | 8/2013 | Carney et al. | |
| 2013/0291019 A1 | 10/2013 | Burkitt et al. | |
| 2013/0311408 A1 | 11/2013 | Bagga et al. | |
| 2013/0325869 A1 | 12/2013 | Reiley et al. | |
| 2013/0326406 A1 | 12/2013 | Reiley et al. | |
| 2014/0067825 A1 | 3/2014 | Oztaskent et al. | |
| 2014/0089424 A1 | 3/2014 | Oztaskent et al. | |
| 2014/0161416 A1 | 6/2014 | Chou et al. | |

(56) References Cited

U.S. PATENT DOCUMENTS

| | | |
|---|---|---|
| 2014/0200888 A1 | 7/2014 | Liu et al. |
| 2014/0255003 A1 | 9/2014 | Abramson |
| 2014/0280686 A1 | 9/2014 | Herlein |
| 2014/0280879 A1 | 9/2014 | Skolicki |
| 2014/0280983 A1 | 9/2014 | Paluch et al. |
| 2014/0297633 A1 | 10/2014 | Brooks et al. |
| 2015/0012840 A1 | 1/2015 | Maldari et al. |
| 2015/0067061 A1 | 3/2015 | Poston |
| 2015/0149482 A1 | 5/2015 | Finkelsetein et al. |
| 2015/0170325 A1 | 6/2015 | Abecassis et al. |
| 2015/0229982 A1 | 8/2015 | Scott |
| 2015/0339382 A1 | 11/2015 | Skolicki |
| 2015/0347903 A1 | 12/2015 | Saxena et al. |
| 2015/0356102 A1 | 12/2015 | Cohen et al. |
| 2016/0037222 A1 | 2/2016 | Lewis et al. |
| 2016/0042766 A1 | 2/2016 | Kummer |
| 2016/0154887 A1 | 6/2016 | Zhao |
| 2016/0203112 A1 | 7/2016 | Asamani et al. |

FOREIGN PATENT DOCUMENTS

| | | |
|---|---|---|
| CN | 101464881 | 6/2009 |
| CN | 101499915 | 8/2009 |
| CN | 102419945 | 4/2012 |
| CN | 103748897 | 4/2014 |
| EP | 2023578 | 2/2009 |
| EP | 2464107 | 6/2012 |
| EP | 2515505 | 10/2012 |
| WO | WO 200103008 | 1/2001 |
| WO | WO 2005045806 | 5/2005 |
| WO | WO 2011069035 | 6/2011 |
| WO | WO 2012166739 | 12/2012 |
| WO | WO 2013037081 | 3/2013 |
| WO | WO 2014035554 | 3/2014 |
| WO | WO 2015196115 | 12/2015 |

OTHER PUBLICATIONS

Examination Report dated Jul. 23, 2018 in EP Patent Application No. 15744395.3.
Examination Report dated Oct. 16, 2020 in EP Patent Application No. 19189325.4.
Extended European Search Report dated Aug. 29, 2019 in EP Patent Application No. 19189325.4.
Extended European Search Report dated Oct. 15, 2020 in EP Patent Application No. 20183106.2.
International Search Report and Written Opinion dated Jan. 30, 2017 in International Patent Application No. PCT/US2016/062586.
International Search Report and Written Opinion dated Mar. 2, 2017 in International Patent Application No. PCT/US2017/014737.
International Search Report and Written Opinion dated Oct. 6, 2015 in International Patent Application No. PCT/US2015/036756.
International Search Report and Written Opinion dated Oct. 6, 2015 in International Patent Application No. PCT/US2015/036819.
Notice of Allowance dated Jan. 7, 2020 in U.S. Appl. No. 15/826,258.
Notice of Allowance dated Jan. 15, 2020 in U.S. Appl. No. 16/240,608.
Notice of Allowance dated Mar. 15, 2021 in U.S. Appl. No. 16/847,224.
Notice of Allowance dated Apr. 27, 2020 in U.S. Appl. No. 15/727,473.
Notice of Allowance dated Jun. 26, 2017 in U.S. Appl. No. 14/311,211.
Notice of Allowance dated Aug. 1, 2017 in U.S. Appl. No. 14/311,218.
Notice of Allowance dated Nov. 23, 2018 in U.S. Appl. No. 14/488,213.
Notice of Allowance dated Dec. 6, 2017 in U.S. Appl. No. 14/311,204.
Notice of Grant dated Oct. 29, 2020 in CN Patent Application No. 201580033369.5.
Office Action dated Jan. 13, 2020 in U.S. Appl. No. 15/727,473.
Office Action dated Feb. 9, 2017 in U.S. Appl. No. 14/311,204.
Office Action dated Feb. 9, 2017 in U.S. Appl. No. 14/311,218.
Office Action dated Mar. 14, 2017 in U.S. Appl. No. 14/311,211.
Office Action dated May 25, 2020 in CN Patent Application No. 201580033370.8.
Office Action dated May 27, 2020 in CN Patent Application No. 201580033369.5.
Office Action dated Jun. 1, 2018 in U.S. Appl. No. 14/488,213.
Office Action dated Jun. 15, 2017 in U.S. Appl. No. 14/311,204.
Office Action dated Jun. 16, 2016 in U.S. Appl. No. 14/311,204.
Office Action dated Jun. 17, 2016 in U.S. Appl. No. 14/311,218.
Office Action dated Jul. 1, 2016 in U.S. Appl. No. 14/488,213.
Office Action dated Jul. 26, 2019 in U.S. Appl. No. 15/826,258.
Office Action dated Jul. 29, 2016 in U.S. Appl. No. 14/311,211.
Office Action dated Sep. 10, 2019 in U.S. Appl. No. 15/826,258.
Office Action dated Sep. 25, 2017 in U.S. Appl. No. 14/488,213.
Office Action dated Sep. 27, 2019 in U.S. Appl. No. 15/727,473.
Office Action dated Sep. 29, 2019 in CN Patent Application No. 201580033370.8.
Office Action dated Oct. 6, 2020 in U.S. Appl. No. 16/847,224.
Office Action dated Oct. 23, 2019 in U.S. Appl. No. 15/727,473.
Office Action dated Oct. 24, 2019 in CN Patent Application No. 201580033369.5.
Office Action dated Dec. 2, 2019 in U.S. Appl. No. 16/240,608.
Summons to Attend Oral Proceedings dated Feb. 21, 2019 in EP Patent Application No. 15733981.3.
Examination Report dated Nov. 9, 2021 in EP Patent Application No. 20183106.2.
Notice of Allowance dated Feb. 1, 2022 in U.S. Appl. No. 16/935,018.
Office Action dated Aug. 4, 2021 in ON Patent Application No. 202011288730.8.
Office Action dated Oct. 1, 2021 in U.S. Appl. No. 16/935,018.
Office Action dated May 25, 2022 in U.S. Appl. No. 16/847,109.

* cited by examiner

Second Client 140

| | Top 5 people by popularity in May 2014 806 / 812-1 | |
|---|---|---|
| 1. | Person 1 | Timestamp 1  [More] 812-2 / 814 |
| 2. | Person 2 | Timestamp 2  [More] 812-3 / 814 |
| 3. | Person 3 | Timestamp 3  [More] 812-4 / 814 |
| 4. | Person 4 | Timestamp 4  [More] 812-5 / 814 |
| 5. | Person 5 | Timestamp 5  [More] 814 |

FIGURE 8B

Second Client 140

You asked:
What was that?

Tap on card or leave idle to confirm query
Swipe card left to cancel query

1702

First Client 102

Position 1 in Television episode
1701-1

Second Client 140

What was that?

Character A: I love you.
Character B: I love you too.

1702

First Client 102

Position 1 in Television episode 1701-1

METHODS AND DEVICES FOR CLARIFYING AUDIBLE VIDEO CONTENT

CROSS-REFERENCE TO RELATED APPLICATIONS

This application is a continuation of U.S. patent application Ser. No. 16/847,224, filed Apr. 13, 2020, which is a continuation of U.S. patent application Ser. No. 16/240,608, filed Jan. 4, 2019, which is a continuation of U.S. patent application Ser. No. 14/488,213, filed Sep. 16, 2014, which is a continuation-in-part of U.S. patent application Ser. No. 14/311,204, filed Jun. 20, 2014, U.S. patent application Ser. No. 14/311,211, filed Jun. 20, 2014 and U.S. patent application Ser. No. 14/311,218, filed Jun. 20, 2014, each of which is hereby incorporated by reference in its entirety.

TECHNICAL FIELD

The present application describes systems and methods for clarifying audible verbal information in video content.

BACKGROUND

While watching a video with audible verbal content, such as a song or spoken dialogue, a user may hear the content unclearly, or even missed hearing the content entirely due to being away for a moment or not paying sufficient attention. If the user wants to hear the content again, the user can rewind the video to the position with the unclear verbal content to re-hear the verbal content, or try to search online for information to clarify the verbal content. Both of these methods are inefficient and/or ineffective. Rewinding the video to re-hear the verbal content lengthens the user's time expended to watch the video and may not cure the problem, as it may be intrinsic characteristics of the verbal content (e.g., an accent) that is making the verbal content unclear. Making the user search for information online distracts the user from the video itself, and may be ineffective, as information on the verbal content may be unavailable for searching by users.

SUMMARY

For audio and video content, users are not currently able to search for, via voice or text input, the words or lyrics heard in such content, and then have these words made distinctly coherent and intelligible, quickly and easily, immediately or very soon after hearing them. The implementations described herein provide and clarify words or lyrics and their context communicated in audio or video to users after they are heard (e.g., immediately). In some implementations, a combination of video, audio and technical matching to subtitles from content is used to determine the words heard and then automatically present them and their context as a result from a query. Thus, the exact words, sentence or lyric communicated in audio or video (e.g., heard during the TV program, movie or in music) may be presented to users, not just the identity or name of the content and its related metadata. Furthermore, as users search and seek clarification about the words in the video or audio content they have watched or heard, additional information on the context or sentiment of the words and/or their source may be provided to the users. Results for user queries about words communicated in a broad range of situations and context may be provided, including but not limited to: lyrics in television show theme songs, songs heard in commercials or playing in the background of movies and television shows, actors conversations, news bulletins, facts read out by newsreaders or politicians, commentators' dialogue, foreign language words (and/or the translation thereof), and foreign place name (and/or the translation thereof). Also, broadcasters' commentary about when new shows or series will start or end, and news about movies launching in cinemas can be identified and presented.

Disambiguating or clarifying words and their context automatically through determining the visual and/or audio content heard, enables viewers to easily search for and have presented to them deciphered and clarified words or lyrics communicated in audio or video content.

As another advantage, the described technologies enable accurate search results; e.g., described implementations potentially allow all television, video-on-demand and music to have words made distinctly coherent and intelligible, quickly and easily, immediately after they are heard.

In addition, the described word clarification features can provide a useful search result even if the words were not spoken or sung by the original speaker or singer. For example, if the song is "covered" (i.e., played by a different artist or band) and is not the original recorded performer, the feature can still provide clarification of the lyrics in the song. Even if the video or audio is live and never previously recorded (e.g., live concert, live sporting event, breaking news), using a combination of audio fingerprinting signals and words matched to subtitles in various databases, clarification can be provided to users.

In addition, the described clarifying or disambiguating features may be integrated with other services in order to provide users of media content additional or supplementary details, such as information from a search in a search engine or enabling users to potentially watch or listen again to the content for which they are seeking clarification.

Another advantage is that information can be obtained for entities related to the words for which clarification is sought. For example, information may be provided for the actor or their character and what he was doing in the scene; the singer and her song's meaning; for sports commentary, the context and stage of the sports event; and for news shows, the source and context of the news story.

Enabling viewers to easily and quickly understand words communicated in audio and video content may also lead users to make use of search engines in new contexts and seek out knowledge from video and music services.

In accordance with some implementations, current content is determined using a combination of techniques. The content may be determined from metadata from an audio or video service (e.g., a broadcaster, a music service, a video content stream provider) identifying what content is playing, or by a detection service through a combination of video, audio and technical matching. The metadata or the result from the content detection service is used to determine the current content via matching to various content identification databases. The user's location within the content is determined via matching the timestamp or the closed captions or subtitles. With the content identified and the users location within it determined, "closed captions" or "subtitles" are automatically compiled and presented to the users from what they have just heard at appropriate and relevant times or when they request it. The context or sentiment of the words, statement or content can be discovered via matching to information available online (e.g., on the World Wide Web).

In accordance with some implementations, a user watches or listens to audio or video content, for example, a movie or music, and does not hear, or needs clarification of, words or lyrics heard in the audio and/or video (e.g., an unclear or inaudible sentence or lyric). In some implementations, the user queries a service (via text, voice or interacting with the user interface in a specific service application), and a result summary (e.g., "subtitles," a text of the transcript, the lyrics text) of the audio just heard is automatically compiled based on the content and presented to the user.

In accordance with some implementations, methods, systems, and computer readable storage media are provided to clarify audible verbal information in video content. A user request to clarify audible verbal information associated with a media content item playing in proximity to a client device is received. The user request includes an audio sample of the media content item and a user query. The audio sample corresponds to a portion of the media content item proximate in time to issuance of the user query. In response to the user request, the media content item and a first playback position in the media content corresponding to the audio sample are identified, in accordance with the first playback position and identity of the media content item, textual information corresponding to the user query is obtained for a respective portion of the media content item, and at least a portion of the textual information is transmitting to the client device.

BRIEF DESCRIPTION OF THE DRAWINGS

FIGS. 8A and 8B are example screenshots in accordance with some implementations.

FIGS. 17A-17B are example screenshots in accordance with some implementations.

Like reference numerals refer to corresponding parts throughout the drawings.

DESCRIPTION OF THE IMPLEMENTATIONS

The methods and systems described herein disclose systems and methods for displaying textual content on a client device to clarify audible verbal content (e.g., dialogue, song lyrics) in media content playing or played on a client device. Such methods and systems provide an effective way for viewers of video content to obtain clarification of audible verbal content that the viewers may have missed or heard unclearly.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1A:
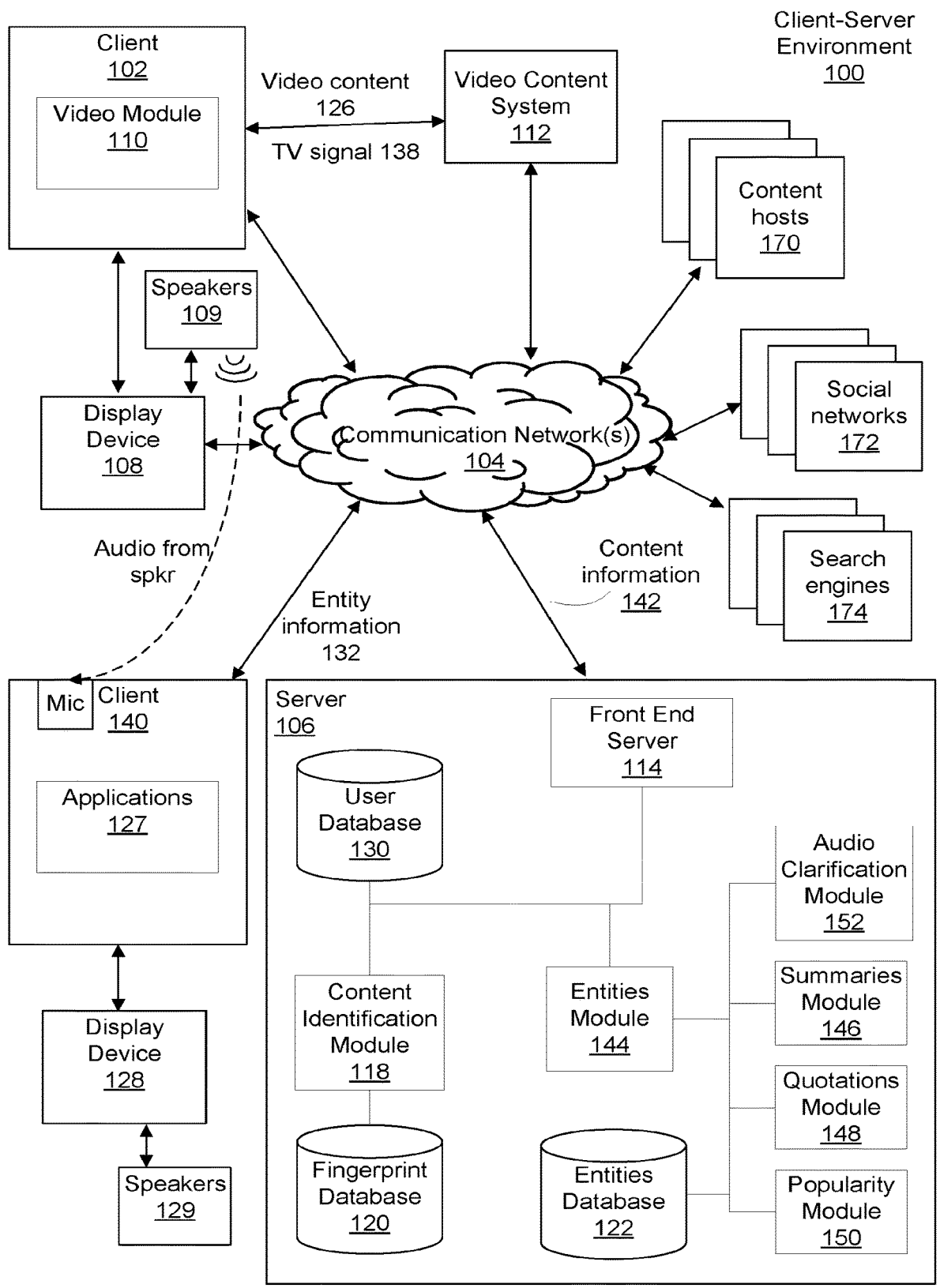
FIGS. 1A-1B are block diagrams illustrating distributed client-server systems in accordance with some implementations.

FIG. 1A is a block diagram illustrating a distributed system 100 that includes: a client device 102, a client device 140, a communication network 104, a server system 106, a video content system 112, one or more content hosts 170, optionally one or more social networks 172, and optionally one or more search engines 174. The server system 106 is coupled to the client device 102, the client device 140, the video content system 112, content hosts 170, social networks 172, and search engines 174 by the communication network 104.

The functionality of the video content system 112 and the server system 106 can be combined into a single server system. In some implementations, the server system 106 is implemented as a single server system, while in other implementations it is implemented as a distributed system of multiple servers. Solely for convenience of explanation, the server system 106 is described below as being implemented on a single server system. In some implementations, the video content system 112 is implemented as a single server system, while in other implementations it is implemented as a distributed system of multiple servers. Solely, for convenience of explanation, the video content system 112 is described below as being implemented on a single server system.

The communication network(s) 104 can be any wired or wireless local area network (LAN) and/or wide area network (WAN), such as an intranet, an extranet, or the Internet. It is sufficient that the communication network 104 provides communication capability between the client devices 102 and 140, the server system 106, the video content system 112, the content hosts 170, the social networks 172, and the search engines 174. In some implementations, the communication network 104 uses the HyperText Transport Protocol (HTTP) to transport information using the Transmission Control Protocol/Internet Protocol (TCP/IP). HTTP permits client devices 102 and 140 to access various resources available via the communication network 104. The various implementations described herein, however, are not limited to the use of any particular protocol.

In some implementations, the server system 106 includes a front end server 114 that facilitates communication between the server system 106 and the network 104. The front end server 114 receives content information 142 from the client 102 and/or the client 140. In some implementations, the content information 142 is a video stream or a portion thereof. In some implementations, the content information 142 is derived from a video stream playing on the client 102 (such as a portion of a video stream playing on the client 102 and one or more fingerprints of that portion). In some implementations, the front end server 114 is configured to send content to a client device 140. In some implementations, the front end server 114 is configured to send content links to content. In some implementations, the front end server 114 is configured to send or receive one or more video streams.

According to some implementations, a video or video stream is a sequence of images or frames representing scenes in motion. A video should be distinguished from an image. A video displays a number of images or frames per second. For example, a video displays 30 consecutive frames per second. In contrast, an image is not associated with any other images.

In some implementations, the server system 106 includes a user database 130 that stores user data. In some implementations, the user database 130 is a distributed database.

In some implementations, the server system 106 includes a content identification module 118 that includes modules to receive content information 142 from the client 102 and/or the client 140, match the content information to a content fingerprint in the fingerprint database 120, and identify the video content (e.g., a "video content item," such as a movie, television series episode, video clip, or any other distinct piece of video content) being presented at the client device 102 based on the matching of the content information and the content fingerprint. In some implementations, the content identification module also identifies the current position in the video content (e.g., the position or how far in the video content is being presented on the client device 102). The identity of the video content and the current position in the video content is passed onto the entities module 144, which identifies one or more entities related to the identified video content in an entities database 122.

In some implementations, the server system 106 includes a fingerprint database 120 that stores content fingerprints. As used herein, a content fingerprint is any type of condensed or compact representation, or signature, of the content of a video stream and/or audio stream and/or subtitles/captions data corresponding to the video stream and/or audio stream. In some implementations, a fingerprint may represent a clip (such as several seconds, minutes, or hours) or a portion of a video stream or audio stream or the corresponding subtitles/captions data. Or, a fingerprint may represent a single instant of a video stream or audio stream or subtitles/captions data (e.g., a fingerprint of single frame of a video or of the audio associated with that frame of video or the subtitles/captions corresponding to that frame of video). Furthermore, since video content changes over time, corresponding fingerprints of that video content will also change over time. In some implementations, the fingerprint database 120 is a distributed database.

In some implementations, the client device 102 includes a video module 110 that receives video content 126 from the video content system 112, extracts content information 142 from video content 126 (e.g., a video stream) that is playing on the client 102 and sends the content information 142 to the server 106.

The client device 102 is any suitable computer device that in some implementations is capable of connecting to the communication network 104, receiving video content (e.g., video streams), extracting information from video content and presenting video content on the display device 108. In some implementations, the client device 102 is a set top box that includes components to receive and present video streams. For example, the client device 102 can be a set top box for receiving cable TV and/or satellite TV, a digital video recorder (DVR), a digital media receiver, a TV tuner, a computer, and/or any other device that outputs TV signals. In some other implementations, the client device 102 is a computer, laptop computer a tablet device, a netbook, a mobile phone, a smartphone, tablet device, a gaming device, a multimedia player device, or any other device that is capable of receiving video content (e.g., as video streams through the network 104). In some implementations, the client device 102 displays a video stream on the display device 108. In some implementations the client device 102 is a conventional TV display that is not connected to the Internet and that displays digital and/or analog TV content via over the air broadcasts or a satellite or cable connection.

In some implementations, the display device 108 can be any display for presenting video content to a user. In some implementations, the display device 108 is the display of a television, or a computer monitor, that is configured to receive and display audio and video signals or other digital content from the client 102. In some implementations, the display device 108 is an electronic device with a central processing unit, memory and a display that is configured to receive and display audio and video signals or other digital content form the client 102. For example, the display device can be a LCD screen, a tablet device, a mobile telephone, a projector, or other type of video display system. The display 108 can be coupled to the client 102 via a wireless or wired connection.

In some implementations, the client device 102 receives video content 126 via a TV signal 138. As used herein, a TV signal is an electrical, optical, or other type of data transmitting medium that includes audio and/or video components corresponding to a TV channel. In some implementations, the TV signal 138 is a terrestrial over-the-air TV broadcast signal or a signal distributed/broadcast on a cable system or a satellite system. In some implementations, the TV signal 138 is transmitted as data over a network connection. For example, the client device 102 can receive video streams from an Internet connection. Audio and video components of a TV signal are sometimes referred to herein as audio signals and video signals. In some implementations, a TV signal corresponds to a TV channel that is being displayed on the display device 108.

In some implementations, the video content 126 is live television content (e.g., first-run television content, live events). In some implementations, the video content 126 is previously shown content (e.g., a re-run shown on a broadcast or non-broadcast channel, a later showing of content to accommodate time zone differences). In some implementations, the video content 126 is recorded content (e.g., content recorded in and played back from a DVR; content fully downloaded to and stored in, and played back from, non-volatile memory). In some implementations, the video content is streaming content (e.g. online video).

The video content 126 includes audible sound or content. The audible sound or content includes audible verbal information or content (e.g., spoken dialogue or speech, music with lyrics), and optionally audible non-verbal information or content (e.g., tones, sound effects, music without lyrics). In some implementations, the audible sound is carried in an audio track in the video content 126. In some implementations, a TV signal carries information for audible sound corresponding to an audio track on a TV channel. In some implementations, the audible sound is produced by speakers associated with the display device 108 or the client device 102 (e.g. speakers 109).

In some implementations, a TV signal carries information or data for subtitles or captions (e.g., closed captions) that correspond to audible verbal information (e.g., spoken speech, spoken monologue and/or dialogue, song lyrics) in the audio track. The subtitles or captions are a textual transcription of verbal information in the video content. The subtitles or captions can be presented concurrently along with the corresponding video content. For convenience, subtitles and captions are hereinafter referred to collectively as "subtitles," and subtitles/captions data as "subtitles data."

The client device 140 may be any suitable computer device that is capable of connecting to the communication network 104, such as a computer, a laptop computer, a tablet device, a netbook, an internet kiosk, a personal digital assistant, a mobile phone, a gaming device, or any other device that is capable of communicating with the server system 106. The client device 140 typically includes one or more processors, non-volatile memory such as a hard disk drive and a display. The client device 140 may also have input devices such as a keyboard and a mouse (as shown in FIG. 3). In some implementations, the client device 140 includes touch screen displays.

In some implementations, the client device 140 is connected to a display device 128. The display device 128 can be any display for presenting video content to a user. In some implementations, the display device 128 is the display of a television, or a computer monitor, that is configured to receive and display audio and video signals or other digital content from the client 128. In some implementations, the display device 128 is an electronic device with a central processing unit, memory and a display that is configured to receive and display audio and video signals or other digital content from the client 140. In some implementations, the display device 128 is a LCD screen, a tablet device, a mobile telephone, a projector, or any other type of video display system. In some implementations, the client device 140 is connected to the display device 128. In some implementations, the display device 128 includes, or is otherwise connected to, speakers capable of producing an audible stream corresponding to the audio component of a TV signal or video stream.

In some implementations, the client device 140 is connected to the client device 102 via a wireless or wired connection. In some implementations where such connection exists, the client device 140 optionally operates in accordance with instructions, information and/or digital content (collectively second screen information) provided by the client device 102. In some implementations, the client device 102 issues instructions to the client device 140 that cause the client device 140 to present on the display 128 and/or the speaker 129 digital content that is complementary, or related to, digital content that is being presented by the client 102 on the display 108. In some other implementations, the server 106 issues instructions to the client device 140 that cause the client device 140 to present on the display 128 and/or the speaker 129 digital content that is complementary, or related to, digital content that is being presented by the client 102 on the display 108.

In some implementations, the client device 140 includes a microphone that enables the client device to receive sound (audio content) from the client 102 as the client 102 plays the video content 126. The microphone enables the client device 102 to store the audio content/soundtrack that is associated with the video content 126 as it is played/viewed. In the same manner as described herein for the client 102, the client device 140 can store this information locally and then send to the server 106 content information 142 that is any one or more of: fingerprints of the stored audio content, the audio content itself, portions/snippets of the audio content, or fingerprints of the portions of the audio content. In this way, the server 106 can identify the video content 126 being played on client 102 even if the electronic device on which the content is being displayed/viewed is not an Internet-enabled device, such as an older TV set; is not connected to the Internet (temporarily or permanently) so is unable to send the content information 142; or does not have the capability to record or fingerprint media information related to the video content 126. Such an arrangement (i.e., where the second screen device 140 stores and sends the content information 142 to the server 106) allows a user to receive from the server 106 second screen content triggered in response to the content information 142 no matter where the viewer is watching TV and information related to the video content 126, such as information related to entities in the video content 126.

In some implementations, the microphone also enables the client device 140 to receive voice inputs from the user. The voice inputs include, for example, commands to perform particular operations, and queries or requests for information or content.

In some implementations, the content information 142 sent to the server 106 from either the client 102 or 140 includes any one or more of: fingerprints of the stored subtitles data, the subtitles data itself, portions/snippets of the subtitles data, or fingerprints of the portions of the subtitles data. In this way, the server 106 can identify the video content 126 being played on the client 102 even if, for example, the volume level on the client 102 is too low for the audio content to be audibly detected by the client device 140, the audio content as output by the client 102 is distorted (e.g., because of poor transmission quality from the video content system 112, because of a lag in processing capability at the client 102), or if the speakers 109 are otherwise not functional.

In some implementations, the client device 140 includes one or more applications 127. As discussed in greater detail herein, the one or more applications 127 receive and present information received from the server 106, such as entities in video content and information about entities in video content (collectively referred to as "entity information" 132). In some implementations, the one or more applications 127 receive and present information related to the audible verbal information within the video content from the server 106. In some implementations, the applications 127 include an assistant application. An assistant application obtains and presents information relevant to the user based on a variety of signals, including, but not limited to, the user's demographic information, the current location of the device and/or the user, the user's calendar, the user's contact list, the user's social network(s), the user's search history, the user's web browsing history, the device's and/or the user's location history, the user's stated preferences, the user's content viewing history, and the content being currently presented to the user.

The server 106 includes an entities database or repository 122. The entities database 122 is a database of entities associated with video content. As used herein, an entity is any distinct existence or thing that is associated with video content. In some implementations, entities include, without limitation, titles, people, places, music, things, products, quotations, and awards. For example, titles include movie titles, series titles (e.g., television series titles), and episode titles (e.g., television episodes titles). People include cast members (e.g., actors), crew members (e.g., director, producer, music composer, etc.), in-story characters, competition contestants, competition judges, hosts, guests, and people mentioned. Places include in-story locations, filming locations, and locations mentioned. Music include songs and compositions used in the video content. Things include in-story objects (e.g., lightsabers in "Star Wars"). Products include any good, service, or item mentioned or shown in video content (e.g., mentioned book, products included in video content due to product placement). Quotations include pieces of spoken dialogue from video content, such as lines and catchphrases spoken by characters or non-fictional people in video content (e.g., "May the Force be with you."). Awards include any awards associated with a piece of video content and its entities (e.g., best actor, best director, best song, etc.). It should be appreciated that these examples are non-exhaustive and other categories of entities are possible.

In some implementations, the entities database 122 also includes a graph network that indicates associations between entities. For example, a movie entity (e.g., the movie title entity as the entity representing to the movie) is linked to its cast member entities, crew member entities, in-story location entities, quotation entities, and so on. The graph network is implemented using any suitable data structure.

In some implementations, the entities database 122 also includes information regarding when an entity appears, is mentioned, or is said (e.g., in the case of a quotation) in a video content item. For example, for a movie entity, the entities database 122 stores information on, for example, when particular characters or cast members appear (e.g., are actually on-screen), is in the active scene even if not on-screen for entire duration of the active scene) in the movie. Such information may be stored as time ranges within the video content item (e.g., a time range of 22:30-24:47 means that a character or cast member appears in the video content item from the 22 minutes 30 seconds mark to the 24 minutes 47 seconds mark). Similarly, the entities database 122 stores information on when in a video content item a place appears or is mentioned, when a song or composition is played, when a quotation is spoken, when a thing appears or is mentioned, when a product appears or is mentioned, and so forth.

In some implementations, entities in the entities database 122 are also associated with non-entities outside of the entities database. For example, a person entity in the entities database 122 may include links to web pages of news stories associated with the person.

In some implementations, the server 106 also includes textual information corresponding to audible verbal information in video content. The textual information is displayable information, in written textual form, corresponding to audible verbal information in video content. Textual information includes, for example, transcription of spoken speech (e.g., dialogue, monologue, etc.) in a video, lyrics of a song sung in a video, and translations and/or romanizations of the spoken speech or the lyrics. Sources of textual information include, for example, subtitles data and online documents (e.g., web pages and other documents hosted by content hosts 170, lyrics database hosted by a content host 170).

In some implementations, the server 106 stores textual information, and links to sources of textual information (e.g., link to a document hosted at a content host 170), in the entities database 122. Within the entities database 122, respective textual information and the corresponding sources may be associated with respective entities (e.g., the person who sung the lyrics, the person who spoke the speech, the movie or television series in which the song or speech was sung or spoken). In some other implementations, the textual information and the links to the sources thereof are stored in a separate database or repository (not shown) in the server 106. Respective textual information and corresponding sources in the separate database/repository may be associated with respective entities in the entities database 122. For sake of convenience, the description below assumes that the textual information and the links to the sources thereof are stored in the entities database 122.

In some implementations, the server 106 includes an entities module 144, summaries module 146, quotations module 148, popularity module 150, and an audio clarification module 152. The entities module 144 identifies and extracts entities related to video content and stores the extracted entities in the entities database 122. In some implementations, the entities module 144 extracts entities related to video content from video content (e.g., from content information 142) and from other sources (e.g., web pages hosted by content hosts 170). In some implementations, the entities module 144 also selects one or more entities from the entities database 122 and provides them to the front end server 114, for sending to a client device (e.g., client device 140) for presentation.

The summaries module 146 generates summaries of video content. A summary, as used herein, is a listing of entities associated with video content (e.g., entities that appear or are mentioned in video content). In some implementations, entities included in a summary are entities associated with a video content item that are determined to be popular in the aggregate based on one or more popularity criteria, further details of which are described below; the summary is generated with respect to a video content item and is not personalized to a particular user. In some implementations, entities included a summary are entities associated with a video content item that are determined to be popular in the aggregate as well as with a particular user; the summary is generated with respect to a video content item and is personalized to a particular user. In some implementations, entities included in a summary are entities associated with video content (but not necessarily all associated with the same video content item) that are determined to be popular in the aggregate for a defined time period (e.g., a certain month, a certain day, a certain week, particular hours (e.g., "prime time" hours) in a certain day, etc.); the summary is generated not with respect to a particular video content item.

The quotations module 148 identifies quotations in video content. Video content has numerous spoken dialogue. However, not all lines or phrases of spoken dialogue are interesting or popular or well-known or invocative of particular titles or people. The quotation module 148, in some implementations in conjunction with a popularity module 150, determines which lines or phrases of spoken dialogue (i.e., quotations) are popular or well-known or so forth (e.g., based on, for example, online mentions and sharing, etc.), and thus stored as distinct entities in the entities database 122. The quotations module 148 analyzes non-video content, such as documents (e.g., web pages) and social networks, hosted by content hosts 170 and social networks 172, to determine which lines and phrases of spoken dialogue in video content are being shared, mentioned, or commented upon, and thus deserve distinction as a distinct quotation entity.

The popularity module 150 determines the popularity of entities based on one or more criteria. In some implementations, the popularity module 150 determines popularity in real-time (e.g., popularity within the last hour) as well as historical popularity or popularity over a longer time horizon (e.g., popularity year-to-date, popularity all-time, etc.).

The distributed system 100 also includes one or more content hosts 170, one or more social networks 172, and one or more search engines 174. The content hosts 170 hosts content that can be used to determine popularity of entities, such as web pages where entities may be mentioned and commented upon. Similarly, social networks 172 also includes content in which entities may be mentioned and commented upon (e.g., in user comments and posts). Further, in the social networks 172, content may be shared, which provides another metric for popularity of entities. Search engines 174 may receive queries corresponding to entities from the client devices 102 or 140, and return related information.

In some implementations, the server 106 includes an audio clarification module 152. The audio clarification module 152 identifies audible verbal information in video content and obtains corresponding textual information (e.g., transcription, translation, romanization) from various sources, including subtitles data associated with the video content and online documents. The audio clarification module 152 stores the textual information and/or links to the sources in the entities database 122. In some implementations, the textual information is generated by the server 106 from the audible verbal information. For example, the audible verbal information may be processed by a speech recognition module (not shown) to convert speech in the audible verbal information to text. In some implementations, textual information is further processed to generate additional textual information. For example, a transcription of speech, obtained from subtitles data, may be translated by a machine translation module (not shown) to generate a translation of the transcription. In some implementations, the audio clarification module 152 identifies audible verbal information and the corresponding textual information based on the identity of the video content and a position in the video content; by knowing what the video content is and the position in the video content (e.g., how many minutes into the video), the audible verbal information and the corresponding textual information may be obtained (e.g., obtaining subtitles synchronized to that position in the video content).

In some implementations, the front end server 114 receives a user request, from the client device 140, that includes content information 142 corresponding to a video being played on the client device 102 and whose audio content is picked up by the client deice 140. The user request is a request to clarify the audible verbal information in the audio content. The video is identified based on the content information 142, and textual information responsive to the request is identified and sent to the client device 140 for presentation.

Figure 1B:
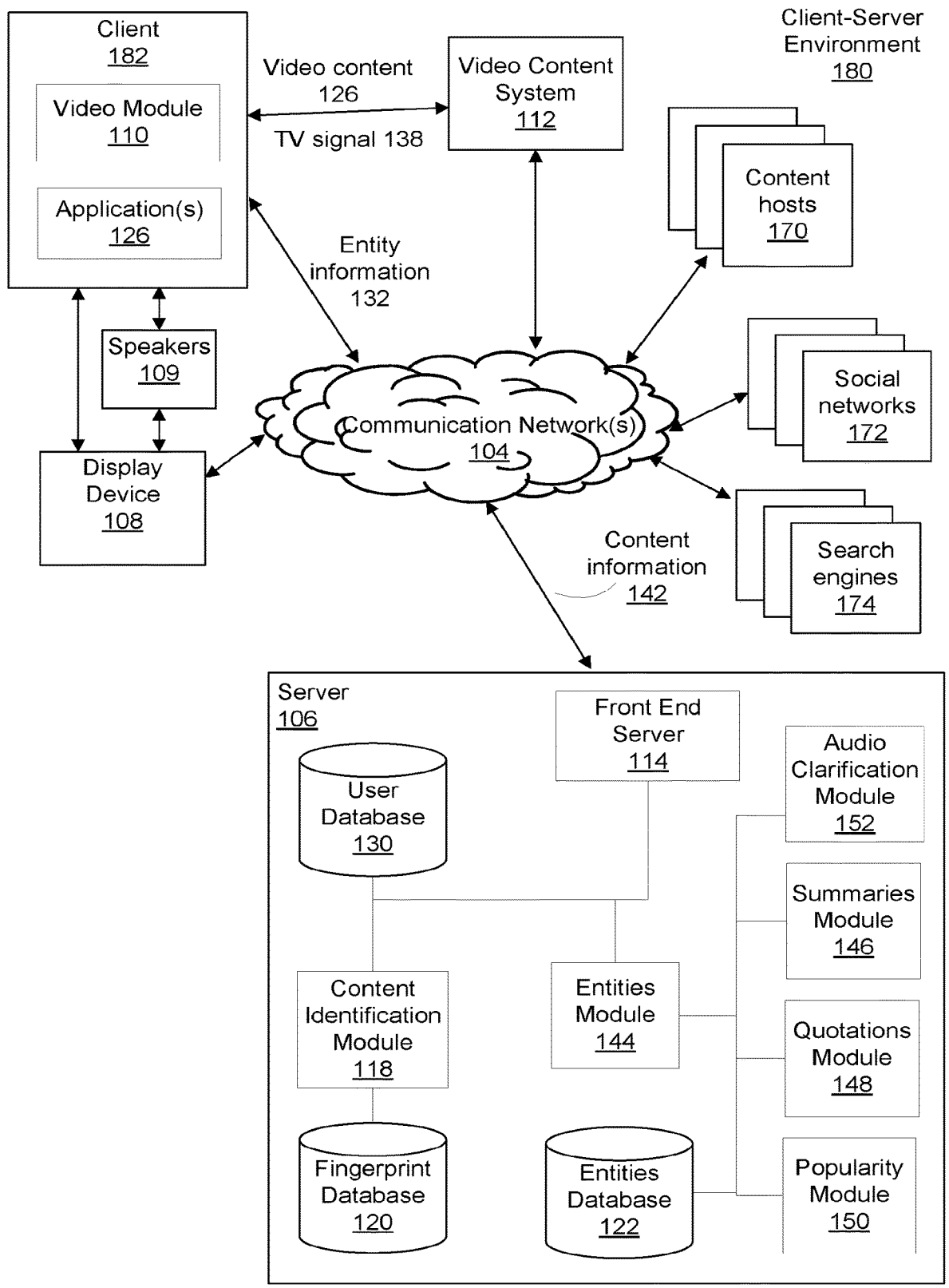

FIG. 1B depicts a distributed system 180 that is similar to the distributed system 100 depicted in FIG. 1A. In FIG. 1B, the features and components of client devices 102 and 140 (FIG. 1A) are subsumed into a client device 182. In the distributed system 180, the client device 182 device receives and presents the video content 126. The client device 182 sends the content information 142 to the server 106. The server 106 identifies the video content and sends entity information 132 to the client device 182 for presentation. In other aspects, the distributed system 180 is same as or similar to the distributed system 100. Thus, the details are not repeated here.

Figure 2:
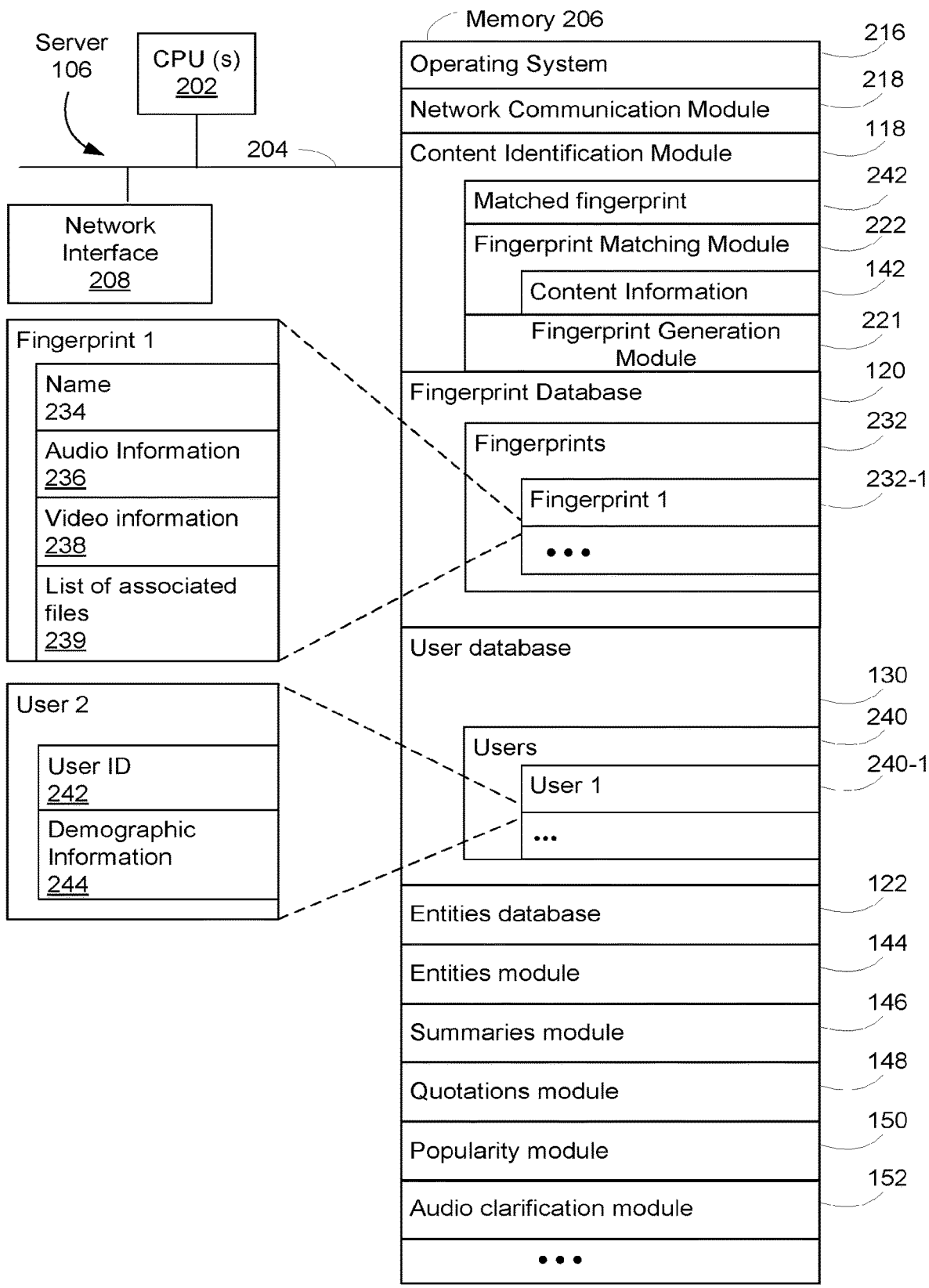
FIG. 2 is a block diagram illustrating the structure of an example server system according to some implementations.

FIG. 2 is a block diagram illustrating a server system 106, in accordance with some implementations. The server system 106 typically includes one or more processing units (CPU's) 202, one or more network or other communications interfaces 208, memory 206, and one or more communication buses 204 for interconnecting these components. The communication buses 204 optionally include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, including the non-volatile and volatile memory device(s) within memory 206, comprises a non-transitory computer readable storage medium. In some implementations, memory 206 or the non-transitory computer readable storage medium of memory 206 stores the following programs, modules and data structures, or a subset thereof including an operation system 216, a network communication module 218, a content identification module 118, a fingerprint database 120, an entities database 122, a user database 130, an entities module 144, a summaries module 146, a quotations module 148, and a popularity module 150.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the Internet, other wide area networks, local area networks, metropolitan area networks, and so on.

The fingerprint database 120 stores one or more content fingerprints 232. A fingerprint 232 includes a name 234, fingerprint audio information 236 and/or fingerprint video information 238, and a list of associated files 239. The name 234 identifies the respective content fingerprint 232. For example, the name 234 could include the name of an associated television program, movie, or advertisement. In some implementations, the fingerprint audio information 236 includes a fingerprint or other compressed representation of a clip (such as several seconds, minutes, or hours) of the audio content of a video stream or an audio stream. In some implementations, the fingerprint video information 238 includes a fingerprint of a clip (such as several seconds, minutes, or hours) of a video stream. In some implementations, the fingerprint 232 includes a fingerprint or other representation of a portion of the subtitles data of a video stream. Fingerprints 232 in the fingerprint database 120 are periodically updated.

The user database 124 includes user data 240 for one or more users. In some implementations, the user data for a respective user 240-1 includes a user identifier 242 and demographic information 244. The user identifier 242 identifies a user. For example, the user identifier 242 can be an IP address associated with a client device 102 or an alphanumeric value chosen by the user or assigned by the server that uniquely identifies the user. The demographic information 244 includes the characteristics of the respective user. The demographic information may include may be one or more of the group consisting of age, gender, income, geographic location, education, wealth, religion, race, ethic group, marital status, household size, employment status, and political party affiliation. In some implementations, the user data for a respective user also includes one or more of the following: a search history (e.g., search queries the user has submitted to search engines), a content browsing history (e.g., web pages viewed by the user), and a content consumption history (e.g., videos the user has viewed).

The content identification module 118 receives content information 142 from the client 102 or 140, and identifies the video content being presented at the client 102 or 140. The content identification module 118 includes a fingerprint matching module 222. In some implementations, the content identification module 118 also includes a fingerprint generation module 221, which generates fingerprints from the content information 142 or other media content saved by the server.

The fingerprint matching module 222 matches at least a portion of the content information 142 (or a fingerprint of the content information 142 generated by the fingerprint generation module) to a fingerprint 232 in the fingerprint database 120. The matched fingerprint 242 is sent to the entities module 144, which retrieves the entities associated with the matched fingerprint 242. The fingerprint matching module 222 includes content information 142 received from the client 102. The content information 142 includes audio information 224, video information 226, a user identifier 229, and optionally subtitles data (not shown). The user identifier 229 identifiers a user associated with the client 102 or 140. For example, the user identifier 229 can be an IP address associated with a client device 102 or an alphanumeric value chosen by the user or assigned by the server that uniquely identifies the user. In some implementations, the content audio information 224 includes a clip (such as several seconds, minutes, or hours) of a video stream or audio stream that was played on the client device 102. In some implementations, the content video information 226 includes a clip (such as several seconds, minutes, or hours) of a video stream that was played on the client device 102.

The entities database 122 includes entities associated with video content. The entities database 122 is further described below, with reference to FIG. 4.

The entities module 144 selects entities from the entities database that are associated with a video content item, based on the matched fingerprint 242 or other criteria. The selected entities may be a subset of the entities referenced in the matched fingerprint 242 (e.g., the entities module 144 selects the most popular of the entities referenced in the matched fingerprint 242).

The summaries module 146 generates summaries of video content. The summaries include entities in a video content item that are popular with respect to a video content item or with respect to a defined time period.

The quotations module 148 identifies quotations in video content from the video content themselves (e.g., using the subtitles data) and from non-video content (e.g., mentions, shares, and commentary on quotations in web pages and social networks).

The popularity module 150 determines and updates the popularities of entities in the entities database 122.

The audio clarification module 152 identifies audible verbal information in video content and obtains textual information corresponding to the audible verbal information.

In some implementations, the summaries module 146, quotations module 148, and popularity module 150 are sub-modules of entities module 144.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., content identification module 118) need not be implemented as separate software programs, procedures or modules, and thus various subsets of these modules may be combined or otherwise re-arranged in various implementations. In some implementations, memory 206 may store a subset of the modules and data structures identified above. Furthermore, memory 206 may store additional modules and data structures not described above.

Although FIG. 2 shows a server system, FIG. 2 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 216 and network communication module 218) shown separately in FIG. 2 could be implemented on single servers and single items could be implemented by one or more servers. The actual number of servers used to implement the server system 106 and how features are allocated among them will vary from one implementation to another, and may depend in part on the amount of data traffic that the system must handle during peak usage periods as well as during average usage periods.

Figure 3A:
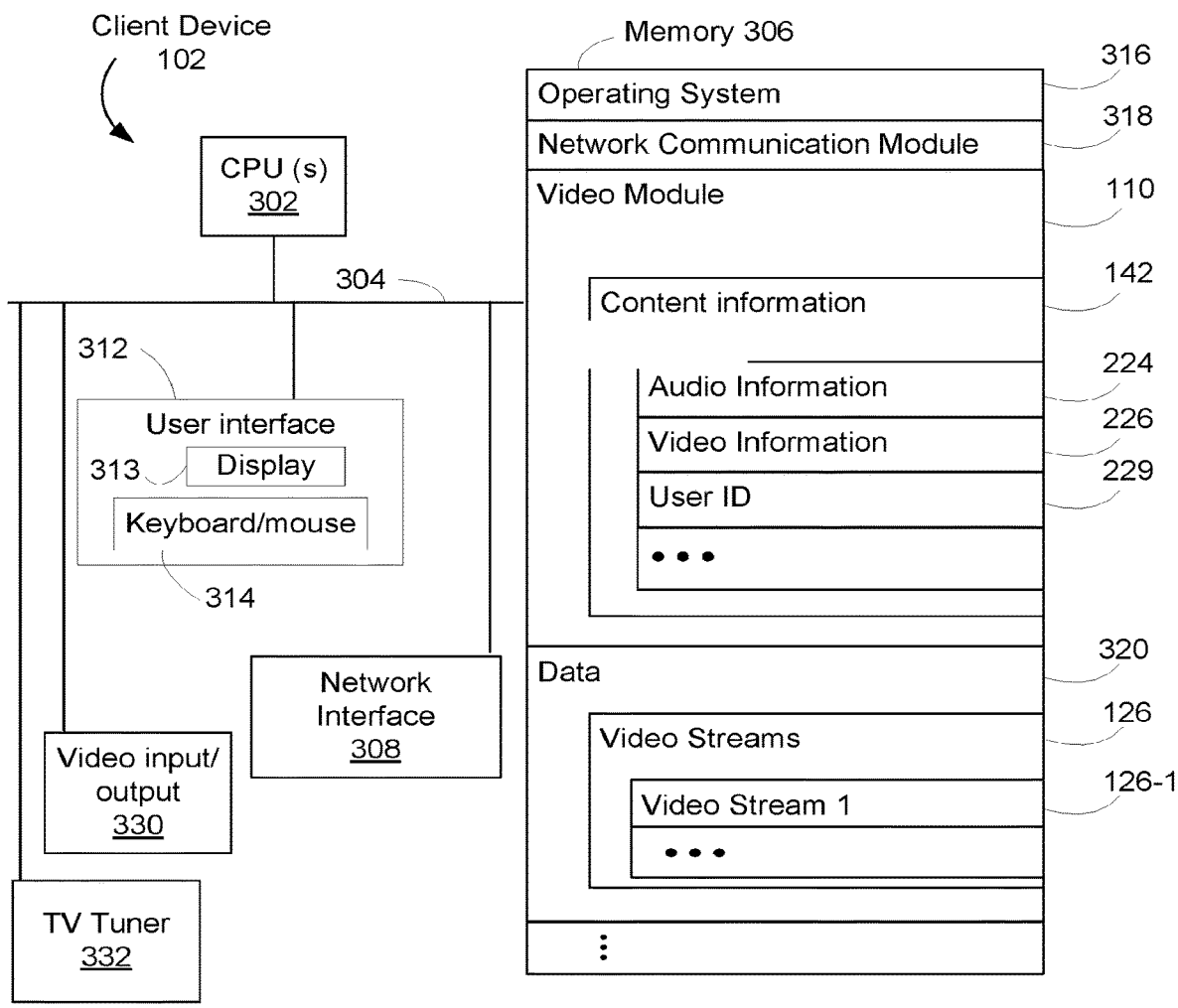
FIG. 3A is a block diagram illustrating the structure of an example client device according to some implementations.

FIG. 3A is a block diagram illustrating a client device 102, in accordance with some implementations. The client device 102 typically includes one or more processing units (CPU's) 302, one or more network or other communications interfaces 308, memory 306, and one or more communication buses 304, for interconnecting these components. The communication buses 304 optionally include circuitry (sometimes called a chipset) that interconnects and controls communications between system components. The client device 102 may also include a user interface comprising a display device 313 and a keyboard and/or mouse (or other pointing device) 314. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within memory 306, comprises a non-transitory computer readable storage medium. In some implementations, memory 306 or the computer readable storage medium of memory 306 store the following programs, modules and data structures, or a subset thereof including operation system 316, network communication module 318, a video module 110 and data 320.

The client device 102 includes a video input/output 330 for receiving and outputting video streams. In some implementations, the video input/output 330 is configured to receive video streams from radio transmissions, satellite transmissions and cable lines. In some implementations the video input/output 330 is connected to a set top box. In some implementations, the video input/output 330 is connected to a satellite dish. In some implementations, the video input/output 330 is connected to an antenna. In some implementations, the client device 102 receives the video stream through the network interface 308 (e.g., receiving the video stream through the Internet), as opposed to through a video input.

In some implementations, the client device 102 includes a television tuner 332 for receiving video streams or TV signals.

The operating system 316 includes procedures for handling various basic system services and for performing hardware dependent tasks.

The network communication module 318 facilitates communication with other devices via the one or more communication network interfaces 308 (wired or wireless) and one or more communication networks, such as the Internet, other wide area networks, local area networks, metropolitan area networks, and so on.

The data 320 includes video streams 126.

The video module 126 derives content information 142 from a video stream 126. In some implementations, the content information 142 includes audio information 224, video information 226, a user identifier 229 or any combination thereof. The user identifier 229 identifies a user of the client device 102. For example, the user identifier 229 can be an IP address associated with a client device 102 or an alphanumeric value chosen by the user or assigned by the server that uniquely identifies the user. In some implementations, the audio information 224 includes a clip (such as several seconds, minutes, or hours) of a video stream or audio stream. In some implementations, the video information 226 may include a clip (such as several seconds, minutes, or hours) of a video stream. In some implementations, the content information 142 includes subtitles data corresponding to the video stream. In some implementations, the video information 226 and audio information 224 are derived from a video stream 126 that is playing or was played on the client 102. The video module 126 may generate several sets of content information 142 for a respective video stream 346.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3A shows a client device, FIG. 3A is intended more as functional description of the various features which may be present in a client device than as a structural schematic of the implementations described herein. In practice, and as recognized by those of ordinary skill in the art, items shown separately could be combined and some items could be separated.

Figure 3B:
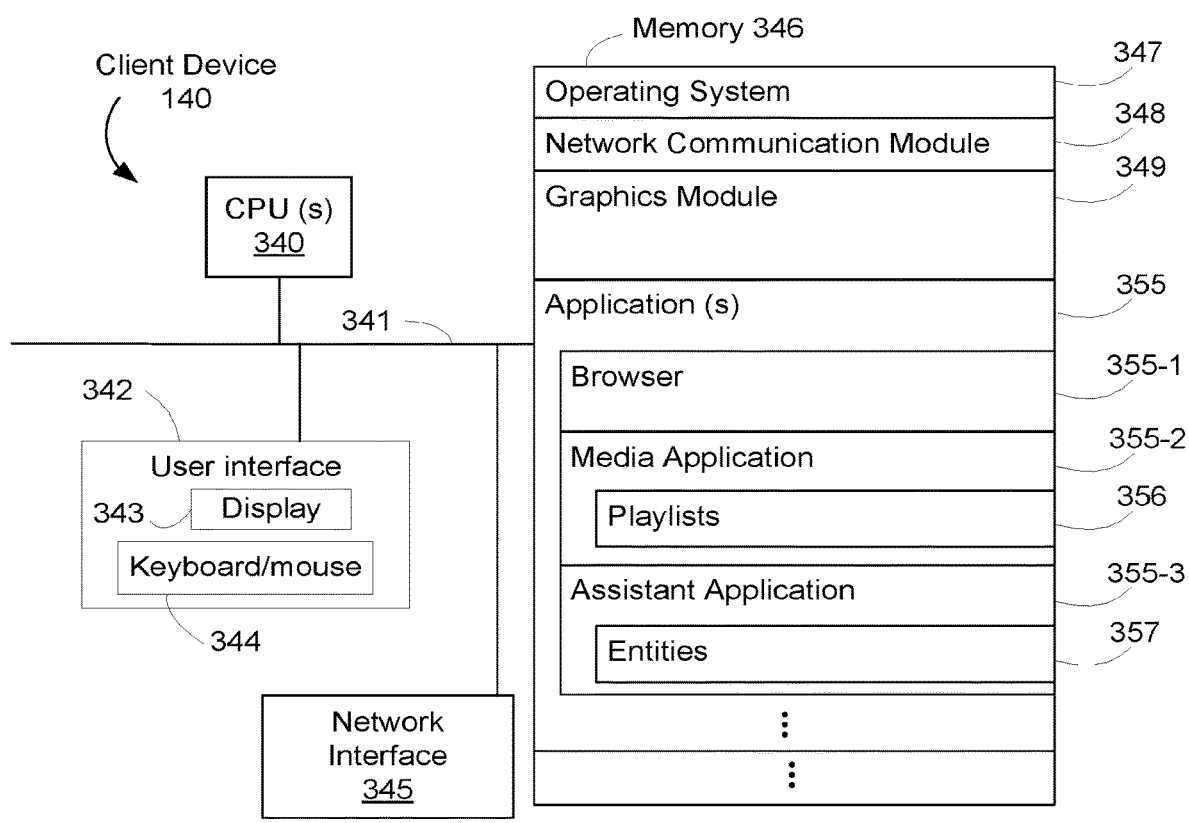
FIG. 3B is a block diagram illustrating the structure of an example client device according to some implementations.

FIG. 3B is a block diagram illustrating a client device 140, in accordance with some implementations. The client device 140 typically includes one or more processing units (CPU's) 340, one or more network or other communications interfaces 345, memory 346, and one or more communication buses 341, for interconnecting these components. The communication buses 341 optionally include circuitry (sometimes called a chipset) that interconnects and controls communications between system components. The client device 140 may also include a user interface comprising a display device 343 and a keyboard and/or mouse (or other pointing device) 344. Memory 346 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 346 may optionally include one or more storage devices remotely located from the CPU(s) 340. Memory 346, or alternatively the non-volatile memory device(s) within memory 346, comprises a non-transitory computer readable storage medium. In some implementations, memory 346 or the computer readable storage medium of memory 346 store the following programs, modules and data structures, or a subset thereof including operation system 347, network communication module 348, graphics module 349, and applications 355.

The operating system 347 includes procedures for handling various basic system services and for performing hardware dependent tasks.

The network communication module 348 facilitates communication with other devices via the one or more communication network interfaces 345 (wired or wireless) and one or more communication networks, such as the Internet, other wide area networks, local area networks, metropolitan area networks, and so on.

The client device 140 includes one or more applications 355. In some implementations, the applications 355 include a browser application 355-1, a media application 355-2, and an assistant application 355-3. The browser application 355-1 displays web pages. The media application 355-2 plays videos and music, displays images and manages playlists 356. The assistant application (which may also be referred to as an "intelligent personal assistant" application) 355-3 displays information that is relevant to the user at the moment (e.g., entities 357, provided by the server 106, related to the video the user is watching; upcoming appointments; traffic on a route to be travelled) and perform tasks or services relevant to the user or requested by the user (e.g., sending alerts to notify friends of tardiness to a dinner appointment, schedule updating, calling the restaurant). The applications 328 are not limited to the applications discussed above.

Each of the above identified elements may be stored in one or more of the previously mentioned memory devices, and each of the modules or programs corresponds to a set of instructions for performing a function described above. The set of instructions can be executed by one or more processors (e.g., the CPUs 340). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3B shows a client device, FIG. 3B is intended more as functional description of the various features which may be present in a client device than as a structural schematic of the implementations described herein. In practice, and as recognized by those of ordinary skill in the art, items shown separately could be combined and some items could be separated.

Figure 4:
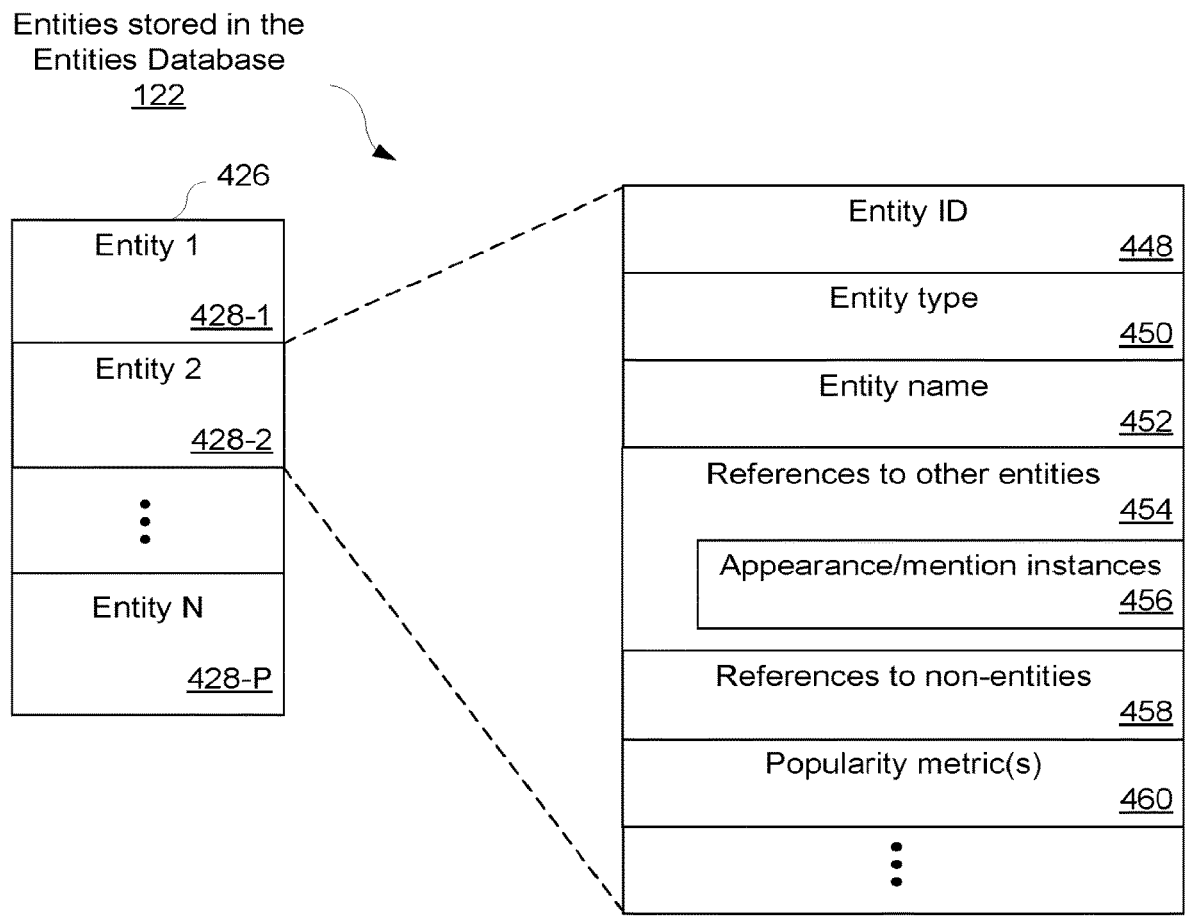
FIG. 4 illustrates an example data structure according to some implementations.

FIG. 4 illustrates entities data structures 426 stored in the entities database 122, according to some implementations. A respective entity 428 includes a entity identifier (entity ID) 448, entity type 450, entity name 452, references to other entities 454, references to non-entities 458, popularity metrics 460, and optionally, additional information. In some implementations, the entity ID 448 uniquely identifies a respective entity 428. The entity type 450 identifies the type of the entity 428. For example, the entity type 450 for a respective entity 428 in the entities database 122 indicates that the respective entity 428 is a title, person, place, music, thing, product, quotation, and award. In some implementation, the entity type 450 also indicates sub-types (e.g., for people, cast or crew or character or contestant or judge or host or guest or mentioned person). The entity name 452 names the entity. For example, the entity name, depending on the entity, is the title of the movie or television show, person name, place name, song or composition name, name of a thing, a product name, the actual words of a quotation, or the award name. References to other entities 454 indicate references to other entities 428 (e.g., by their entity IDs 448). For example, an entity 428 corresponding to a movie title includes references 454 to the movie's cast members, crew members, characters, places, and so on. A quotation entity includes references to the video content (movie, televisions show, etc.) in which the quotation is spoken, and the person (actor, character, etc.) who spoke the quotation in the video content. When appropriate, the references to other entities include data on instances 456 when the other entities appear or are mentioned. For example, the instances 456 data for a movie title entity include time ranges for when a cast member or a character appears, or when a product is mentioned, and so on. References to non-entities 458 include references to content not stored as entities in the entities database 122 that are nevertheless related to the entity 428 (e.g., links to web pages mentioning the entity). The popularity metrics 460 provide a measure of the importance of an entity file 428. In some implementations, the metrics 460 are determined by the popularity module 150. In some implementations, the popularity metrics include both historical and real-time popularity.

Displaying Quotations

Figure 5:
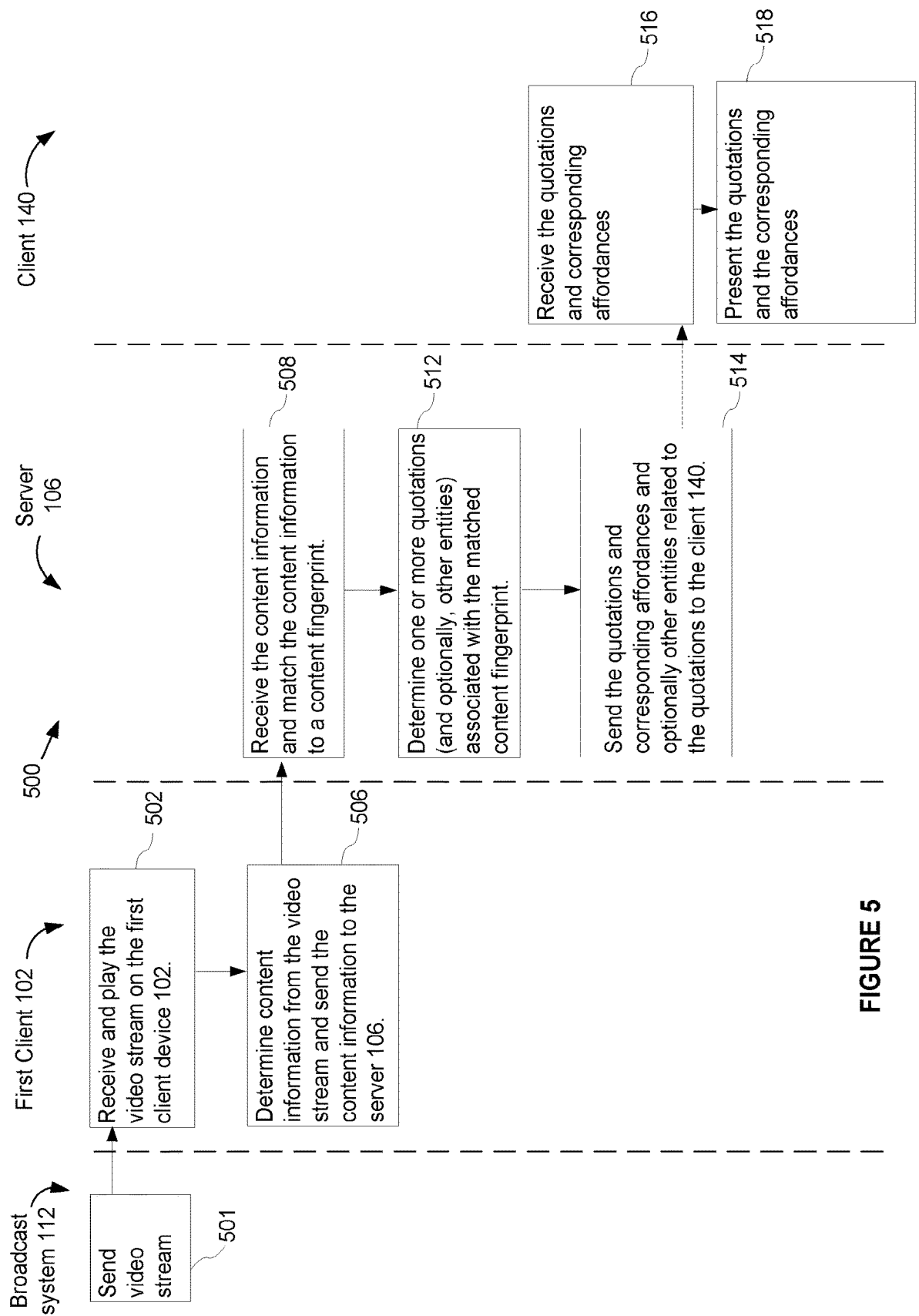
FIG. 5 is a flowchart illustrating an overview of the process of displaying quotations content on a second device that is related to the content playing on a first device, in accordance with some implementations.

FIG. 5 is a flow diagram illustrating a process 500 of displaying quotations content on a second device that is related to the content played on a first device, according to some implementations. FIG. 5 provides an overall view of methods 1000 and 1100 which is discussed in more detail in the discussion of FIGS. 10A-11. A video content system 112 sends a video stream to a client 102 (501). The video stream is received and displayed by the client device 102 (502). While the video stream is played, content information from the video stream is determined and sent to a server 106 (506). As described elsewhere in this application, in some implementations the content information from the video stream includes one or more clips (such as several seconds, minutes or hours) of audio and/or video components of the video stream or the corresponding subtitles data, or fingerprints or other signatures generated by the client device 102 from one or more clips of the audio and/or video components of the video stream and/or the corresponding subtitles data. In some implementations, the content information is formatted so it can be readily compared to content fingerprints stored on the server. The server 106 receives the content information and matches the content information to a content fingerprint (508).

In some implementations, while the video stream is played, the client device 140 determines content information from the audio output, from the client device 102, corresponding to the audio component of the video stream (e.g., a microphone on the client 140 picks up the audio output from the client 102). The client 140 determines the content information and sends the content information to the server 106; the client 140 performs step 506 instead of client 102.

In some implementations, the content fingerprints are generated by the server (e.g., using the fingerprint generation module 221) prior to run time from media content (e.g., audio and/or video clips, or video frames) uploaded by a third party user. In some implementations, the content fingerprints are generated by the server (e.g., using the fingerprint generation module 221) in real-time (e.g., live) or prior to run time from media content (e.g., audio and/or video clips, or video frames) received from the video content system 112.

One or more quotations, and optionally one or more other entities, associated with the matched fingerprint are determined (512); the quotations are lines or phrases spoken in the video content, and the other entities may include actors/characters who spoke the quotations in the video content. In some implementations, the determined quotations are the most popular quotations for the video content item or proximate to the portion of the video content item being presented. As used herein, proximate to a portion of a video content item means proximate in time to the currently presented portion within the video content item. For example, if the video content item is playing at the 20:00 mark, then quotations proximate to the 20:00 mark, or the portion including such, would include quotations that are spoken within a defined time range (e.g., plus/minus 15 minutes) from the 20:00 mark. The quotations, one or more corresponding affordances, and optionally the other entities, are sent to the client 140 (514). In some implementations, the quotations and affordances are sent to the client 140 directly, via the client's connection to the communications network 104, or indirectly, via a connection between the client 140 and the client 102. In some implementations, in lieu of sending affordances to the client 140, the server 106 sends instructions to an application configured to present the quotations and other entities (e.g., assistant application 355-3, FIG. 3B) to generate and present the corresponding affordances at the client 140. The client device 140 receives the quotations, affordances, and, optionally, the other entities (516). The quotations and affordances, and optionally the other entities, are presented (518). In some implementations, the one or more quotations and affordances are displayed on the display device 128 associated with the client device 140 in coordination in time with the video stream 126 being displayed by the client 102. For example, the quotations presented include quotations that have been spoken within a predefined time period preceding the current presentation position in the video stream (e.g., the last half hour from the current position). In some implementations, the quotations include quotations that are subsequent to the current presentation position in the video stream. These upcoming quotations may be held back from display until the positions in the video stream where the upcoming quotations are spoken are presented, in order to prevent spoiling the plot of the video content for the user.

The affordances include affordances for activating various operations or actions on a respective quote. In some implementations, the respective affordances correspond to respective actions; the user selects a quotation and then activates a respective affordance to activate the corresponding action for the selected quotation. In some other implementations, each displayed quotation has a respective set of one or more affordances; the user activates an affordance for a respective quotation to activate a menu of actions for the respective quotation or to activate an action for the respective quotation. The actions and operations that can be activated with respect to a quotation are further described below.

Displaying Summaries of Popular Entities

Figure 6:
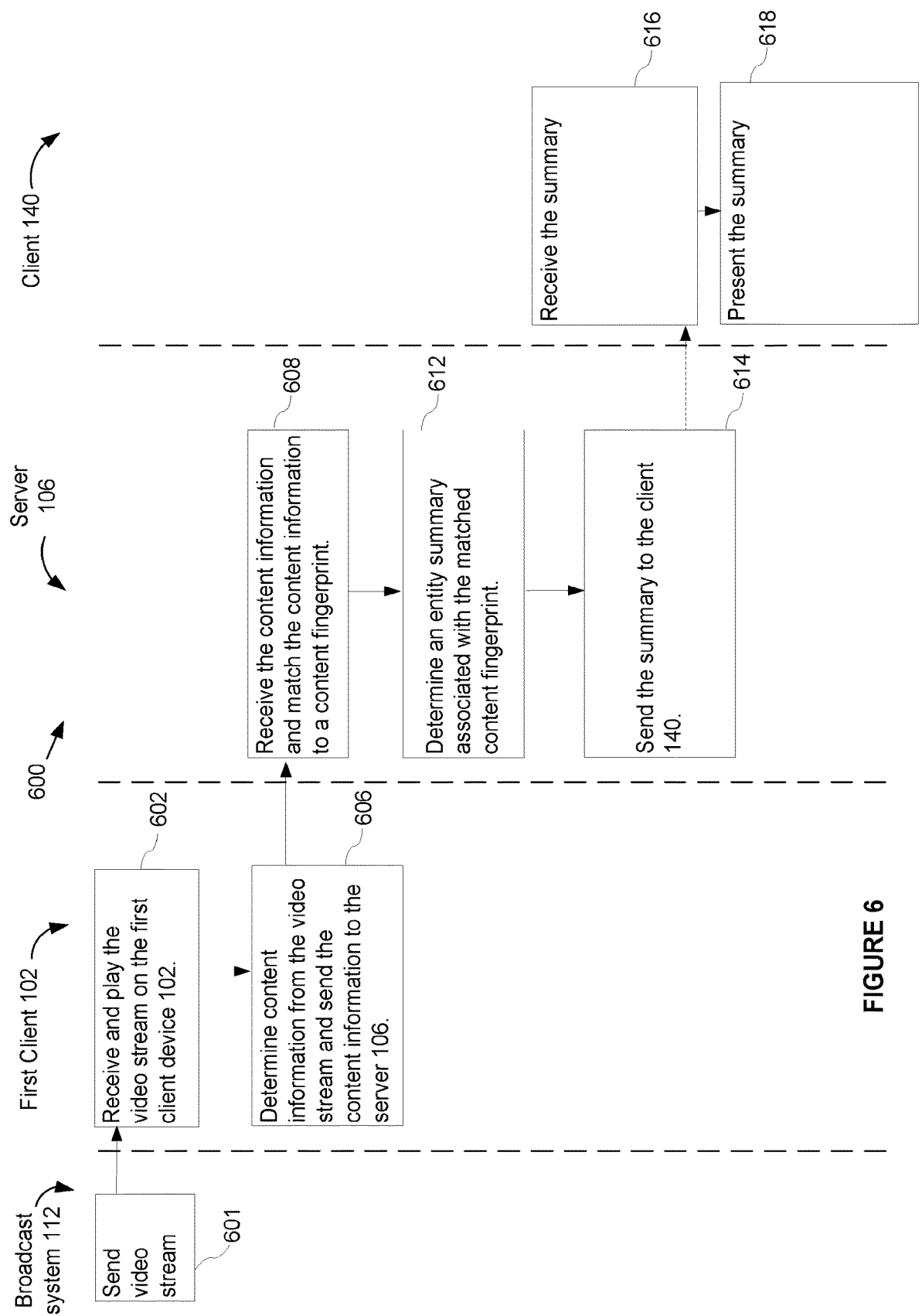
FIG. 6 is a flowchart illustrating an overview of the process of displaying a video content summary on a second device that is related to the content playing on a first device, in accordance with some implementations.

FIG. 6 is a flow diagram illustrating a process 600 of displaying summaries on a second device that is related to the content played on a first device, according to some implementations. FIG. 6 provides an overall view of methods 1200 and 1300 which is discussed in more detail in the discussion of FIGS. 12-13. A video content system 112 sends a video stream to a client 102 (601). The video stream is received and displayed by the client device 102 (602). While the video stream is played, content information from the video stream is determined and sent to a server 106 (606). As described elsewhere in this application, in some implementations the content information from the video stream includes one or more clips (such as several seconds, minutes or hours) of audio and/or video components of the video stream or the corresponding subtitles data, or fingerprints or other signatures generated by the client device 102 from one or more clips of the audio and/or video components of the video stream and/or the corresponding subtitles data. In some implementations, the content information is formatted so it can be readily compared to content fingerprints stored on the server. The server 106 receives the content information and matches the content information to a content fingerprint (608).

In some implementations, while the video stream is played, the client device 140 determines content information from the audio output, from the client device 102, corresponding to the audio component of the video stream (e.g., a microphone on the client 140 picks up the audio output from the client 102). The client 140 determines the content information and sends the content information to the server 106; the client 140 performs step 606 instead of client 102.

In some implementations, the content fingerprints are generated by the server (e.g., using the fingerprint generation module 221) prior to run time from media content (e.g., audio and/or video clips, or video frames) uploaded by a third party user. In some implementations, the content fingerprints are generated by the server (e.g., using the fingerprint generation module 221) in real-time (e.g., live) or prior to run time from media content (e.g., audio and/or video clips, or video frames) received from the video content system 112.

A summary associated with the matched fingerprint is determined (612); the summary includes the most popular entities for a video content item. The summary is sent to the client 140 (614). In some implementations, the summary is sent to the client 140 directly, via the client's connection to the communications network 104, or indirectly, via a connection between the client 140 and the client 102. The client device 140 receives the summary (616). The summary is presented (618). In some implementations, the summary is displayed on the display device 128 after presentation of the video stream 126 by the client 102 has completed (e.g., at the end of the video content item). In some other implementations, the summary is presented at a time that is not dependent on presentation or end of presentation of any particular video content item.

Example UIs for Displaying Quotations

Figure 7A:
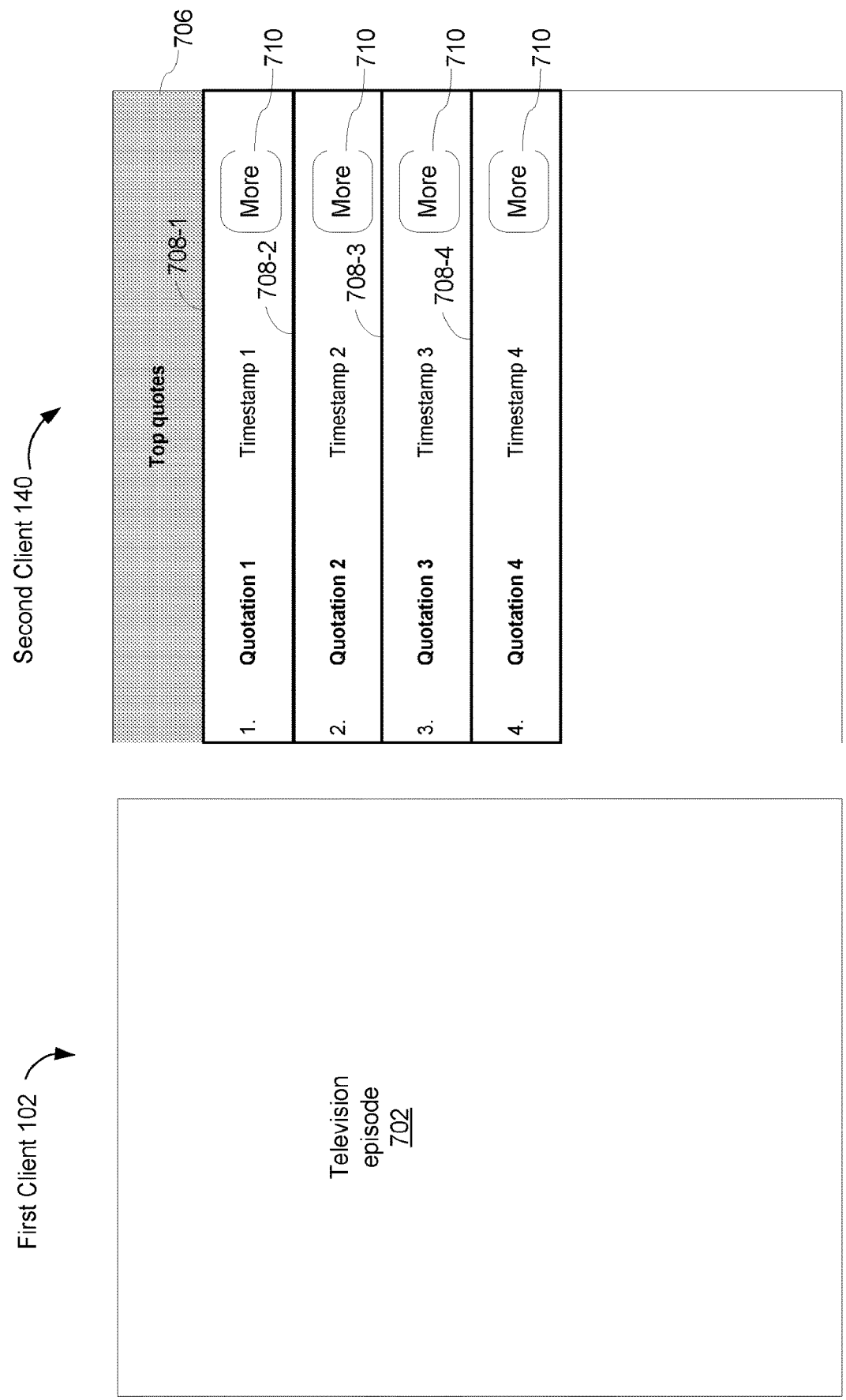
FIGS. 7A, 7B, and 7C are example screenshots in accordance with some implementations.
Figure 7B:
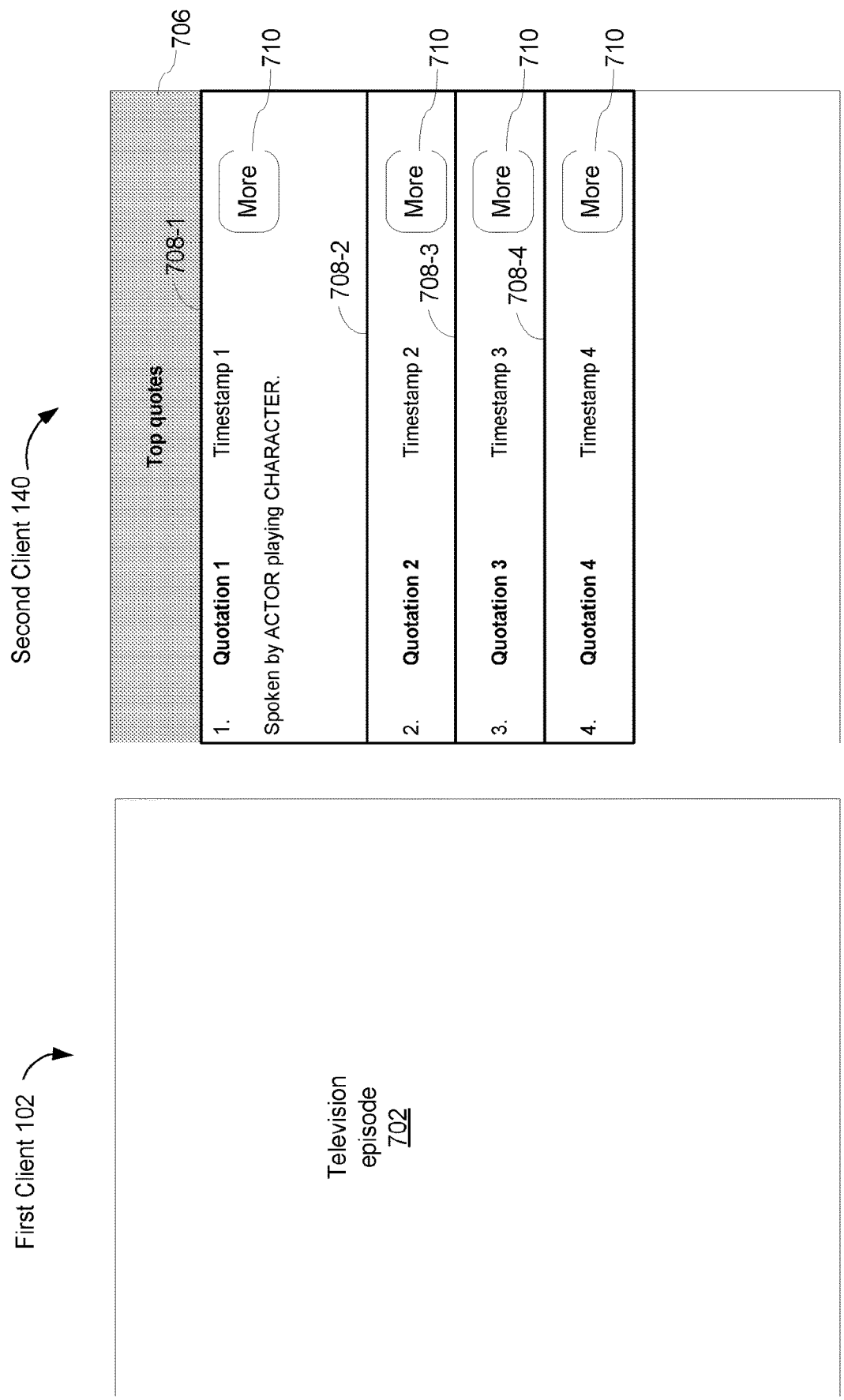
Figure 7C:
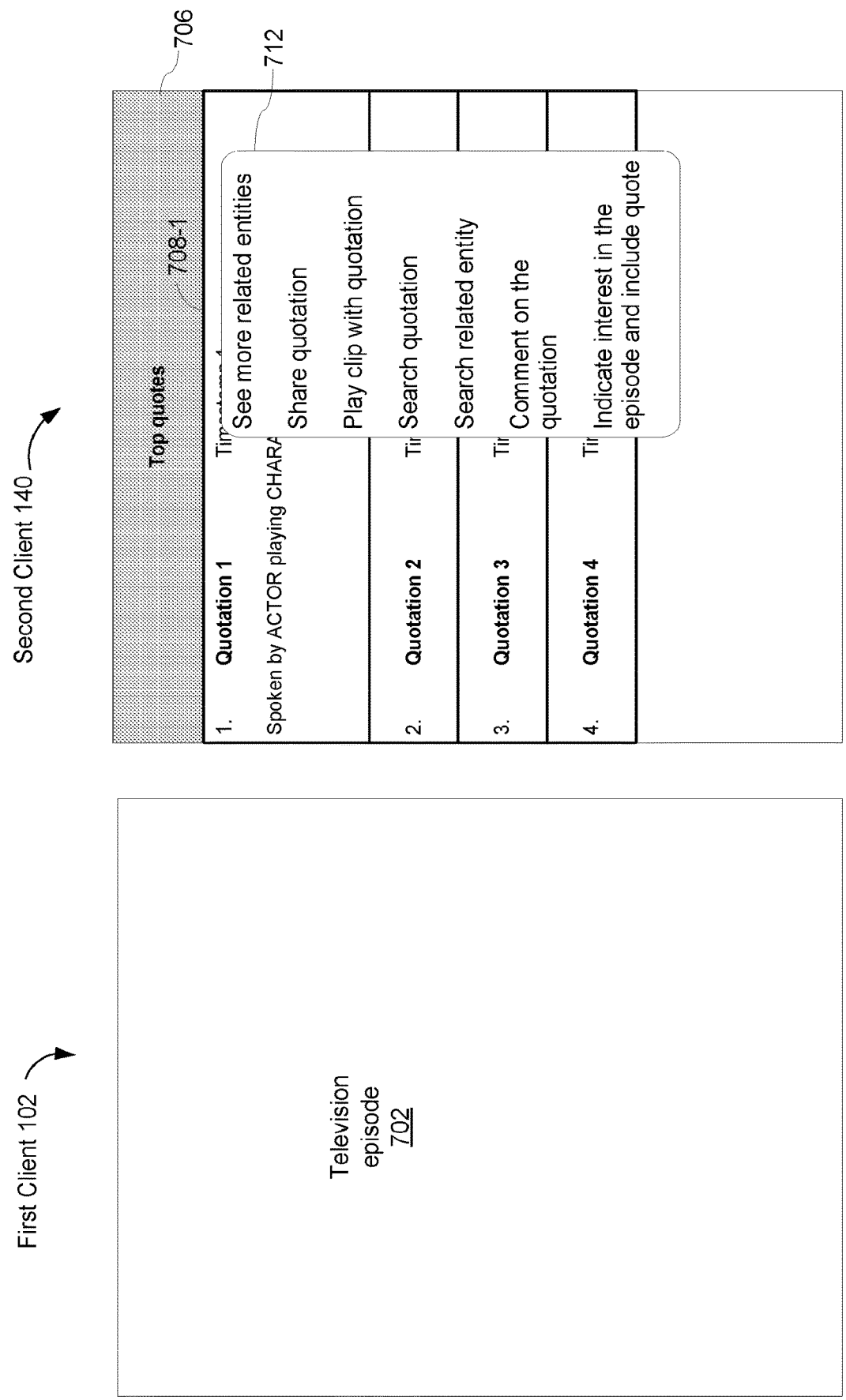

FIGS. 7A, 7B, and 7C illustrate example screen shots in accordance with some implementations. FIGS. 7A, 7B, and 7C each illustrate screen shots of a first client 102 and a second client 140. The first client 102 plays video content, while the second client 140 displays quotations content related to the video content playing on the first client 102. The illustrations in FIGS. 7A, 7B, and 7C should be viewed as example but not restrictive in nature. In some implementations, the example screen shots are generated by instructions/applications downloaded to the second client device 140 by the server 106 in response to the server 106 matching client fingerprints to content fingerprints stored on the server. In some implementations, the example screen shots are generated by instructions/applications that are stored on the second client device 140 (such as a browser, an assistant application, or other pre-configured application) in response to an instruction from the server 106 to display particular content in response to the server 106 matching client fingerprints to content fingerprints stored on the server.

FIG. 7A illustrates screenshots of the first client device 102 and the second client device 140. The first client 102 displays a television series episode 702 and the second client 140 displays an application 706 (e.g., an assistant application), one or more quotations 708 spoken in the episode 702, and affordances 710 corresponding to the respective quotations 708. While the episode 702 is played on the first client 102, the first client 102 sends content information derived from the episode 702 to the server system 106. Alternatively, the second client 140 sends content information derived from audio output, from the first client 102, corresponding to the episode 702 to the server system 106. The server system 106 matches the content information to a content fingerprint in order to identify the episode 702. After identifying a content fingerprint that matches the content information, the server 106 determines one or more quotations related to the episode 702 (spoken in the episode) and sends the quotations and corresponding affordances to the second client device 140 for presentation. The second client device 140 presents the quotations 708 and corresponding affordances 710. The quotations 708 also include respective timestamps for when the quotations are spoken in the episode 702. In some implementations, additional information (e.g., entities that spoke the quotations) are sent along with the quotations and affordances.

In some implementations, a user selects a quotation (e.g., by clicking on or tapping on a quotation 708) to bring up additional information on the quotation. For example, if quotation 708-1 is selected, the box for quotation 708-1 expands to display additional information, as shown in FIG. 7B. In the expanded box for quotation 708-1, more information associated with the quotation is presented, such as the entity (the actor, the character) that spoke the quotation in the episode 702.

The user may select the affordance 710 for quotation 708-1 to bring up a menu 712 of actions with respect to the quotation, as shown in FIG. 7C. The menu 712 includes various actions on the quotation 708-1 that can be activated. For example, the user can request to see more entities related to the quotation 708-1 (and have those entities displayed on the display), share the quotation 708-1 (e.g., in a social network 172, by email, by text message, and so on), play a video clip that includes the quotation 708-1 (e.g., a portion of episode 702), search the quotation 708-1 in a search engine 174 (e.g., submit the quotation 708-1 as a query to the search engine 174), search an entity related to the quotation 708-1 (e.g., the actor or character that spoke the quotation, the episode and series in which the quote was spoken) in a search engine 174, comment on the quotation 708-1, and indicate interest in the episode 702 and include the quotation 708-1 in the indication of interest. In some implementations, activation of the comment action triggers display of a text input interface on the display at the second client 140 for inputting a comment on the quotation 708-1, which may be stored at the server system 106. In some implementations, an activation of the indication of interest action triggers a submission of an indication of interest (e.g., a like, a status post) for the episode 702 to a social network 172, and the indication of interest includes the quotation 708-1.

Example UIs for Displaying Summaries of Popular Entities

Figure 8A:
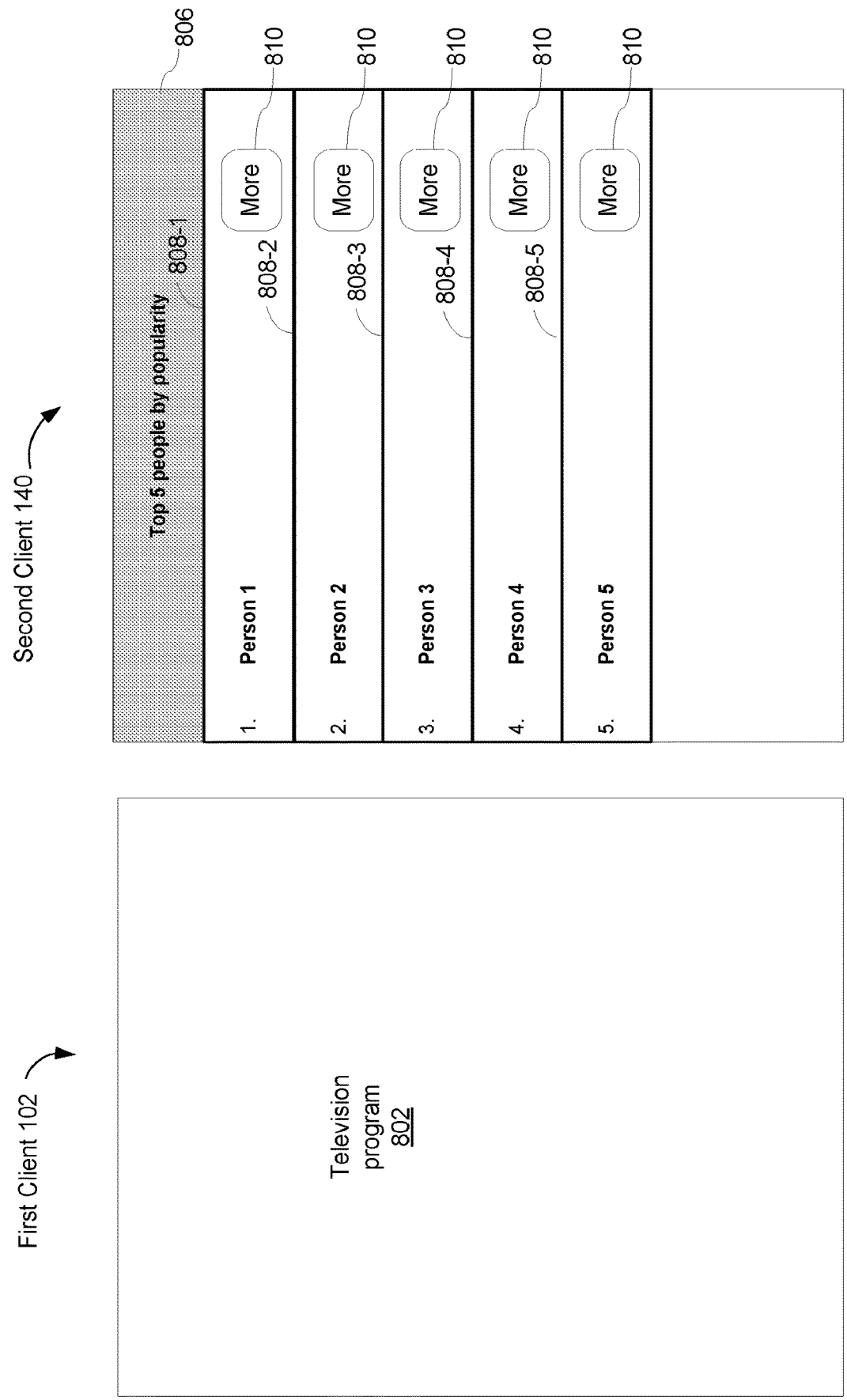

FIGS. 8A and 8B illustrate example screen shots in accordance with some implementations. FIG. 8A illustrates screen shots of a first client 102 and a second client 140, and FIG. 8B illustrates a screen shot of the second client 140. In FIG. 8A, the first client 102 plays video content, and after the video content is played at the first client 102, the second client 140 displays a summary of entities related to the video content played on the first client 102. In FIG. 8B, the second client 140 displays a summary of entities related to video content with respect to a defined time period. The illustrations in FIGS. 8A and 8B should be viewed as example but not restrictive in nature. In some implementations, the example screen shots are generated by instructions/applications downloaded to the second client device 140 by the server 106. In some implementations, the example screen shots are generated by instructions/applications that are stored on the second client device 140 (such as a browser, an assistant application, or other pre-configured application).

FIG. 8A illustrates screenshots of the first client device 102 and the second client device 140. The first client 102 displays a television program 802. After playback of the program 802 ended, the second client 140 displays an application 806 (e.g., an assistant application), one or more entities 808 related to the program 802 (e.g., top 5 people in the program 802 by popularity), and affordances 810 corresponding to the respective entities 808. While the program 802 is played on the first client 102, the first client 102 sends content information derived from the program 802 to the server system 106. Alternatively, the second client 140 sends content information derived from audio output, from the first client 102, corresponding to the program 802 to the server system 106. The server system 106 matches the content information to a content fingerprint in order to identify the program 802. After identifying a content fingerprint that matches the content information, the server 106 determines one or more entities associated with the program 802 and determines their popularities (e.g., based on number of mentions in social networks and web pages). After the program 802 finished playing, the server system 106 sends a summary with the most popular entities 808 (e.g. the top 5) and corresponding affordances 810 to the second client device 140 for presentation. The second client device 140 presents the entities 808 and corresponding affordances 810. A user may select an affordance 810 to bring up a menu of actions with respect to the corresponding entity, as with affordances 710 in FIGS. 7A-7C.

In some implementations, the most popular entities selected for the summary are the most popular in the aggregate, without any personalization to the use's interests and preferences and history. In some implementations, the most popular entities selected for the summary are the most popular, taking into account the user's interests and preferences and history as well as popularity in the aggregate.

FIG. 8B illustrates a screenshot of the second client device 140. The server system 106 determines the popularity of entities associated with video content that have been presented to users in a defined time period. The server system 106 sends a summary with the most popular entities 812 (e.g. the top 5) for the time period and corresponding affordances 814 to the second client device 140 for presentation. The second client device 140 presents the entities 812 and corresponding affordances 814. A user may select an affordance 814 to bring up a menu of actions with respect to the corresponding entity, as with affordances 810 in FIG. 8A.

It should be appreciated that the "popularity" of an entity (e.g., a quotation, etc.), as used herein, refers not merely to positive or favorable interest in the entity, but can also refer to interest in the entity more generally, as indicated by the numbers of mentions, sharing, and queries, and any other suitable criteria. Thus, the popularity metrics 460 is a measure of the level of interest in an entity.

Identifying and Storing Quotations

Figure 9:
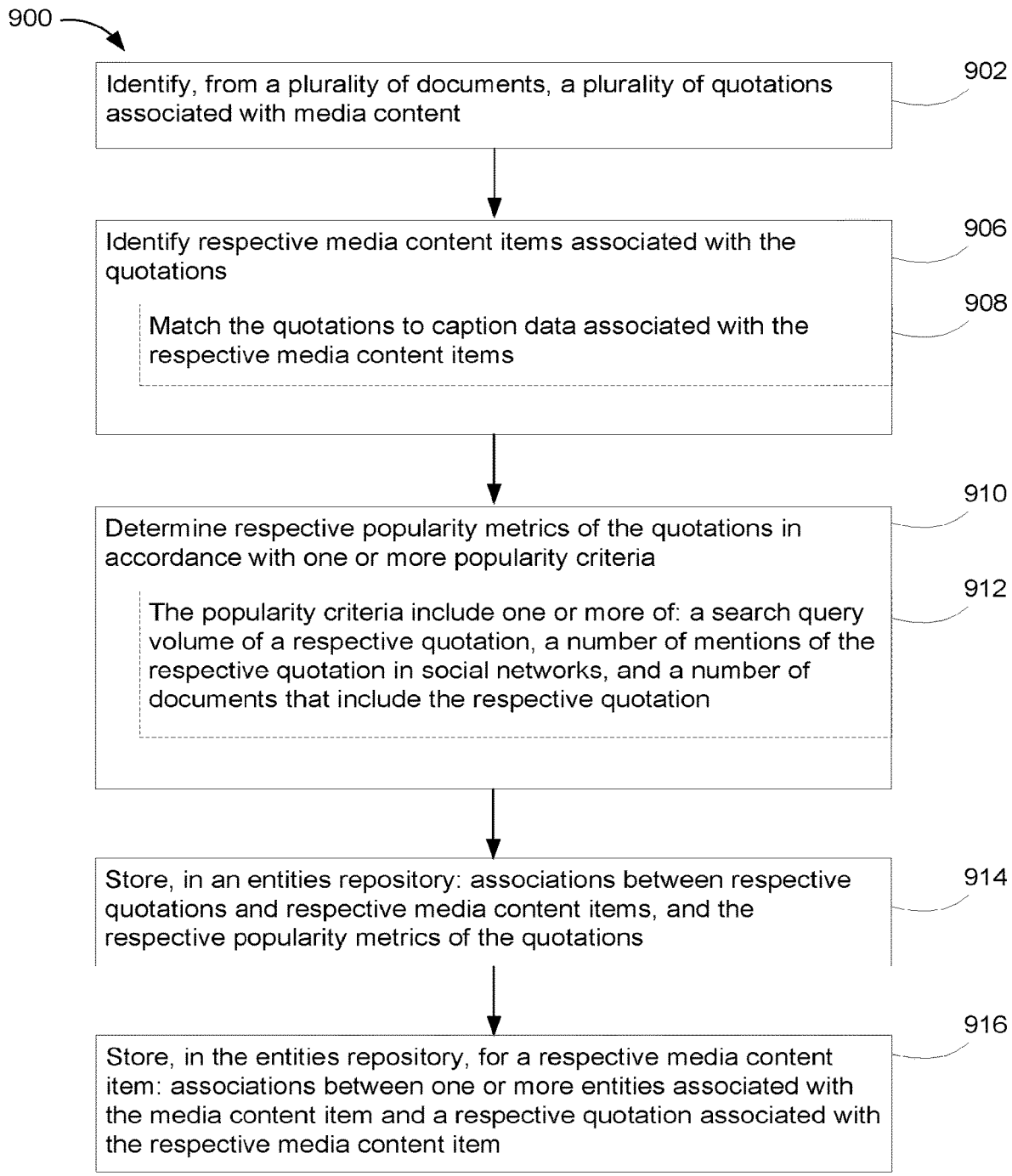
FIG. 9 illustrates a flowchart for a method for identifying and storing quotations in accordance with some implementations.

FIG. 9 illustrates a method 900 for identifying and storing quotations in accordance with some implementations. The method 900 is performed at a server system 106 having one or more processors and memory.

A plurality of quotations associated with media content is identified from a plurality of documents (902). The server 106 (e.g., the quotations module 148) analyzes documents (or more generally, any textual content) hosted by content hosts 170 and social networks 172 to identify quotations associated with media content items, and more specifically video content items such as movies and television programs and online videos. Examples of documents or content that are analyzed include web pages and social network profiles, timelines, and feeds. In some implementations, the documents analyzed includes particular types of documents, such as web pages that have editorial reviews, social commentary, and other online articles and documents that reference television shows and movies. In some implementations, documents in these particular categories are drawn from content hosts that are whitelisted as having these types of documents. The server system 106 analyzes the documents to find references to video content quotations and the quotations themselves.

Respective media content items associated with the quotations are identified (906). The server system 106 identifies the video content that the quotations come from, i.e., the video content in which the quotations were spoken.

In some implementations, identifying respective media content items associated with the quotations includes matching the quotations to caption data associated with the respective media content items (908). The server system 106 matches the quotations identified from the documents against subtitles data of video content. A match indicates that a quotation is associated with a video content item to which the matching subtitles data corresponds.

Respective popularity metrics of the quotations are determined in accordance with one or more popularity criteria (910). In some implementations, the popularity criteria include one or more of: a search query volume of a respective quotation, a number of mentions of the respective quotation in social networks, and a number of documents that include the respective quotation (912). The server system 106 determines the popularity metrics 460 for each identified quotation. The popularity module 150 determines the popularity of a quotation based on a number of criteria. The criteria include: how many users have searched for the quotation in a search engine 174 (the search volume of the quotation), how many times the quotation have been mentioned in social networks 172 (e.g., in social media posts and tweets), and a number of documents that include the respective quotation (e.g. web pages). In some implementations, the same documents, etc. that were used in step 902 to identify quotations are analyzed to determine the popularity metrics for the quotations. In some implementations, mentions of a quotation in particular types of content, such as the particular types of documents (editorial reviews, etc.) described above in reference to step 902, are given additional weight in measuring the popularity of the quotation.

In some implementations, the popularity module 150 also determines the popularity of quotations in real-time. For example, the popularity module 150, analyzing documents and other content for mentions and sharing of quotations and search queries for quotations and so on, can detect which quotations have recent spikes in popularity or other recent trends and changes in the popularity of a quotation.

Associations between respective quotations and respective media content items, and the respective popularity metrics of the quotations, are stored in an entities repository (914). Quotations are stored as entities 428 in the entities database 122. Each quotation entity includes references to other entities 454, which indicate associations between the quotation and the referenced entities. Each quotation entity also includes the popularity metrics 460 for the quotation as determined in step 910, and which may be periodically updated.

In some implementations, for a respective media content item, associations between one or more entities associated with the media content item and a respective quotation associated with the respective media content item are stored in the entities repository (916). As described above, the entities database 122 stores, for an entity, references to other entities, which indicate the associations between entities. In some implementations, this maps to a graph data structure within the entities database 122 that maps the connections between entities. The entities database 122 includes an entity corresponding to a video content item, which includes references to entities corresponding to people that are associated with the video content item (e.g., cast, guests, etc.). For the subset of the people associated with the video content item that had spoken dialogue in the video content item, their corresponding people entities include references to entities corresponding to quotations spoken by this subset of people. Thus, the entities database 122 stores, for a respective video content item, associations between entities associated with the video content item (e.g., people entities) and quotations associated with the video content item.

Identifying Quotations for Presentation

Figure 10A:
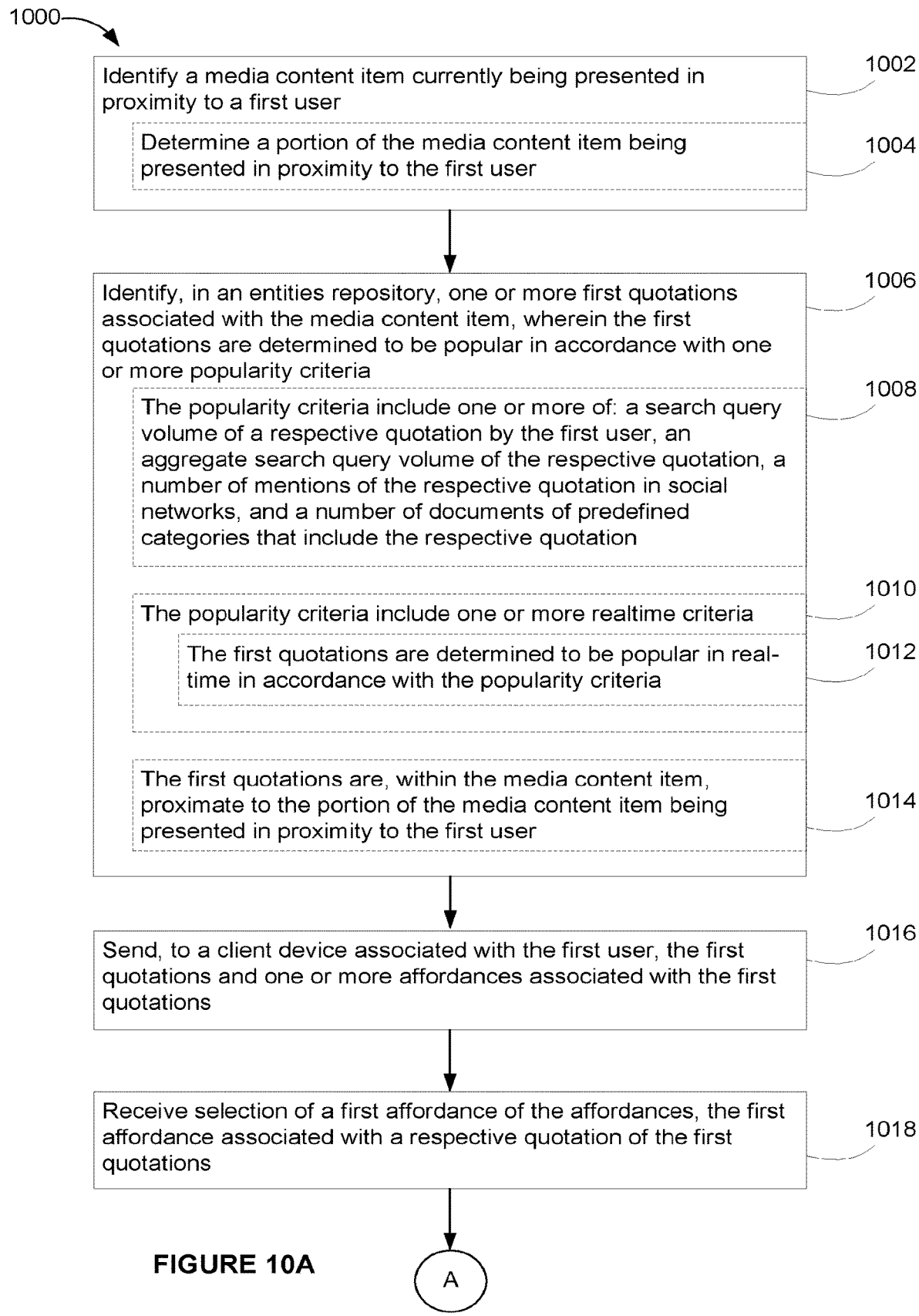
FIGS. 10A-10B illustrate a flowchart for identifying quotations for presentation in accordance with some implementations.
Figure 10B:
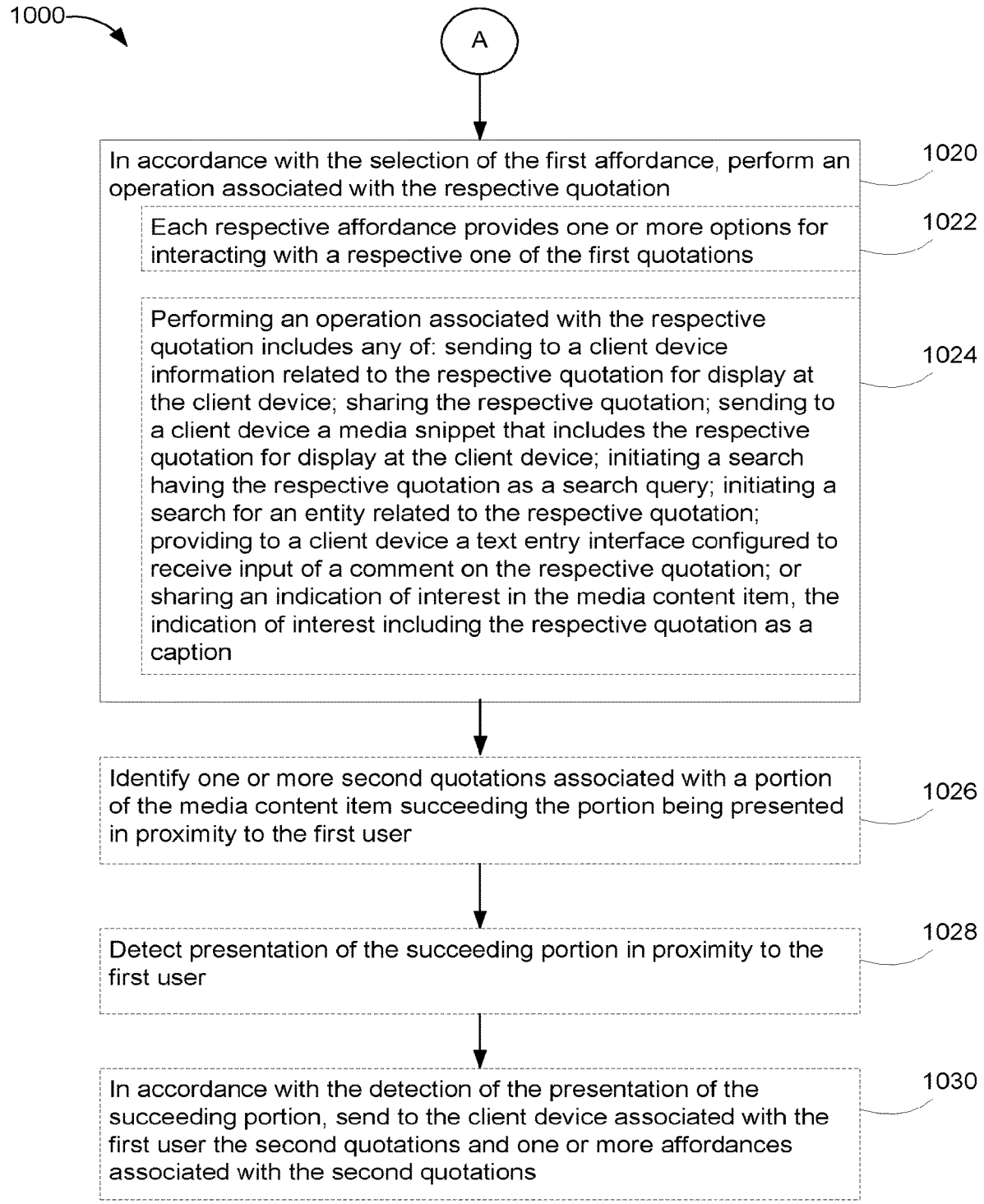

FIGS. 10A-10B illustrate a method 1000 for identifying quotations for presentation in accordance with some implementations. The method 1000 is performed at a server system 106 having one or more processors and memory.

A media content item currently being presented in proximity to a first user is identified (1002). The server system 106 receives content information 142 from the client 102 or 140. The content information 142 corresponds to a media content item (e.g., a video content item) being presented on client 102. It is assumed that the user is in proximity of the client 102 to be able to view the video content item, even if he is not actually viewing it. Also, as described above, the content information 142 may be derived from the audio output from the client 102 corresponding to the audio component of the video content item and perceived by a microphone on the client 140. Assuming that the user is near the client 140 (e.g., holding the client 140 in his hand), that the client 140 can perceive the audio output from the client 102 while the video content item is being played on the client 102 is an indication that the video content item is being presented in proximity to the user.

In some implementations, the identification of the media content item uses fingerprints (e.g., comparing the content information to fingerprints in the fingerprint database 120). Further details on identifying content using fingerprints are described in U.S. patent application Ser. No. 13/174,612, titled "Methods for Displaying Content on a Second Device that is Related to the Content Playing on a First Device," filed Jun. 30, 2011, which is incorporated by reference herein in its entirety.

In some implementations, identifying the media content item currently being presented in proximity to the first user includes determining a portion of the media content item being presented in proximity to the first user (1004). The server system 106 can, not only identify the video content item being presented on the client 102, but which portion is being presented on client 102 (e.g., where in the video content item is being presented, how far from the beginning or the end of the video content item). The portion currently being presented is determined as part of the media content item identification process in step 1002; the server system 106 identifies what the media content item is and where in the media content item is currently being presented.

One or more first quotations, in an entities repository, associated with the media content item, are identified, where the first quotations are determined to be popular in accordance with one or more popularity criteria (1006). The server system 106 identifies and selects one or more quotations from the entities repository 122. These quotations are associated with the media content item; these quotations are part of the spoken dialogue within the media content item. The selected quotations are the most popular quotations associated with the media content item based on the popularity metrics 460 of the quotations determined by the server system 106. The popularity metrics are determined in accordance with one or more criteria.

In some implementations, the popularity criteria include one or more of: a search query volume of a respective quotation by the first user, an aggregate search query volume of the respective quotation, a number of mentions of the respective quotation in social networks, and a number of documents of predefined categories that include the respective quotation (1008). The criteria for determining popularity of a quotation include one or more of: how many searches for the quotation has the user and/or users in the aggregate performed (search volume), how many times has the quotation been mentioned in documents (e.g., web pages) and how many times has the quotation been shared in social networks. With respect to mentions in documents, in some implementations the server system 106 weigh more heavily mentions of the quotation in predefined categories of documents, such as web pages that contain editorial reviews, social commentary, or other web pages referencing movies and television; a mention in a document in the predefined categories of documents have more weight toward a quotation's popularity than a mention in a document outside of the predefined categories.

In some implementations, the popularity criteria include one or more realtime criteria (1010). The server system 106 can determine a real-time popularity of a quotation based on one or more real-time criteria. Real-time criteria can simply be any of the criteria described above (e.g., the criteria described in step 1008) considered with a recent time horizon. For example, search volume measured in real-time may include search volume within the last 15 minutes or minute-by-minute search volume. The real-time criteria provide a measure of recent changes, such as trends and spikes, in a quotation's popularity, i.e. the quotation's real-time popularity.

In some implementations, the first quotations are determined to be popular in real-time in accordance with the popularity criteria (1012). The server system 106 identifies and selects quotations, associated with the media content item, that are popular in real-time. In some implementations, the server system 106, when selecting quotations, consider both historical and real-time popularities and may weigh one more than the other. Note that this and other methods described herein for identifying popular quotations are also applicable to identifying other types of popular entities.

In some implementations, the first quotations are, within the media content item, proximate to the portion of the media content item being presented in proximity to the first user (1014). The server system 106, after determining the portion (representing the current playback position) of the media content item being presented (1004), identifies and selects quotations that are proximate to that portion (and that are popular as described above). A quotation is proximate to the portion of the quotation is spoken within a predefined time from the current playback position. For example, a quotation that is spoken within the last 15 minutes from the current playback position may be considered to be proximate to the portion.

In some implementations, quotations that are "proximate" to the portion being presented include quotations spoken within a time range after the current position in the media content item. The server system 106 can identify quotations that are upcoming in the media content item, further details of which are described below.

The first quotations and one or more affordances associated with the first quotations are sent to a client device associated with the first user (1016). The server system 106 sends entity information 132 to the client 140 associated with the user. The entity information 132 includes the selected quotations 708 and corresponding affordances 710. The client 140 displays the quotations 708 and the corresponding affordances 710.

Selection of a first affordance of the affordances is received, where the first affordance is associated with a respective quotation of the first quotations (1018). At the client 140, the user selects an affordance 710 corresponding to one of the quotations (e.g., affordance 710 corresponding to quotation 708-1, as shown in FIG. 7B. This opens a menu of options 712 (e.g., affordances) for performing actions associated with the quotation 708-1, as shown in FIG. 7C. The user selects one of the option affordances in menu 712, and the client 140 sends the selection to the server system 106.

In accordance with the selection of the first affordance, an operation associated with the respective quotation is performed (1020). The server system 106 performs an action in accordance with the selected affordance. For example, if the user had selected the "share quotation" option, the server system 106 makes a post sharing the quotation 708-1 in a social network 174 in which the user has an account and which the server system 106 has been given access by the user to post on the user's behalf.

In some implementations, each respective affordance provides one or more options for interacting with a respective one of the first quotations (1022). For example, when an option affordance in menu 712 is selected, additional options related to the selected option may be displayed, and the user may select any of the additional options.

In some implementations, performing an operation associated with the respective quotation includes any of: sending to a client device information related to the respective quotation for display at the client device; sharing the respective quotation; sending to a client device a media snippet that includes the respective quotation for display at the client device; initiating a search having the respective quotation as a search query; initiating a search for an entity related to the respective quotation; providing to a client device a text entry interface configured to receive input of a comment on the respective quotation; or sharing an indication of interest in the media content item, the indication of interest including the respective quotation as a caption (1024). By selecting any of the options in menu 712, the user can instruct the server system 106 to send additional information (e.g., entities) related to the quotation to the client 140 for display, share the quotation (on a social network, by email, by message, etc.), send to the client 140 a video clip that includes the quotation, perform a search with the quotation as the query, perform a search with an entity related to the quotation (e.g., the character that spoke the quotation) as the query, instruct the client device 140 to display a text input interface for inputting a comment on the quotation, or sharing an indication of interest in the video content item that includes the quotation.

In some implementations, one or more second quotations associated with a portion of the media content item succeeding the portion being presented in proximity to the first user are identified (1026), presentation of the succeeding portion in proximity to the first user is detected (1028), and, in accordance with the detection of the presentation of the succeeding portion, the second quotations and one or more affordances associated with the second quotations are sent to the client device associated with the first user (1030). As described above, quotations proximate to the current position in the video content item can include quotations spoken within a time range after the current position (i.e., succeed the current portion being presented). The server system 106 identifies these "upcoming" quotations, and waits on sending them to the client device 140 until the portion where these quotations are actually spoken is reached at the client 102. When the server system 106 detects that the portion where the "upcoming" quotations are being presented at the client 102, the "upcoming" quotations are sent to the client device 140. Thus, the server system 106 can "prefetch" quotations that come later in the video content item but hold them back until they are actually spoken in the video content item, so as not to spoil the video for the user.

Presenting Quotations

Figure 11:
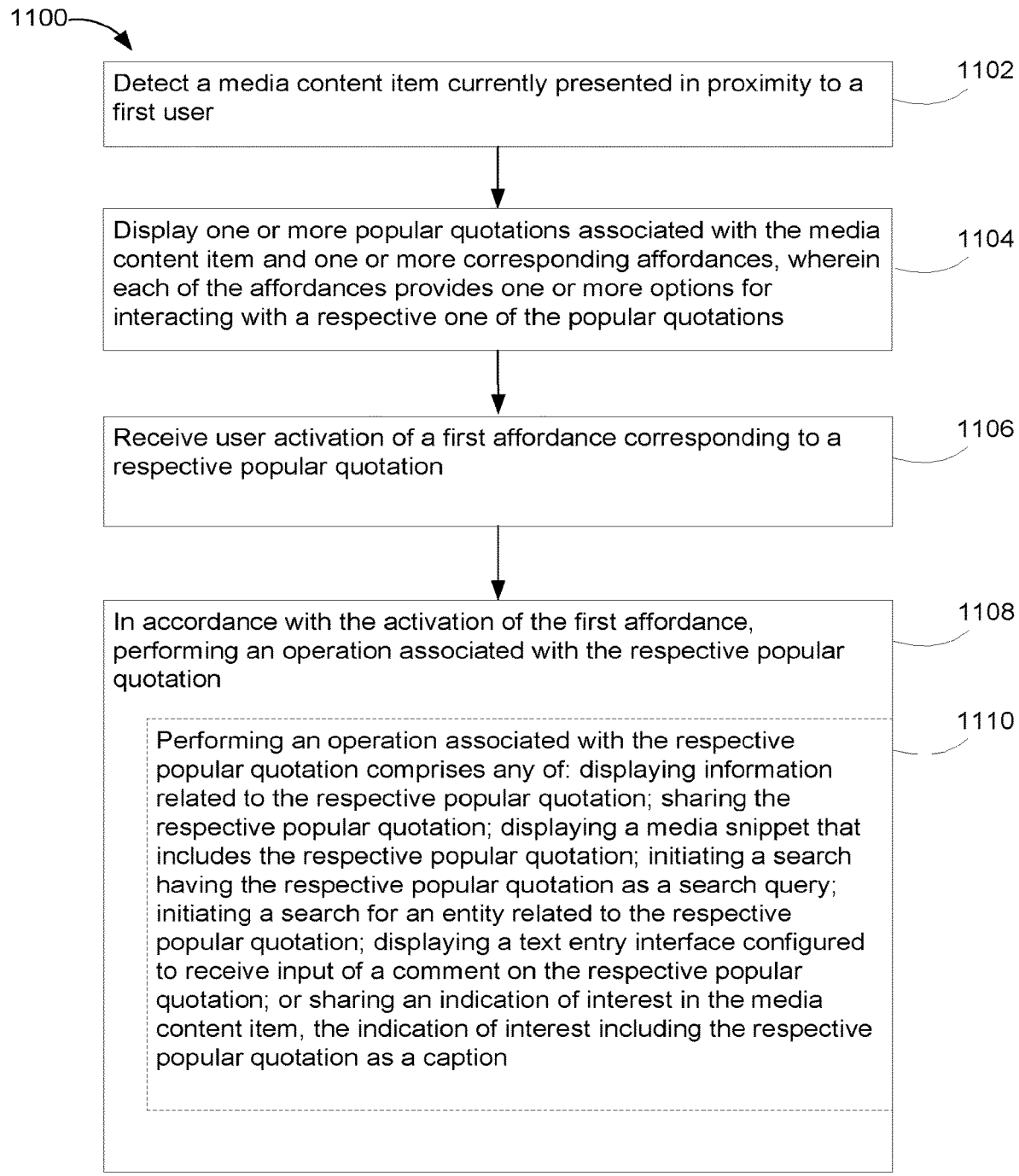
FIG. 11 illustrates a flowchart for a method for presenting quotations in accordance with some implementations.

FIG. 11 illustrate a method 1100 for presenting quotations in accordance with some implementations. The method 1000 is performed at a client 140 or 182.

A media content item currently presented in proximity to a first user is detected (1102). For example, the microphone at the client device 140 perceives audio output from a client 102. An application 127 at the client device 140 derives content information 142 from the audio output and sends the content information 142 to a server system 106, where the content information 142 is matched against fingerprints in a fingerprint database 120 to identify the video content item that the audio output corresponds to. The server 106 identifies and selects quotations associated with the video content item and which are popular (e.g., has high popularity metrics 460) as determined by the server system 106. These quotations 708 and corresponding affordances 710 are sent to the client 140.

One or more popular quotations associated with the media content item and one or more corresponding affordances are displayed, where each of the affordances provides one or more options for interacting with a respective one of the popular quotations (1104). The client device 140 receives and displays the quotations 708 and the corresponding affordances 710. Each affordance 710, when activated, opens a menu 712 of options, themselves affordances, for interacting with a respective quotation 708.

User activation of a first affordance corresponding to a respective popular quotation is received (1106). In accordance with the activation of the first affordance, an operation associated with the respective popular quotation is performed (1108). The user selects an option affordance in the options menu 712, the selection of which is received by the client device 140. The client device 140, in conjunction with the server system 106, performs the action or operation corresponding to the selected affordance. For example, if the action is sharing the quotation, the server 106 shares the quotation in a social network, and the sharing process is displayed on the client device 140.

In some implementations, performing an operation associated with the respective popular quotation includes any of: displaying information related to the respective popular quotation; sharing the respective popular quotation; displaying a media snippet that includes the respective popular quotation; initiating a search having the respective popular quotation as a search query; initiating a search for an entity related to the respective popular quotation; displaying a text entry interface configured to receive input of a comment on the respective popular quotation; or sharing an indication of interest in the media content item, the indication of interest including the respective popular quotation as a caption (1110). By selecting any of the options in menu 712, the user can instruct the client device 140, in conjunction with server system 106, to send additional information (e.g., entities) related to the quotation to the client 140 for display, share the quotation (on a social network, by email, by message, etc.), send to the client 140 a video clip that includes the quotation, perform a search with the quotation as the query, perform a search with an entity related to the quotation (e.g., the character that spoke the quotation) as the query, instruct the client device 140 to display a text input interface for inputting a comment on the quotation, or sharing an indication of interest in the video content item that includes the quotation.

Generating Content Summaries

Figure 12:
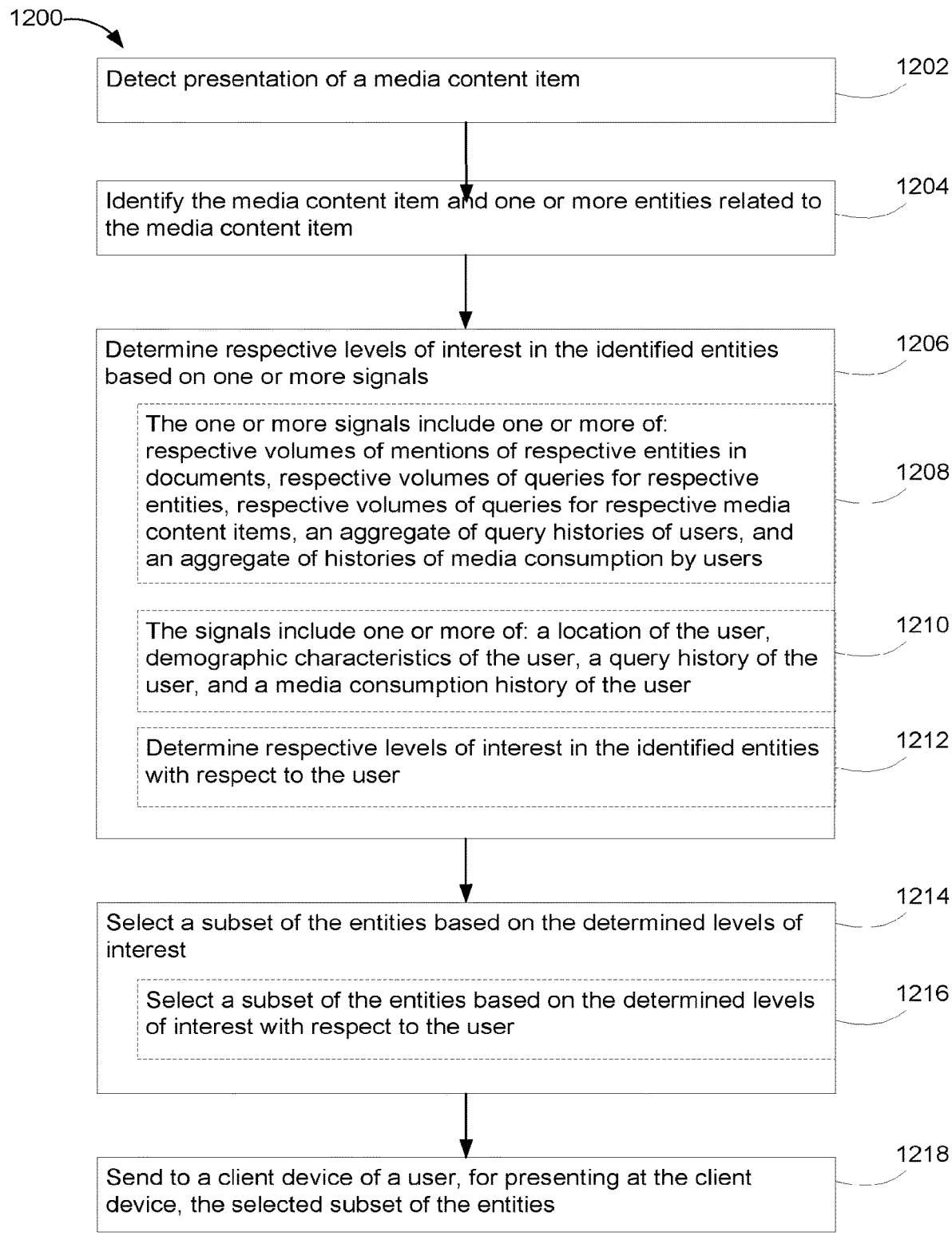
FIG. 12 illustrates a flowchart for a method for generating a summary of a media content item in accordance with some implementations.

FIG. 12 illustrates a method 1200 for generating a summary of a media content item in accordance with some implementations. The method 1200 is performed at a server system 106 having one or more processors and memory.

Presentation of a media content item is detected (1202). The media content item and one or more entities related to the media content item are identified (1204). When a video content item is being presented at a client 102, the client 102 or a client 140 sends content information 142 to the server 106. The server 106 uses the content information 142 to identify the video content item. The server 106 also identifies one or more entities associated with the video content item.

Respective levels of interest in the identified entities are determined based on one or more signals (1206). The server 106 determines levels of interest (e.g., popularity metrics 460) for the identified entities using one or more signals or criteria. The server 106 determines these levels of interest in the aggregate.

In some implementations, the one or more signals include one more of: respective volumes of mentions of respective entities in documents, respective volumes of queries for respective entities, respective volumes of queries for respective media content items, an aggregate of query histories of users, and an aggregate of histories of media consumption by users (1208). The signals or criteria for determining the level of interest include search volumes for the entity and for the media content item, an aggregation of user's query histories, and an aggregation of histories of what media content items the user has consumed. Other possible signals include signals described above with respect to the determination of popularity for quotations, such as number of mentions in documents and sharing in social networks.

In some implementations, the signals include one or more of: a location of the user, demographic characteristics of the user, a query history of the user, and a media consumption history of the user (1210). The signals may include signals that are specific to the user, such as the location, demographic information of the user, the user's query history, and the user's history of consumption of media content items.

In some implementations, determining respective levels of interest in the identified entities based on one or more signals includes determining respective levels of interest in the identified entities with respect to the user (1212). When the user-specific signals described in step 1210 are used along with other signals (e.g., those described in step 1208 above), the server 106 can determine levels of interest for the entities with respect to the user as well as in the aggregate.

A subset of the entities is selected based on the determined levels of interest (1214). The server 106 selects the entities associated with the media content item with high aggregate levels of interest (e.g., top 5 in level of interest).

In some implementations, selecting a subset of the entities includes selecting a subset of the entities based on the determined levels of interest with respect to the user (1216). The server 106 can select the entities associated with the video content item that the user is more interested in, rather than those that have high aggregate levels of interest. Alternatively, the server 106, when selecting the entities, consider both the user's and the aggregate levels of interest, but weights the user's levels of interest more highly. Either way, the server 106 selects entities in a way that is more personalized to the user.

The selected subset of the entities is sent to a client device of a user for presenting at the client device (1218). The selected entities 808 are sent, as a summary of the media content item 802, to the client device 140 for display at the client device 140.

Figure 13:
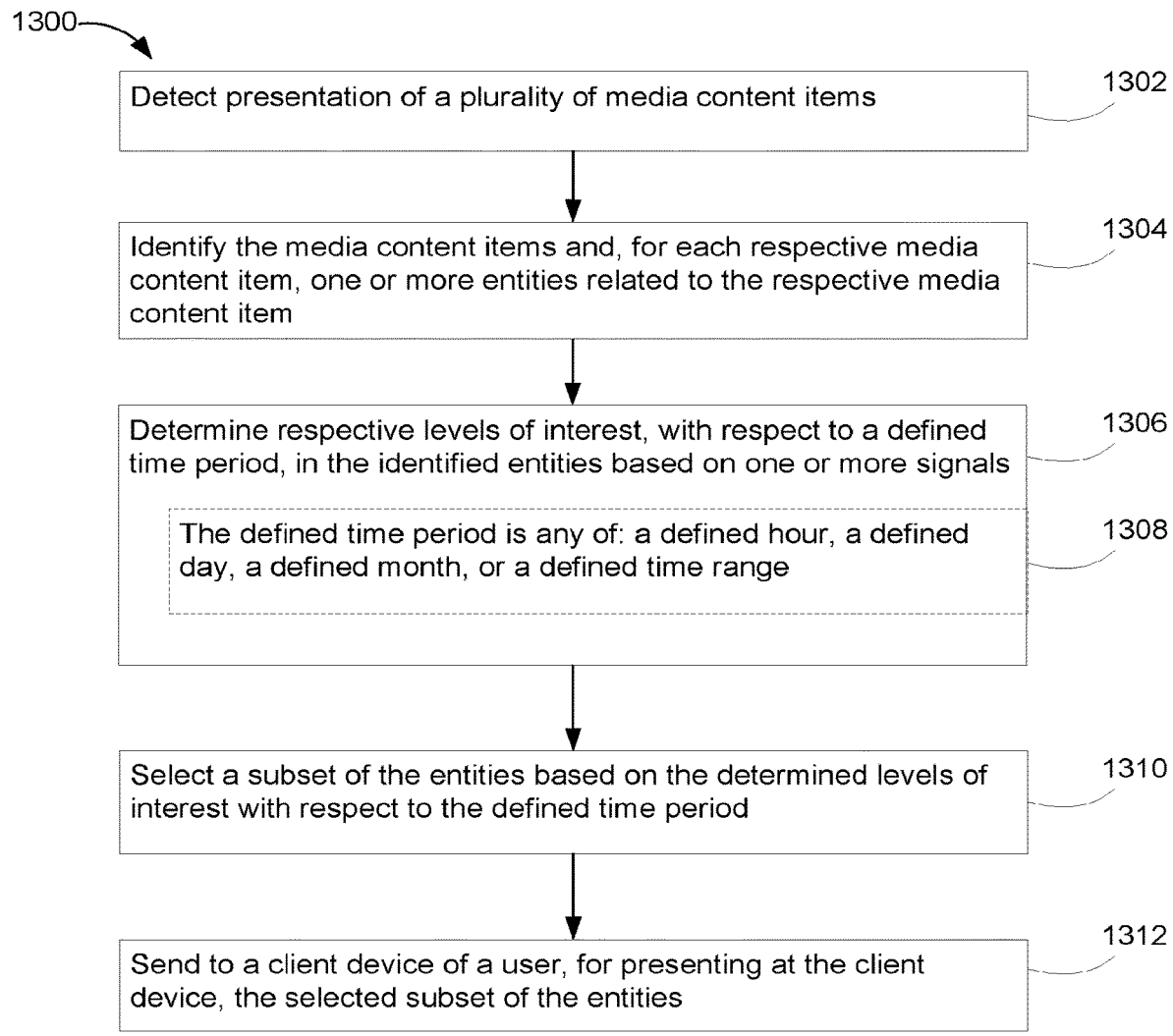
FIG. 13 illustrates a flowchart for a method for generating a summary of media content items with respect to a time period in accordance with some implementations.

FIG. 13 illustrates a method 1300 for generating a summary of media content items with respect to a time period in accordance with some implementations. The method 1300 is performed at a server system 106 having one or more processors and memory.

Presentation of a plurality of media content items is detected (1302). The media content items and, for each respective media content item, one or more entities related to the respective media content item are identified (1304). When video content items are being presented at client devices of users, the client devices (e.g., client 102 or 140) send content information 142 for the video content items to the server 106. The server 106 uses the content information 142 to identify the video content items. The server 106 also identifies one or more entities associated with each respective identified video content item.

Respective levels of interest in the identified entities are determined with respect to a defined time period based on one or more signals (1306). The server 106 determines levels of interest (e.g., popularity metrics 460) for the identified entities using one or more signals or criteria. The server 106 determines these levels of interest in the aggregate and with respect to a defined time period (e.g., level of interest in the defined time period). The signals used may be the same as those described above with reference to FIG. 12.

In some implementations, the defined time period is any of: a defined hour, a defined day, a defined month, or a defined time range (1308). The level of interest for an entity may be determined with respect to a defined hour or hours (e.g., the 8-AM-hour), a defined day or days (e.g., Mondays), a defined month or months (e.g., May), or a defined time range (e.g., the "prime time" hours). The defined time period may also be a combination of the above. For example, the defined time period may be a defined time range on a defined day (e.g., "prime time" hours on Thursdays).

A subset of the entities is selected based on the determined levels of interest with respect to the defined time period (1310). The server 106 selects the entities, associated with the media content items, with high aggregate levels of interest within the defined time period (e.g., top 5 in level of interest for the defined time period).

The selected subset of the entities is sent to a client device of a user for presenting at the client device (1312). The selected entities 812 are sent, as a summary of the media content items for the defined time period, to the client device 140 for display at the client device 140.

In some implementations, a summary includes top stories (e.g., news stories). For example, the server 106 identifies the entities within the media content item. The server 106 searches for stories (e.g., documents containing news articles, etc.) that mention the entities and which are popular. The server 106 identifies the most popular of these documents and includes them in the summary. In some implementations, stories for entities are identified by identifying important keywords in stories (e.g., people and places mentioned in the stories). Stories that share important keywords are clustered together. These important keywords are matched against the content of the media content item (e.g., the subtitles data) to find stories related to entities related to the media content item. The popularities of these stories are determined, and the most popular are displayed in the summary.

In some implementations, a summary of the media content item is generated and displayed in real time. For example, as the media content item is being presented, the media content item and the current presentation/playback position of the media content item are detected. The server 106 generates a summary of a time range from the current presentation position (e.g., the last 15 minutes) and sends the summary to the client device 140 for presentation to the user. This summary is continuously updated or refreshed as the media content item is being presented.

In some implementations, the presentation of information related to quotations and of content summaries, as described above, can be performed in response to a search query by the user as well as in response to watching of a media content item. For example, when the user searches for a quotation from a television show, the quotation-related information described above may be displayed in addition to, or in lieu of, the search results. If the user searches for a television show, a summary of the show (e.g., for the most recent episode, for the last month, etc.) may be displayed in addition to, or in lieu of, the search results.

Displaying Entity Information in Response to User Election

In some implementations, the client device 140 displays information on entities related to a video content item being presented on the client device 102 in response to a user election. For example, the client device 140, before displaying the entity information, detects that the client device 102 is powered on (or at least determines that the client device 102 is powered on or likely to be powered on). When the client device 102 is detected or determined to be powered on, the client device 140 prompts the user for an election. The user election indicates user authorization to have a currently presented video content item detected. In accordance with the user election and in conjunction with the server system 106, the client device 140 presents information on entities related to the detected video content item.

In some implementations, the client device 140 (or the server system 106 in conjunction with the client device 140) detects or determines whether the client device 102 is powered on (and, optionally, if the client device 102 is active, as opposed to idle or in sleep mode). In the distributed system 100, the client device 140 determines whether the client device 102 is powered on, with the assumption that with the client device 102 powered on the user is watching content using the client device 102 (e.g., movie, television program). In some implementations, if the client device 102 and the client device 140 are communicatively connected to the same network (e.g., both client devices 102 and 140 are connected to a common network through the same router, as in a home network for example), the client device 140 determines the power status of the client device 102 through communications with the client device 102.

For example, when the client device 102 is powered on (or, additionally, active, as opposed to idle or in sleep mode), the client device 102 broadcasts or multicasts a message (e.g., using the Simple Service Discovery Protocol (SSDP)) to announce the presence of the client device 102 to other devices in the common network. The client device 140 receives the message from the client device 102 and determines, based on the receipt of the message from the client device 102, that the client device 102 is powered on. Also, the client device 140 can periodically send a broadcast or multicast search message to devices in the common network to determine whether the client device 102 is still powered on. The client device 102 receives the search message and sends a response message to the client device 140. The client device 140 receives the response message and determines, based on the receipt of the message from the client device 102, that the client device 102 is powered on. The client device 140 notifies the server system 106 that the client device 102 is on. In accordance with the notification that the client device 102 is powered on, the server system 106 determines that the client device 102 is powered on and provides instructions or content (e.g., entity information and instructions to display such) to the client device 140.

In some implementations, if the client device 140 cannot determine the power status of client device 102 from communications with the client device 102 (e.g., the client devices 102 and 140 are connected to different networks, the client device 102 is not connected to any network, the client device 102 is not configured to connect to any network (e.g., the client device 102 is not Internet-enabled), the client device 102 is not configured to broadcast/multicast its presence (e.g., the client device 102 does not support SSDP or another similar protocol)), the client device 140 determines the power status of the client device 102 based on one or more signals; the client device 140 guesses whether the client device 102 is powered on based on the signals. In some implementations, the signals include one or more of: the current location of the client device 140, the current time, and data about the user (e.g., the user's search history).

In some implementations, the client device 140 determines its current location (e.g., using a location device in the client device 140, such as a Global Positioning System (GPS) module (not shown)). The current location of the client device 140 is a signal indicating whether the user is at home (assuming the client device 140 and the user are in proximity to each other) and thus may be watching video content (e.g., watching television) using the client device 102.

In some implementations, the client device 140 identifies the current time. The current time is a signal indicating whether the user may be watching television (e.g., if the current time is in the "prime time" hours range for television viewing, determine that the user is more likely to be watching video content using the client device 102).

In some implementations, the client device 140 communicates with the server system 106 and obtains data about the user (e.g., from the user database 130). The user data includes, for example, the user's search history, the user's media consumption history, and the user's television viewing history. These histories are signals indicating whether the user is particularly interested in video content (e.g., television shows, movies) and related information (e.g., if the user search for television-related information often, the user is more likely to be interested in television-related information).

In some implementations, an application on the client device 140 (e.g., assistant application 355-3) makes the determination of whether the client device 102 is powered on. Thus, the application may make the determination whenever the application is activated (e.g., launched, brought to the foreground) or make the determination periodically while in the background.

Figure 14A:
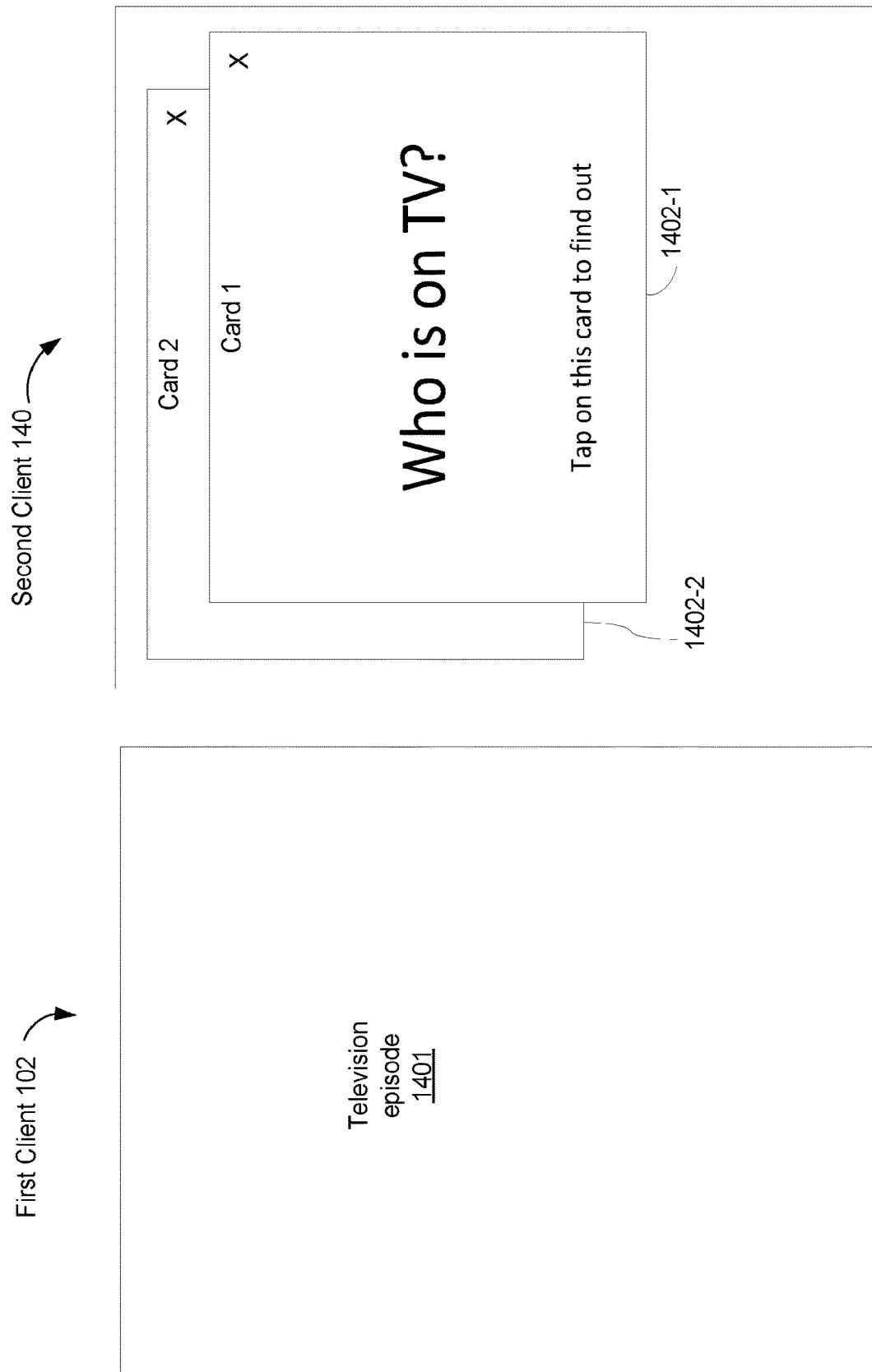
FIGS. 14A-14F are example screenshots in accordance with some implementations.

The client device 140 (e.g., a second screen device, such as a smart phone, laptop computer or tablet), based on these signals and/or on presence announcements from the client device 102 as described above (e.g., a television or set-top box), determines whether the client device 102 is (likely to be) powered on. If the device is determined to be powered on, an application on the client device 140 (e.g., assistant application 355-3) displays an affordance 1402-1 (e.g., a "card"), as shown in FIG. 14A. The affordance may be one of multiple affordances 1402 (e.g., cards) concurrently displayed by the application. The affordance 1402-1 includes a prompt that invites the user to select the card (e.g., perform a tap gesture on the card, click on the card) in order to receive information about entities in video content items that may be playing on the client device 102. For example, the affordance 1402-1 includes the prompt "Who is on TV?—Tap on this card to find out"; the prompt invites the user to tap on the card 1402-1 to get information on people on whatever show the user is watching.

In response to user selection of the affordance 1402-1, the application activates a process to detect media content playing on the client device 102. In some implementations, the application activates an audio detection process, in which audio output from the client device 102 is picked up by the client device 140 (e.g., through a microphone on the client 140). Content information 142 is generated from the picked-up audio and sent to the server 106 to determine the media content item playing on the client device 102, the details of which are described above and not repeated here. In some other implementations, the application communicates with the client device 102 (e.g., with a media player application on the client device 102) to determine what media content is playing on the client device 102 (e.g., by retrieving metadata or subtitles data of the playing media content item from the client device 102). In some implementations, the affordance 1402-1 displays information indicating that content detection is in progress.

Figure 14B:
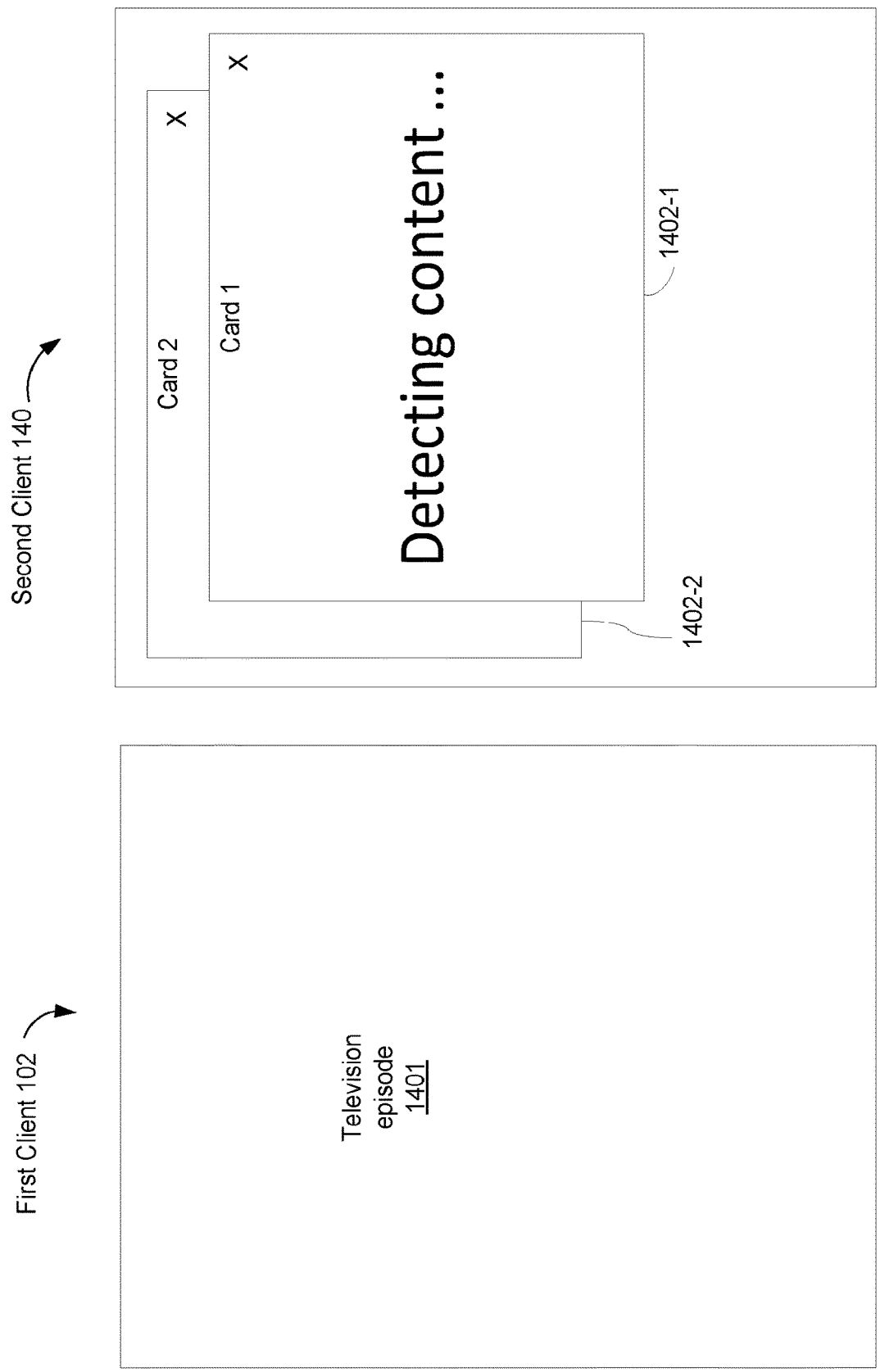

For example, in FIG. 14B, after the user selects the affordance 1402-1 in FIG. 14A, the affordance 1402-1 now displays the indication "Detecting content . . . " that content detection is in progress.

In some implementations, the content detection has a time limit. Thus, if the application cannot determine the media content item being played within a defined time limit (e.g., 12 seconds), the affordance 1402-1 displays an error message (e.g., "Content detection failed").

Figure 14C:
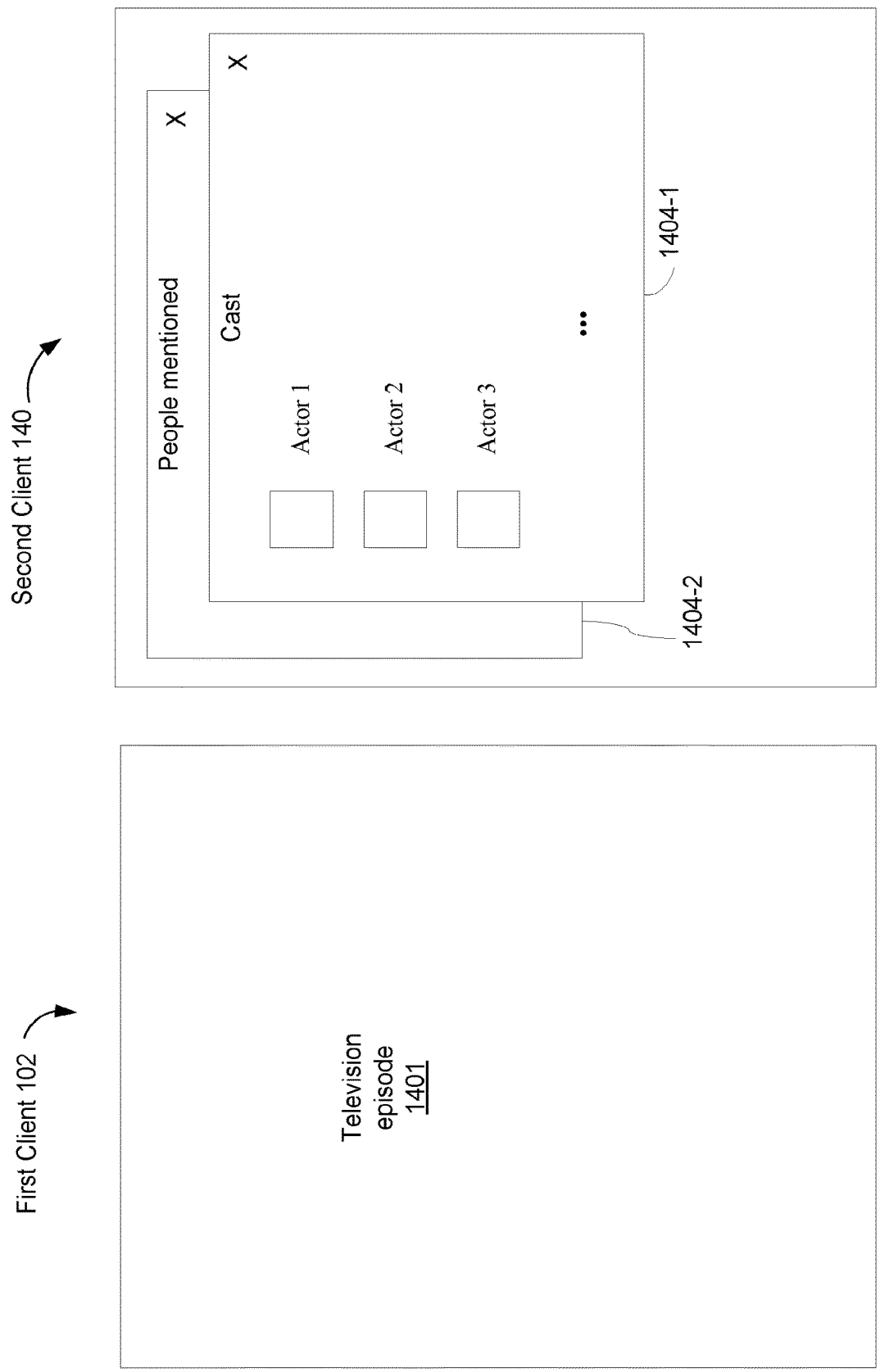

If content detection is successful (e.g., television episode 1401 playing on the client device 102 is detected), the application on the client device 140 displays affordances 1404 (e.g., cards) that include entity information for the detected content. For example, as shown in FIG. 14C, affordances 1404 are displayed on the client device 140. The affordances 1404 include entity information for the television episode 1401. Affordance 1404-1, for example, includes a cast list for the television episode 1401 (or for the television series to which episode 1401 belongs). Each cast member in the affordance 1404-1 is individually selectable (e.g., tapped on) by the user; each cast member in the card 1404-1 is an individual affordance.

Figure 14D:
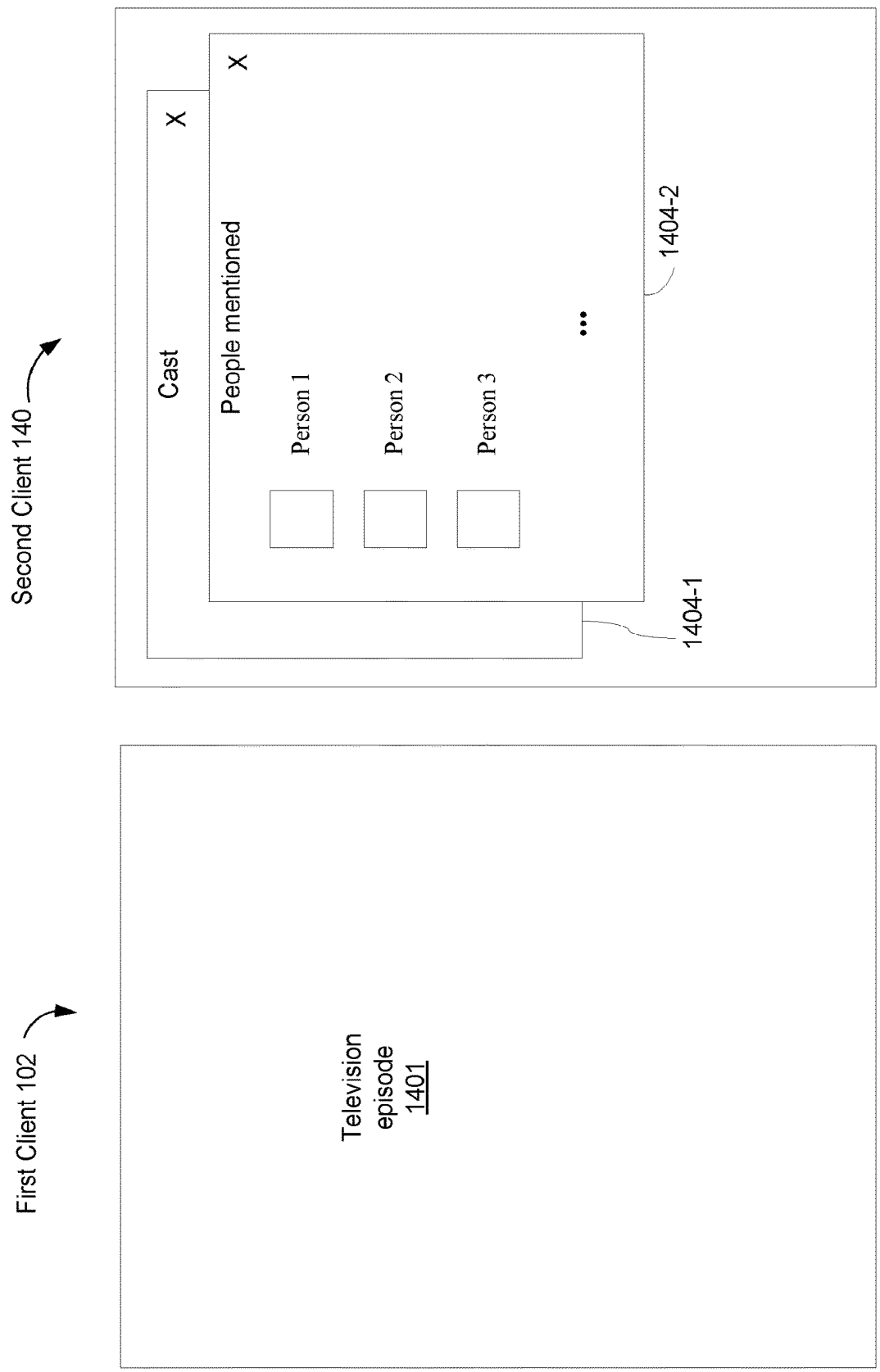

FIG. 14C also illustrates an affordance 1404-2 displayed, in the z-order of affordances 1404, behind affordance 1404-1 on the client device 140. The affordance 1404-2 can be selected by the user to bring the affordance 1404-2 forward in the z-order. FIG. 14D shows the affordance 1404-2 displayed in front of the affordance 1404-1. The affordance 1404-2 also displays entity information for the television episode 1401. For example, the affordance 1404-2 displays people mentioned in the television episode 1401 (e.g., historical figures mentioned in the story, characters in the story, etc., people in the news that are mentioned but not appearing in the episode). In some implementations, there are individual cards for each person mentioned. In some other implementations, there is a "people mentioned" card, such as affordance 1404-2, that displays a list of the people mentioned in the television episode 1401. In the "people mentioned" card with the list of people mentioned, each person listed in the card is individually selectable, similar to how actors in the cast card 1404-1 are individually selectable as described above; each person in the "people mentioned" list is an individual affordance. In some implementations, there are limitations on which entities, and the number of entities, for which individual affordance cards are displayed or are listed in an affordance card. For example, the number may be limited up to a maximum amount (e.g., five). As another example, entities that are mentioned within a defined time range of the current playback position in the media content item are displayed or listed. For example, if a person was mentioned within the last 30 minutes of the current position in the episode 1401, they are eligible for display or listing, but not if the person was mentioned outside of that last 30 minutes.

The entities displayed on cards 1404 can be any entity related to the media content item being presented on the client device 102. Thus, the entities displayed need not only be people; the entities displayed can include places, quotations, music, and so on. Further, the entities displayed in the card 1404 can be displayed in a content summary format, as in the content summaries described above. In some implementations, the entities displayed on the cards 1404 are derived from the entities database 122 based on the determined identity of the detected content. In some implementations, the entities displayed on the cards 1404 are derived from search results returned by Internet search engines in response to queries initiated in response to user selection of an affordance on a displayed card (e.g., an actor name—in which case the search query that is executed is a combination of the name of the corresponding media item and the actor name). In some implementations, the entities displayed on the cards 1404 are derived from a combination of one or more of information from the entities database 122 and Internet search results.

Figure 14E:
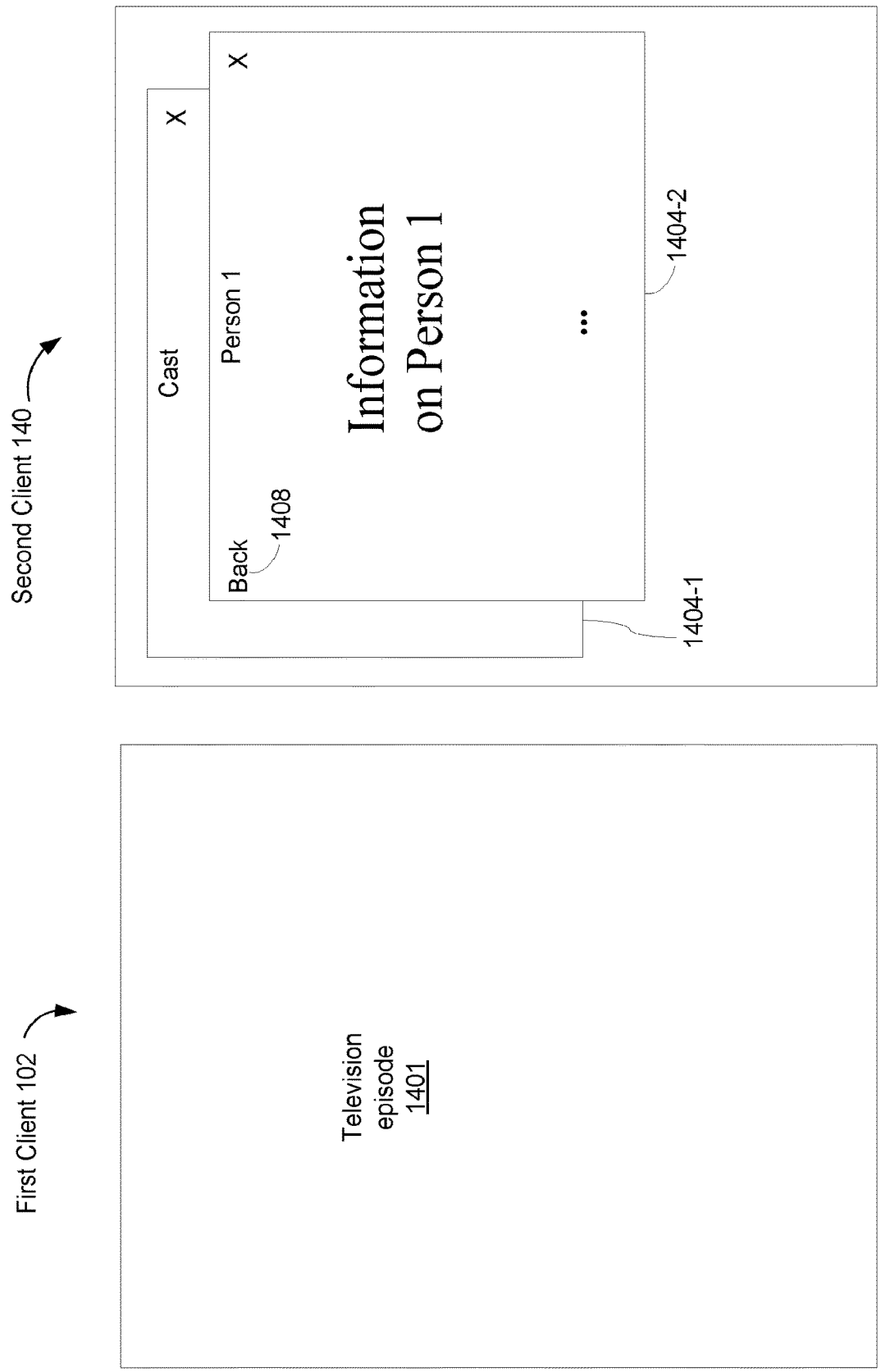
Figure 14F:
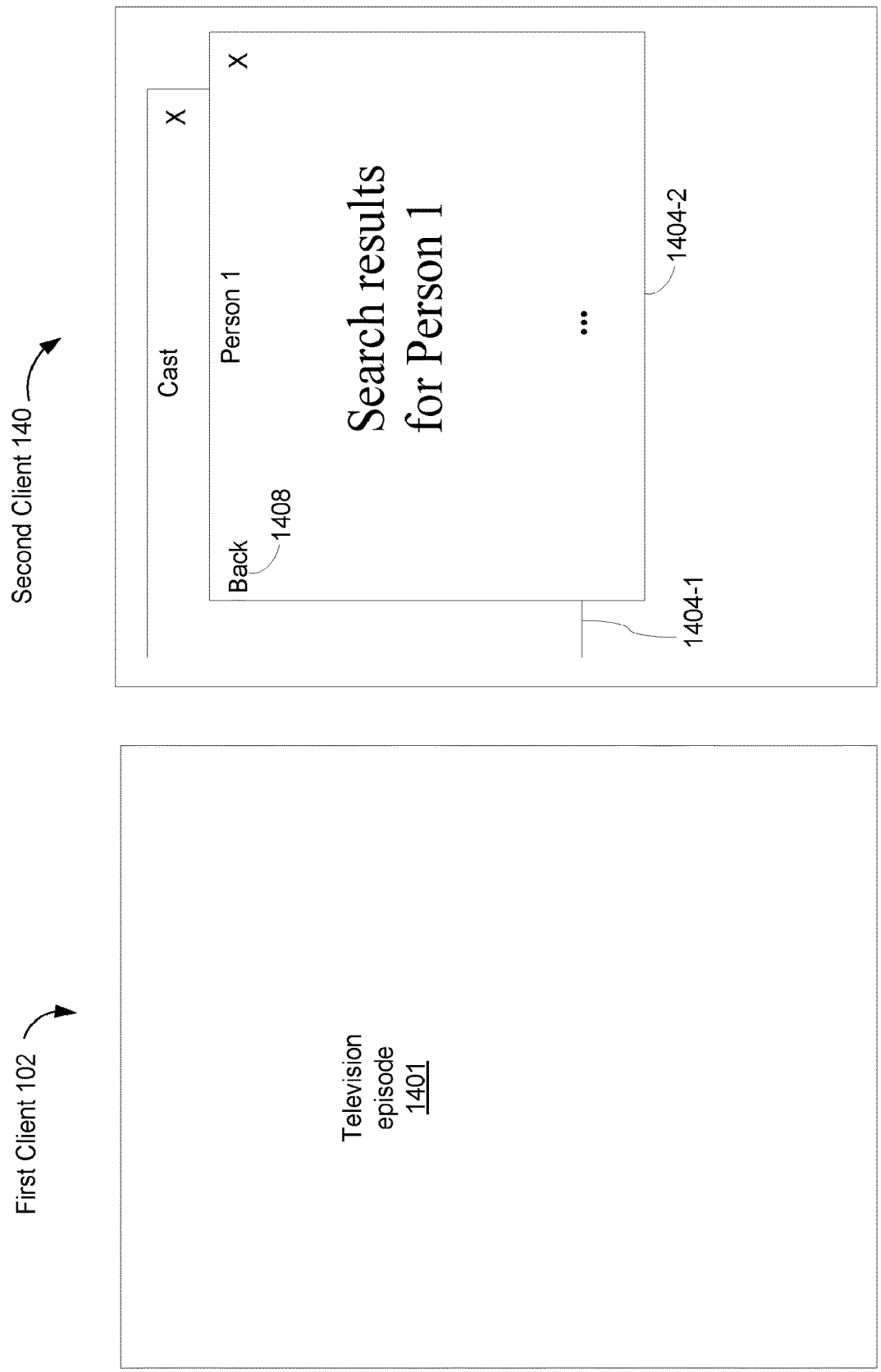

When the user selects an entity from an affordance with a list of entities (e.g., actor from card 1404-1, person mentioned form card 1404-2) or selects an affordance with an individual entity (e.g., a card with one person), information is displayed for the selected entity. In some implementations, the information displayed is additional information (e.g., biographical information, other factual information) about the selected entity. For example, if "Person 1" in the affordance 1404-2 is selected, biographical information on Person 1 is displayed on the affordance 1404-2, replacing the list of persons mentioned, as shown in FIG. 14E. In some other implementations, the information displayed is search results for a search in which selected entity is the search query. For example, if "Person 1" in the affordance 1404-2 is selected, a search query for Person 1 is submitted to a search engine 174, and the search results are displayed on the affordance 1404-2, replacing the list of persons mentioned, as shown in FIG. 14F. In FIGS. 14E-14F, the user can return to the persons list in the affordance 1404-2 by activating a back button 1408 or the like.

In some implementations, the entities displayed on a card are based on the genre of the media content item that is detected. When the server 106 identifies the media content item being played, the server 106 also identifies a genre of the media content item (e.g., based on metadata of the media content item, etc.). For example, if the episode 1401 is a fictional program (e.g., a television drama, a sit-com, a movie), the card 1404-1 displays a cast list. If the episode 1401 is a non-fictional program (e.g., a late night talk show, a reality show, a news interview show, a game show) with hosts and participants (e.g., guests, contestants), the card 1404-1 displays, instead of a cast list, a list of the hosts and participants.

Of course, cast lists, hosts and guests, people mentioned, and so on are merely examples, of entities, and corresponding affordances 1404, that can be displayed. Other entities and information that can be displayed in the cards 1404 include episode synopses, crew members, places mentioned, lists of songs heard in the media content item, and so on.

It should be appreciated that the media content item being detected as playing on the client device 102 may be live or time-shifted (e.g., played from a digital recording, on-demand).

Figure 15A:
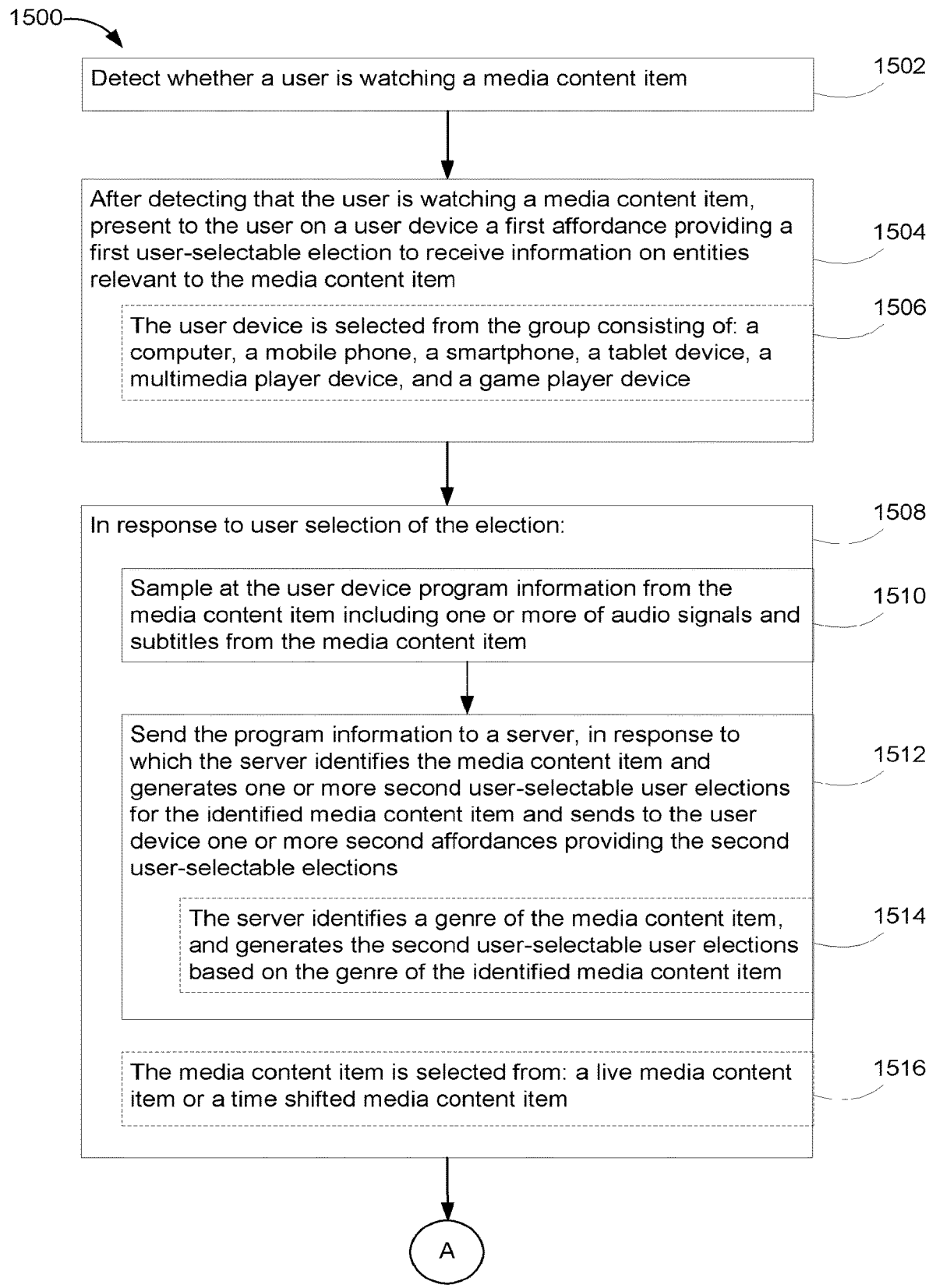
FIGS. 15A-15B illustrate a flowchart for presenting information on an entity relevant to a media content item in accordance with some implementations.
Figure 15B:
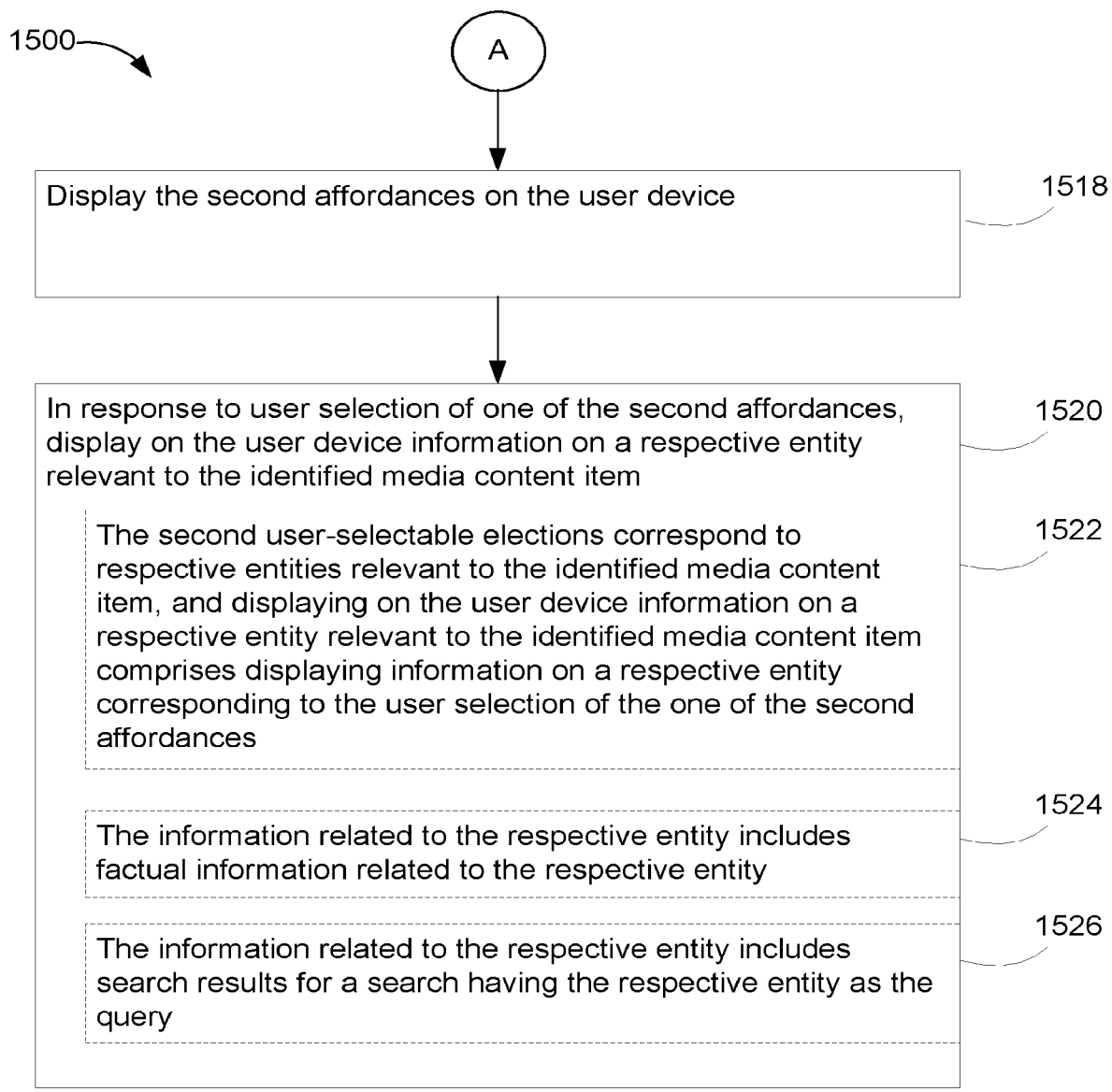

FIGS. 15A-15B illustrate a method 1500 for displaying information related to an entity in accordance with some implementations. The method 1500 is performed at a client device (e.g., client device 140) having one or more processors and memory.

Whether a user is watching a media content item is detected (1502). The client device 140 makes this detection by detecting whether a client device for watching media content (e.g., client device 102) is powered on, with power status of the client device 102 being a proxy for whether the user is watching a media content item. For example, the client device 140 uses presence announcements from the client device 102 and/or signals (e.g., current time, current location, etc.) to determine whether the client device 102 is powered on.

After detecting that the user is watching a media content item, a first affordance providing a first user-selectable election to receive information on entities relevant to the media content item is presented to the user on a user device (1504). The client device 140, after detecting that the client device 102 is powered on, displays an affordance 1402-1 that invites the user to receive information on entities (e.g., people) relevant to a media content item (e.g., television episode 1401). The user selects the affordance 1402-1 to initiate the process for receiving the information.

In some implementations, the user device is selected from the group consisting of: a computer, a mobile phone, a smartphone, a tablet device, a multimedia player device, and a game player device (1506). The client device 140 is any of: a computer (desktop or laptop), a mobile phone, a smartphone, a tablet device, a multimedia player device, and a game player device. Any of these devices can have an application (e.g., assistant application 355-3) that detects that the user is watching a media content item and the power status of the client device 102 and display the affordance with the invitation to receive information.

In response to user selection of the election (1508), program information from the media content item is sampled at the user device, including one or more of audio signals and closed captions from the media content item (1510), and the program information is sent to a server (1512). In response, the server identifies the media content item and generates one or more second user-selectable user elections for the identified media content item and sends to the user device one or more second affordances providing the second user-selectable elections. In response to the user selection of the affordance 1402-1, the client device 102 detects what is playing on the client device 102 by sampling program information, such as audio output, subtitles data, and media content item metadata from the client device 102. The program information is sent to a server 106 as content information 142. The server 106 detects the media content item being played on the client device 102 based on the content information 142, and generates and sends to the client device 140 one or more new affordances for the identified media content item. The new affordances correspond to entities relevant to the identified media content item.

For example, in response to user selection of the card 1401-1, the client device 140 sends content information 142 to the server 106. The server 106 uses the content information 142 to identify the episode 1401 playing on the client device 102. The server then identifies entities relevant to the episode 1401 (e.g., cast members, hosts and guests, people mentioned in the episode 1401, places, etc.) from the entities database 122 and generates affordances 1404 corresponding to these identified entities (or alternatively, sends the identified entities and instructions to generate the corresponding affordances (e.g., cards) 1404 to the client device 140). The server 106 sends the affordances 1404 to the client device 140, where the affordances 1404 are displayed.

In some implementations, the server identifies a genre of the media content item, and generates the second user-selectable user elections based on the genre of the identified media content item (1514). The server 106 identifies the genre of the media content item as well as the identity of the media content item. Depending on the genre, the server 106 identifies different entities for the media content item and generates affordances based on the genre. For example, if the genre is a fictional program the server 106 generates a card listing the cast members. If the genre is a non-fiction program with hosts and other participants, the server 106 generates a card that lists the host and the participants.

In some implementations, the media content item is selected from: a live media content item or a time shifted media content item (1516). The media content item can be live (e.g., first run of a television episode, live news event, live sporting event) or time-shifted (e.g., content played from a recording, on-demand content). Either way, the client 140 sends content information 142 for the media content item to the server 106, which identifies the media content item.

The second affordances are displayed on the user device (1518). For example, the cards 1404 are displayed on the client device 140, as shown in FIGS. 14C-14D.

In response to user selection of one of the second affordances, displaying information on a respective entity relevant to the identified media content item is displayed on the user device (1520). For example, in response to the selection of "Person 1" in the card 1404-2, information on Person 1 or search results for Person 1 are displayed, as shown in FIGS. 14E-14F.

In some implementations, the second user-selectable elections correspond to respective entities relevant to the identified media content item, and displaying on the user device information on a respective entity relevant to the identified media content item includes displaying information on a respective entity corresponding to the user selection of the one of the second affordances (1522). For example, in the cards 1404-1 and 1404-2 as shown in FIGS. 14C-14D, the listed cast members and people mentioned are individual affordances within the cards. The user can individual select any of the cast members and people mentioned bring up information on the selected cast member or mentioned person.

In some implementations, the information on the respective entity includes factual information related to the respective entity (1524). As in FIG. 14E, the information on the entity includes, for example, biographical information on a person, and other factual information, such as information about a place and so on.

In some implementations, the information on the respective entity includes search results for a search having the respective entity as the query. As in FIG. 14F, the information on the entity includes, for example, search results for a search with the entity as the query.

In some implementations, the server 106 builds the entities database 122 by analyzing media content items and referencing data from other sources (e.g., online documents, other information services). The analysis of the media content items includes receiving, retrieving, or extracting, for example, data corresponding to the audio track, subtitles data, and metadata from the media content items. From the audio track data etc., the server 106 identifies entities mentioned or appearing in the media content items (e.g., people, places, music, quotations, etc.) and when in the media content items do these entities appear or are mentioned. For example, the server 106 may treat any proper noun mentioned in the audio track data etc. as a potential entity, and reference other information and data sources to confirm. The server 106 may search documents (e.g., web pages) for mentions of potential entities found in the audio track data etc. for the media content items. If the number of mentions in the documents and, optionally, quality of these mentions, exceed a threshold, the potential entity is confirmed as an entity for addition to the entities database 122. Additionally, the server 106 may reference other sources of data to assist in the identification. For example, the server 106 may refer to a music information source (e.g., a song/music identification service, a music database) to assist in the identification of music played or mentioned in the media content items.

Displaying Textual Information

Figure 16:
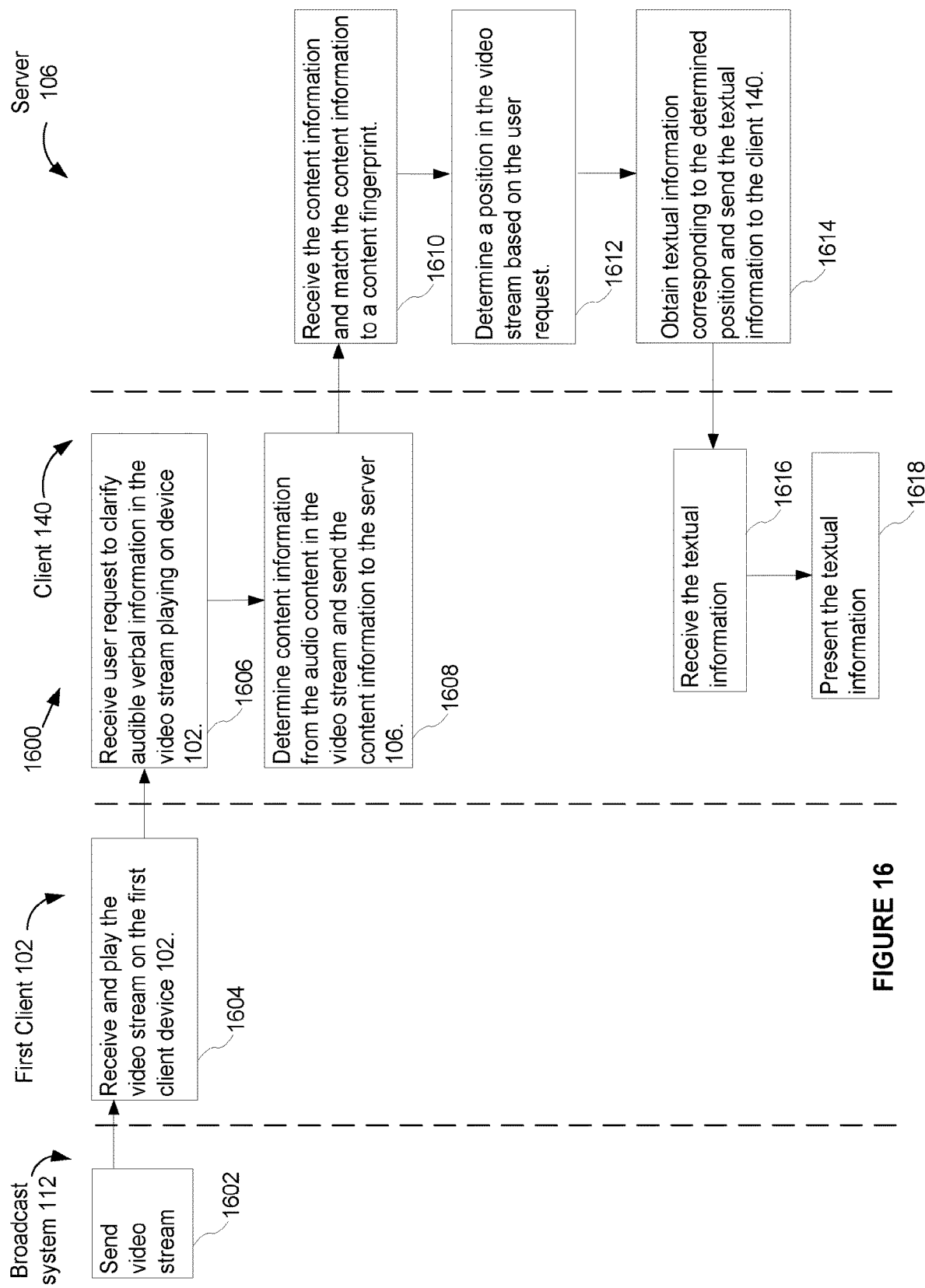
FIG. 16 is a flowchart illustrating an overview of a process of displaying textual information clarifying audible verbal information, in accordance with some implementations.

FIG. 16 is a flow diagram illustrating a process 1600 of displaying, on a second device, textual information corresponding to audible verbal information in content playing or played on a first device, according to some implementations. FIG. 16 provides an overall view of method 1800 which is discussed in more detail in the discussion of FIGS. 18A-18C. A video content system 112 sends a video stream 126 to a client 102 (1602). The video stream is received and displayed by the client device 102 (1604). While the video stream is played, a user request to clarify audible verbal information in the playing video stream is received by the client device 140 (1606). In some implementations, the user request is issued by a user of the client device 140 using a voice input or other input (e.g., pressing a button or selecting an icon). The user request is processed and sent to the server 106 by the assistant application 355-3. The voice input includes words or phrases that the server 106 recognizes as a user request to clarify the audible verbal information (e.g., "what did he/she just say?"; "what was that?"; "I didn't get that last part", etc.). The voice input may include an explicit or implicit mention of time (e.g., "what did he say five seconds ago"; "what did she just say?") and/or an explicit or implicit mention of a particular speaker or singer, whether that speaker or singer mentioned is a real person or a fictional character (e.g., "what did she say?"; "what did Sheldon [Cooper] just say?"). In some implementations, the input may also include words or phrases indicating a specialized request (e.g., "what is the romaji for that" to request romaji romanization for a Japanese song, "what does that line mean in Chinese" to request a Chinese translation).

Content information from the video stream is determined and sent to a server 106 (1608). As described elsewhere in this application, in some implementations the content information from the video stream includes one or more clips (such as several seconds, minutes or hours) of audio and/or video components of the video stream or the corresponding subtitles data, or fingerprints or other signatures generated by the client device 102 from one or more clips of the audio and/or video components of the video stream and/or the corresponding subtitles data. For example, the content information includes audible verbal information from the video stream. In some implementations, while the video stream is played, the client device 140 determines content information from the audio output, from the client device 102, corresponding to the audio content in the video stream (e.g., a microphone on the client 140 picks up the audio output from the client 102). The client 140 determines the content information and sends the content information to the server 106. In some implementations, the content information is formatted so it can be readily compared to content fingerprints stored on the server. The server 106 receives the content information and matches the content information to a content fingerprint (1610).

In some implementations, the content fingerprints are generated by the server (e.g., using the fingerprint generation module 221) prior to run time from media content (e.g., audio and/or video clips, or video frames) uploaded by a third party user. In some implementations, the content fingerprints are generated by the server (e.g., using the fingerprint generation module 221) in real-time (e.g., live) or prior to run time from media content (e.g., audio and/or video clips, or video frames) received from the video content system 112.

A position in the video stream is determined based on the user request (1612). The server 106 determines a position in the video stream for which the user is requesting clarification. The determination is based at least on the content information, as the content information is most contemporaneous in time with the user request. The content information includes content from a position in the video stream contemporaneous with the user request, and thus indicates a position in the video stream the user may be interested in and a default video stream position for the user request. In some implementations, the default video position is set to be some number of seconds (e.g., one second, two seconds) prior to the position determined based on the content information, to account for delays in the user reaction between the user hearing something unclearly and making the user request. The determination may also be based on specifics in the user request, such as whether the user request included a mention of time. For example, if the voice input in the user request is "what did he say 10 seconds ago?", then the user is likely interested in a position about 10 seconds from the default video stream position. On the other hand, if the voice input in the user request is "what did he say?", then the user request did not mention time, and the default position based on the content information is the determined position.

Textual information corresponding to the determined position is obtained and sent to the client 140 (1614). The server 106 obtains the textual information corresponding to the determined position in the video stream. The server 106 first looks to the entities database 122 for the textual information. If the textual information is not already in the entities database 122, the server 106 looks to other sources, such as subtitles data for the video stream or documents in content hosts 170. In some implementations, the obtained textual information includes textual information for a range of time around the determined position (e.g., plus/minus five seconds around the determined position). After the server 106 obtains the textual information, the textual information is sent to the client 140.

The client 140 receives the textual information (1616), and presents the textual information (1618). The assistant application 355-3 at the client 140 displays the textual information to the user. The user may make further user requests for different textual information, such as textual information for a position before or after the position corresponding to the displayed textual information, or textual information for a different speaker.

In some implementations, the client 102 and the client 140 are the same device, or the functionality and features of the clients 102 and 140 are present in the same device (e.g., client 182, FIG. 1B). For example, a user may be watching a video stream 126 on the same smart phone or tablet computer that includes an assistant application 355-3 that cooperates with an audio clarification module 152 of the server 106 to clarify audible verbal information in the video stream 126. In such implementations, some or all of the operations attributed herein to the first client 102, and associated software modules and data structures that are used to perform those operations, are performed on and/or hosted by the client 140. For clarification, one or more of the operations described herein as being applied to audio information or content associated with a video stream or video content can also be applied to audio information or content without reference to associated video content. This can be helpful when applied to music recordings with verbal content, audio books, podcasts, radio programs, music videos, and broadcasts of musical events with verbal content, to name a few examples.

FIGS. 17A-17B illustrate example screen shots in accordance with some implementations. FIGS. 17A-17B each illustrate screen shots of a first client 102 and a second client 140. The first client 102 plays video content, while the second client 140 displays textual information clarifying audible verbal information in the video content playing on the first client 102. The illustrations in FIGS. 17A-17B should be viewed as examples but not restrictive in nature. In some implementations, the example screen shots are generated by instructions/applications downloaded to the second client device 140 by the server 106. In some implementations, the example screen shots are generated by instructions/applications that are stored on the second client device 140 (such as a browser, an assistant application, or other pre-configured application) in response to an instruction from the server 106 to display particular content.

FIG. 17A illustrates screenshots of the first client device 102 and the second client device 140. The first client 102 displays a first position 1701-1 in a television series episode 1701 and the second client 140 displays a card object 1702 of an application (e.g., an assistant application). While the episode 1701 is being played on the first client 102, second client 140 receives a user request from a user who may have heard speech in the episode 1701 unclearly. The request may be in the form of a voice input asking "What was that?" The voice input is displayed in the card 1702, as shown in FIG. 17A, for the user to confirm or cancel the request. When the request is received, the client device 140 also generates content information from audio output from the first client 102 The user can select the card (e.g., tap on the card, if the card is displayed on a touch screen) or leave the card idle to confirm the request, or swipe the card (e.g., swipe left on the touch screen where the card is displayed) to cancel the request. If the query is confirmed, the request and the content information are sent to the server 106. The server 106 processes the request, obtains textual information responsive to the request, and sends the textual information to the second client 140.

When the second client 140 receives the textual information, the textual information is displayed in the card 1702, as shown in FIG. 17B. In FIG. 17B, the user request and the textual information responsive to the user request is displayed in the card 1702. For example, as shown, the textual information is "I love you" and "I love you too," lines from the episode 1701 around position 1701-1. The server 106 may also send additional information along with the textual information. For example, the textual information may be matched with entity information, to associate particular lines with particular speakers. As shown in FIG. 17B, the textual information is displayed with the identities of the characters speaking the lines in the episode 1701 (Character A speaks "I love you," and Character B speaks "I love you too"). From here, the user may make further requests for textual information, such as textual information for whatever the current position in the episode 1701 is, for textual information corresponding to lines spoken by a particular actor or character, or for textual information for some time before or after the first position 1701-1.

Figure 18A:
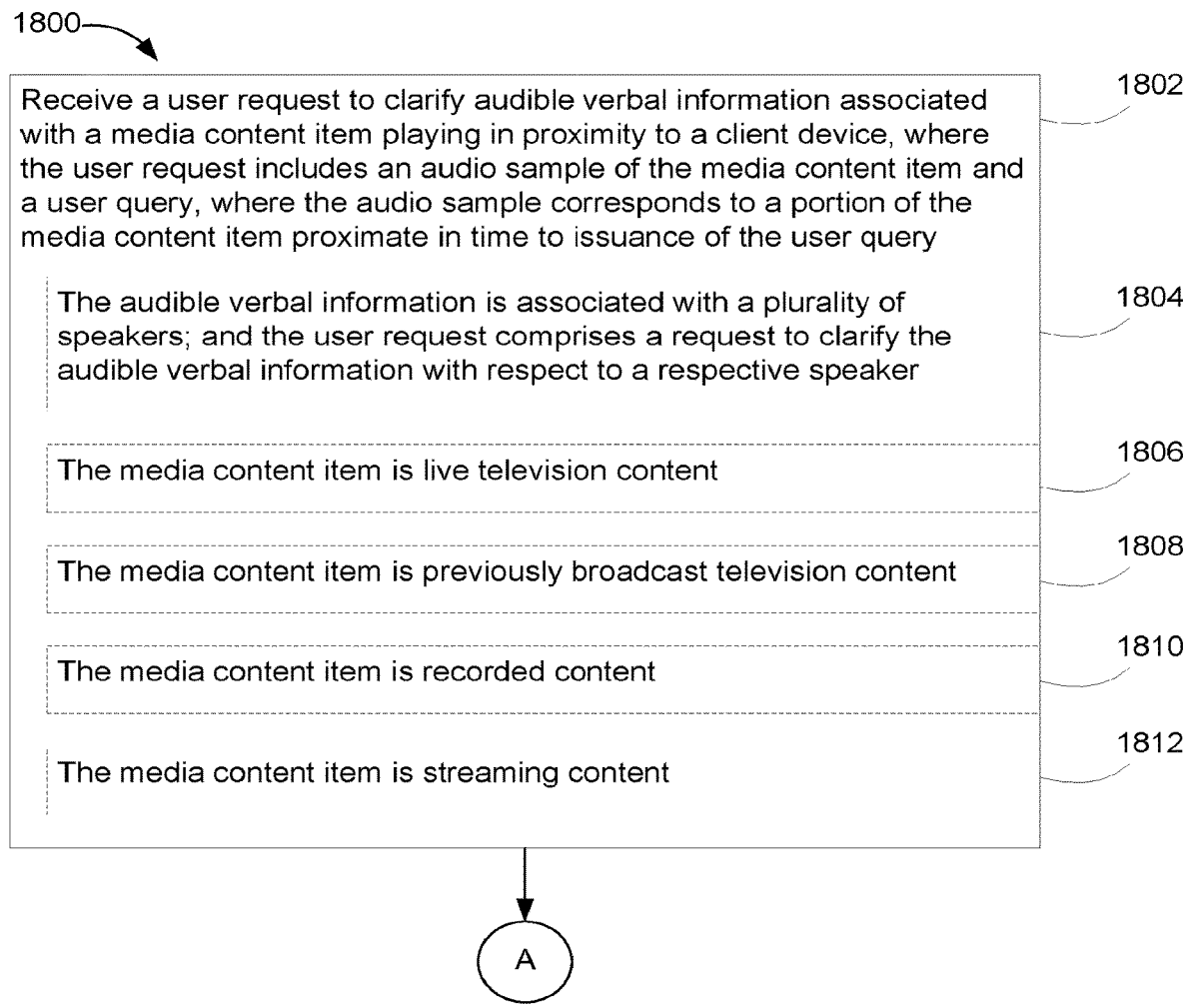
FIGS. 18A-18C illustrate a flowchart for a method for clarifying audible verbal information associated with a media content item in accordance with some implementations.
Figure 18B:
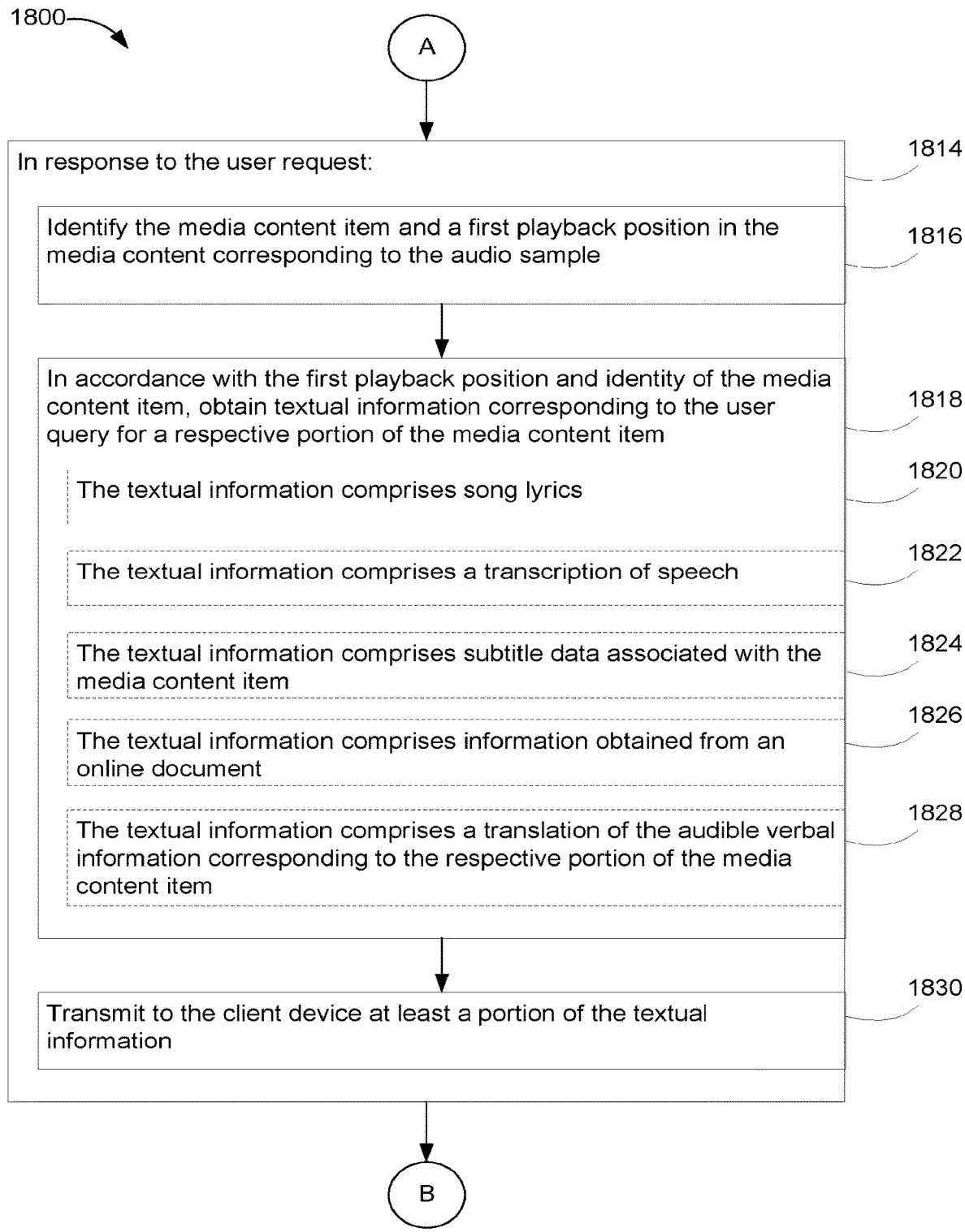
Figure 18C:
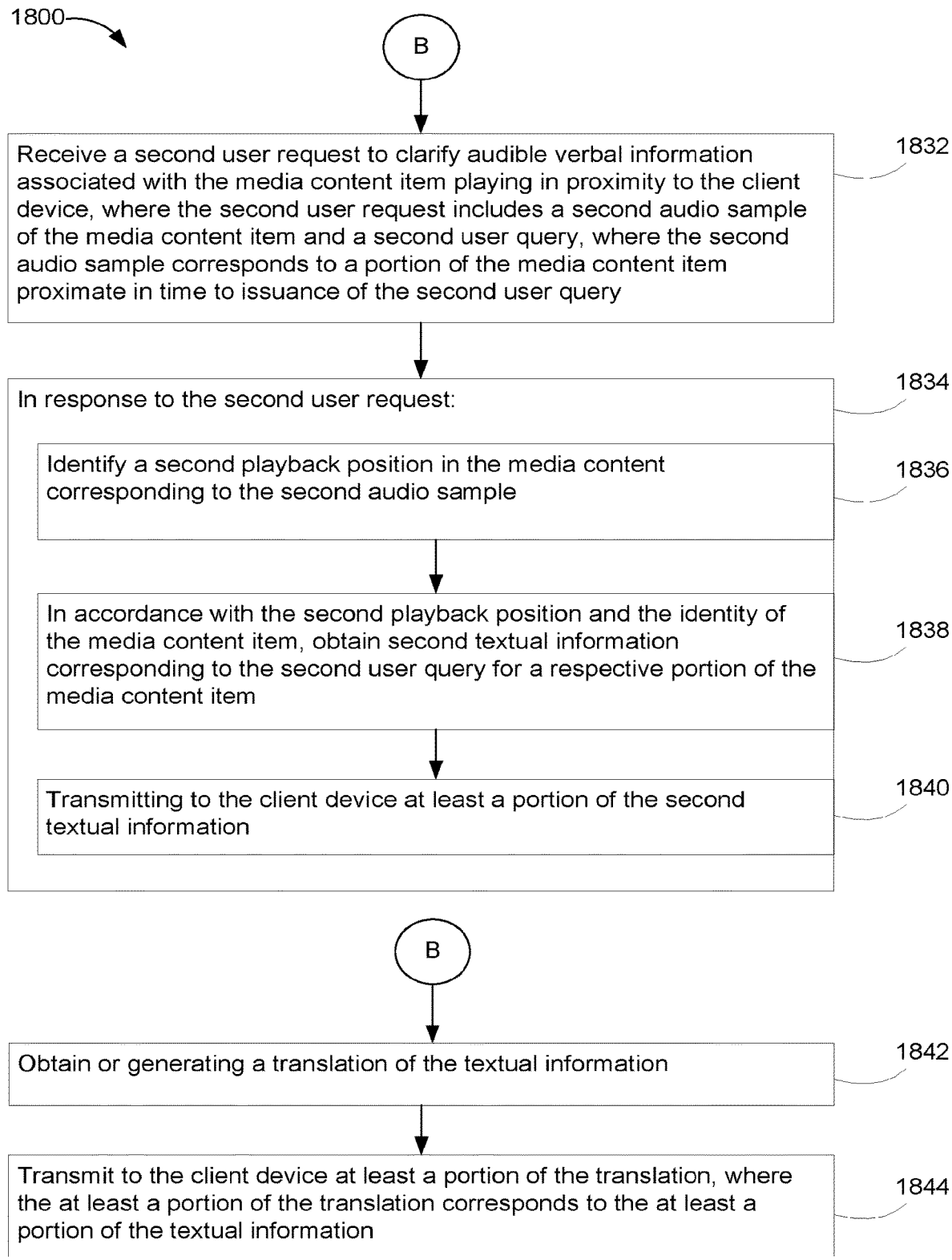

FIGS. 18A-18C illustrate a method 1800 for clarifying audible verbal information associated with a media content item, in accordance with some implementations. The method 1800 is performed at a server system 106 having one or more processors and memory.

The server receives (1802) a user request to clarify audible verbal information associated with a media content item playing in proximity to a client device, where the user request includes an audio sample of the media content item and a user query, wherein the audio sample corresponds to a portion of the media content item proximate in time to issuance of the user query. The server 106 receives, from a client device (e.g., client device 140), a user request to clarify audible verbal information in a playing video. While a video content item is being played at a client device 102, a user makes a user request to the client device 140 to clarify audible verbal information in the video content item. For example, the user request may be in the form of a voice input (e.g., "what was that?"). Alternatively, the user request may be made by selecting a predefined user interface object associated with such a request (e.g., a button, an icon).

When the client device 140 receives the user request, the client device 140 picks up audio output from the client device 102 playing the video content item, and generates content information 142 that includes an audio sample from the audio output from the client device 102. The audio sample corresponds to a position in the video content item that is proximate in time (e.g., contemporaneous with, lagging by about 1-2 seconds) to the receipt of the user request by the client device 140. For example, if the user request is received when the video content item is at the 5:32 mark, the user request includes an audio sample proximate to the 5:32 mark in the video content item.

The user request includes a user query. If the user request is made with voice input, the query is based on the voice input. If the user request is made using a predefined user interface object (e.g., a button or icon), the query is one that is predefined with respect to the user interface object.

A user request made with voice input includes words and phrases. The words and phrases specify the user query. For example, the query may be generic (e.g., "what was that?"). For such a generic query, a default user query, of clarification of whatever audible verbal information was spoken or sung in the video content proximate to when the user request was received, is presumed. The query may be explicit or implicit with respect to time or person. For example, if the query includes a name (e.g., "what did Alfred say?") or a gendered pronoun "he" or "she" (e.g., "what did she say?"), then the query is one of clarification of whatever audible verbal information was spoken or sung by the named person (if the query included a name) or a person of the gender matching the gender pronoun (if the query included a gendered pronoun) in the video content proximate to when the user request was received. If the query specifies a relative time (e.g., "what was that line 5 seconds ago?", "show me the lyrics 10 seconds back") or an absolute time (e.g., "what's the lyrics at 30 seconds in the song"), then the query is one of clarification of whatever audible verbal information was spoken or sung in the video content proximate to the absolute time or to the relative time with respect to when the user request was received. A query may be explicit and/or implicit with respect to time and/or person (e.g., "what did she say 5 second ago?", "what did Sheldon say at the 5 minute mark?").

The query may include a query for specialized information. For example, the query may include a query for romanization (e.g., "what's that line in pinyin?" for pinyin romanization of Chinese dialogue) or for translation (e.g., "what's that line in French?" for translation to French).

In response to the user request (1814), the server identifies (1816) the media content item and a first playback position in the media content corresponding to the audio sample; in accordance with the first playback position and identity of the media content item, obtains (1818) textual information corresponding to the user query for a respective portion of the media content item; and transmits (1830) to the client device at least a portion of the textual information. The server 106 uses the content information, including the audio sample, to identify the video content item and a position in the media content item corresponding to the audio sample. The server 106 (e.g., the audio clarification module 152) obtains the textual information (e.g., text from subtitles data, lyrics from a lyrics database, etc.) for the media content item at a time range around the identified position, and sends at least a part of the textual information to the client device 140 for presentation. Because the server 106 identified the media content item and the position in the media content item, the server 106 knows whether the audible verbal content for which clarification is requested is speech or song or both. The server 106 obtains the textual information from one or more sources in accordance with whether the audible verbal information is speech or song or both. For speech, sources include, for example, subtitles data and speech recognition. The textual information provides a written representation or transcription of speech or lyrics in whatever audible verbal information was spoken or sung in the video content proximate to the identified position. In some implementations, the server 106 (e.g., the audio clarification module 152) looks to the entities repository 122 first to see if the textual information for the identified video content item and the determined position is already stored in the entities repository 122. If the textual information is found in the entities repository 122, the textual information is retrieved from the entities repository 122. If the textual information is not found in the entities repository 122, the audio clarification module 122 looks to other sources (e.g., subtitles data, online documents, etc.) for the textual information.

In some implementations, the audible verbal information is associated with a plurality of speakers; and the user request comprises a request to clarify the audible verbal information with respect to a respective speaker (1804). The audible verbal information may include speech by multiple speakers or multiple singers, and the user request includes a query to clarify the audible verbal information with respect to a respective speaker or singer. For example, if the request includes a name or a gender pronoun, the request is interpreted by the server 106 to be a request for clarification of the audible verbal information spoken or sung by the named person or a person matching or referenced by the gender pronoun. For such a query, the textual information sent to the client device 140 is textual information corresponding to the audible verbal information spoken or sung by the named or pronoun-referenced person.

In some implementations, the media content item is live television content (1806). The video content item may be live television programming (e.g., live event, first-run television episode). For live television content, the source for the textual information may be the subtitles data included in the video stream of the live television content.

In some implementations, the media content item is previously broadcast television content (1808). The video content item may be previously broadcast television programming (e.g., re-run, re-broadcast for a time zone after first-run broadcast in another time zone). For previously broadcast television content, the source for the textual information may be the subtitles data included in the video stream of the television content or subtitles data stored in the entities repository 122.

In some implementations, the media content item is recorded content (1810). The video content item may be recorded content (e.g., content recorded in the DVR; content stored in optical disk, hard drive, or other non-volatile storage) being played back. For recorded content, the source for the textual information may be the subtitles data included with the recorded content (e.g., accompanying subtitles data) or subtitles data stored in the entities repository 122.

In some implementations, the media content item is streaming content (1812). The video content item may be a streaming video (e.g., online video). For streaming video, the source for the textual information may be the subtitles data included with the streaming video or text generated using speech recognition.

In some implementations, the textual information comprises song lyrics (1820). The server 106 based on the identification of the media content item and the position in the media content item, is aware of whether the audible verbal information at the position is speech or song or both. If the audible verbal information is a song, the textual information includes lyrics for the song.

In some implementations, the textual information comprises a transcription of speech (1822). The server 106 based on the identification of the media content item and the position in the media content item, is aware of whether the audible verbal information at the position is speech or song or both. If the audible verbal information is speech, the textual information includes a transcription of the speech.

In some implementations, the textual information comprises subtitle data associated with the media content item (1824). Subtitles data may be a source of the textual information; the textual information includes text extracted from the subtitles data.

In some implementations, the textual information comprises information obtained from an online document (1826). The textual information may be obtained from a document or database hosted at a content host 170. For example, lyrics may be obtained from a lyrics database. Lyrics, lyrics romanizations, and lyrics translations for particular genres of songs may be obtained from particular websites (e.g., anime songs websites and their web pages as sources of lyrics, and corresponding romanizations and translations, for songs found in Japanese anime).

In some implementations, the textual information comprises a translation of the audible verbal information corresponding to the respective portion of the media content item (1828). For example, the server 106, based on the identification of the media content item and the position in the media content item, knows that the audible verbal information is in a language different than what the user request asked for or different from the user's preferred language. The server 106 obtains textual information that is a translation of the audible verbal information (e.g., lyrics translations from websites) and sends that to the client 140.

In some implementations, the server receives (1832) a second user request to clarify audible verbal information associated with the media content item playing in proximity to the client device, where the second user request includes a second audio sample of the media content item and a second user query, and where the second audio sample corresponds to a portion of the media content item proximate in time to issuance of the second user query. After the textual information is transmitted to the client 140, the client 140 may receive another request to clarify audible verbal information. The new request may be a new request unrelated to the prior request, or a request relative to the prior request. For example a relative request may request, for example, for clarification of audible verbal content at some time or some number of lines prior to the textual information responsive to the prior request. The client 140 sends the new request to the server 106, which the server 106 receives and processes.

In response to the second user request (1834), the server identifies (1836) a second playback position in the media content corresponding to the second audio sample; in accordance with the second playback position and the identity of the media content item, obtains (1838) second textual information corresponding to the second user query for a respective portion of the media content item; and transmits (1840) to the client device at least a portion of the second textual information. The server 106 processes the new request similarly to the prior request. The server 106 identifies the media content item and a position in the item, obtains textual information responsive to the request, and transmits at least a part of the textual information to the client 140.

In some implementations, the server obtains or generates (1842) a translation of the textual information, and transmits (1844) to the client device at least a portion of the translation, where the at least a portion of the translation corresponds to the at least a portion of the textual information. The server 106 after obtaining textual information for the audible verbal information, in the same language as the audible verbal information, may obtain or generate a translation of the textual information. The server 106 may obtain the translation from documents in content hosts 170, or generate the translation using machine translation. The server 106 sends the textual information and the corresponding translation to the client 140 for display.

In some implementations, the server 106 transmits image information as well as textual information to the client device 140. The image information includes a frame or a clip or snippet, of the media content item, corresponding to the same position in the media content item as the textual information transmitted by the server 106 to the client device 140. The image information is displayed at the client device 140 along with the textual information. The image information gives context to the textual information (e.g., by showing the clip or frame where the audible verbal content corresponding to the textual information was spoken or sung.

In some implementations, the textual information is presented on the same client device where the media content item is being played. For example, while the media content item is playing in a media player interface (e.g., in a browser window) displayed on client device 102, the textual information is displayed near the media player interface (e.g., in an area adjacent to the media player interface) on client device 102. The user may make the user requests to clarify audible verbal information in the media content item, and the media content item automatically jumps to the position determined in response to the user request. Even when the media content item is playing on client 102 and the textual information is displayed on client 140, the client 102 may receive instructions from the server 106 or from the client device 140 to jump the media content item to a position determined in response to the user request. More generally, the device playing the media content item may be instructed to rewind or forward the media content item to the position with the audible verbal information the user wants clarified.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at a client device having a microphone, one or more processors, and memory:
   while a media content item is playing on a second client device in proximity to the client device, receiving, via the microphone, a verbal query from a user of the client device;
   in response to receiving the verbal query while the media content item is playing on the second client device, sending a request to a remote server system, the request including at least a portion of the media content item and the verbal query;
   in response to sending the request, receiving, from the remote server system, information responsive to the verbal query for the portion of the media content item; and
   presenting, using a display of the client device, a card interface of an application executing on the client device that presents the information responsive to the verbal query to the user.

2. The method of claim 1, wherein the verbal query is a query regarding the portion of the media content item.

3. The method of claim 1, wherein the verbal query is a request to clarify the portion of the media content item.

4. The method of claim 1, wherein the verbal query concerns the media content item that is playing on the second client device.

5. The method of claim 1, wherein the at least the portion of the media content is audio content.

6. The method of claim 1, wherein the information comprises song lyrics.

7. The method of claim 1, wherein the information comprises a transcription of speech.

8. The method of claim 1, wherein the portion of the media content item corresponds to a plurality of persons speaking; and wherein the verbal query comprises a request to clarify the speech of a particular person of the plurality of persons.

9. The method of claim 1, wherein the information comprises subtitle data associated with the media content item.

10. The method of claim 1, wherein the information comprises information obtained from an online document.

11. The method of claim 1, wherein the portion of the media content item includes speech in a first language; and wherein the information comprises a translation of the speech to a second language.

12. The method of claim 1, wherein the verbal query comprises a request to translate content within the portion of the media content item; and wherein the information comprises a translation of the content.

13. The method of claim 1, wherein the media content item is live television content.

14. The method of claim 1, wherein the media content item is previously broadcast television content.

15. The method of claim 1, wherein the media content item is recorded content.

16. The method of claim 1, wherein the media content item is streaming content.

17. An electronic device, comprising:
a microphone;
memory;
one or more processors; and
one or more programs stored in the memory and configured for execution by the one or more processors, the one or more programs including instructions for:
while a media content item is playing on a second client device in proximity to the electronic device, receiving, via the microphone, a verbal query from a user of the client device;
in response to receiving the verbal query while the media content item is playing on the second client device, sending a request to a remote server system, the request including at least a portion of the media content item and the verbal query;
in response to sending the request, receiving, from the remote server system, information responsive to the verbal query for the portion of the media content item; and
presenting, using a display of the electronic device, a card interface of an application executing on the electronic device that presents the information responsive to the verbal query to the user.

18. The electronic device of claim 17, further comprising a display, wherein the information is presented to the user via the display.

19. The electronic device of claim 17, further comprising a speaker, wherein the information is presented to the user via the speaker.

20. A non-transitory computer-readable storage medium storing one or more programs to be executed by an electronic device with a microphone, memory, and one or more processors, the one or more programs comprising instructions for:
while a media content item is playing on a second client device in proximity to the electronic device, receiving, via the microphone, a verbal query from a user of the electronic device;
in response to receiving the verbal query while the media content item is playing on the second client device, sending a request to a remote server system, the request including at least a portion of the media content item and the verbal query;
in response to sending the request, receiving, from the remote server system, information responsive to the verbal query for the portion of the media content item; and
presenting, using a display of the electronic device, a card interface of an application executing on the electronic device that presents the information responsive to the verbal query to the user.

21. The non-transitory computer-readable storage medium of claim 20, wherein the portion of the media content item corresponds to a plurality of persons speaking; and wherein the verbal query comprises a request to clarify the speech of a particular person of the plurality of persons.

* * * * *